United States Patent
Enokida

(10) Patent No.: US 7,489,783 B2
(45) Date of Patent: *Feb. 10, 2009

(54) DIGITAL CERTIFICATE MANAGEMENT SYSTEM, DIGITAL CERTIFICATE MANAGEMENT APPARATUS, DIGITAL CERTIFICATE MANAGEMENT METHOD, UPDATE PROCEDURE DETERMINATION METHOD AND PROGRAM

(75) Inventor: Tomoaki Enokida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/256,971

(22) Filed: Oct. 25, 2005

(65) Prior Publication Data

US 2006/0036850 A1 Feb. 16, 2006

Related U.S. Application Data

(63) Continuation of application No. 10/874,340, filed on Jun. 24, 2004, now Pat. No. 6,981,139.

(30) Foreign Application Priority Data

| Jun. 25, 2003 | (JP) | ............................. 2003-181163 |
| May 27, 2004 | (JP) | ............................. 2004-157633 |

(51) Int. Cl.
*H04L 9/00* (2006.01)
*H04K 1/00* (2006.01)
(52) U.S. Cl. ........................ 380/278; 713/156; 713/163
(58) Field of Classification Search .................. 713/156; 380/278

See application file for complete search history.

(56) References Cited

U.S. PATENT DOCUMENTS 5,748,736 A * 5/1998 Mittra ........................ 713/163

(Continued)

FOREIGN PATENT DOCUMENTS

EP 1 143 658 A1 10/2001

(Continued)

OTHER PUBLICATIONS

"KHIP-a scalable protocol for secure multicast routing," Proceedings of the conference on Applications, technologies, architectures, and protocols for computer communication, pp. 53-64, 1999.*

(Continued)

*Primary Examiner*—Matthew Heneghan
(74) *Attorney, Agent, or Firm*—Oblon, Spivak, McClelland, Maier & Neustadt, P.C.

(57) ABSTRACT

In a digital certificate management system, a client/server system is connected to a digital certificate management apparatus capable of communicating with clients and servers. Mutual authentication is performed between the clients and the servers by using digital certificates and communications are performed over a communication channel established based on mutual authentication. The digital certificate management apparatus includes a certification key update part updating a server certification key used for mutual authentication and stored in each of the clients that become communication parties of one of the servers. The certification key updating part includes a key obtaining part, a certificate obtaining part, and first and second transmission parts. The second transmission part performs an operation of transmitting the new server certificate to each of the servers after there are responses, indicating that the new server certification key is received, from all of the clients that become communication parties of the server.

3 Claims, 50 Drawing Sheets

U.S. PATENT DOCUMENTS

| | | | |
|---|---|---|---|
| 5,996,076 A | | 11/1999 | Rowney et al. |
| 6,049,878 A * | | 4/2000 | Caronni et al. ................. 726/3 |
| 6,118,874 A | | 9/2000 | Okamoto et al. |
| 6,128,738 A | | 10/2000 | Doyle et al. |
| 6,128,740 A | | 10/2000 | Curry et al. |
| 6,134,658 A | | 10/2000 | Multerer et al. |
| 6,148,401 A | | 11/2000 | Devanbu et al. |
| 6,185,678 B1 * | | 2/2001 | Arbaugh et al. ................. 713/2 |
| 6,263,435 B1 * | | 7/2001 | Dondeti et al. .............. 713/163 |
| 6,275,859 B1 * | | 8/2001 | Wesley et al. ................ 709/229 |
| 6,363,488 B1 | | 3/2002 | Ginter et al. |
| 6,438,550 B1 * | | 8/2002 | Doyle et al. .................... 707/9 |
| 6,477,649 B2 | | 11/2002 | Kambayashi et al. |
| 6,516,316 B1 * | | 2/2003 | Ramasubramani et al. ..... 707/9 |
| 6,571,221 B1 * | | 5/2003 | Stewart et al. ................. 705/52 |
| 6,606,706 B1 * | | 8/2003 | Li ............................. 713/162 |
| 6,629,243 B1 * | | 9/2003 | Kleinman et al. ........... 713/163 |
| 6,640,304 B2 | | 10/2003 | Ginter et al. |
| 6,651,166 B1 * | | 11/2003 | Smith et al. ................. 713/150 |
| 6,658,568 B1 * | | 12/2003 | Ginter et al. ................. 713/193 |
| 6,684,331 B1 * | | 1/2004 | Srivastava ................... 713/163 |
| 6,718,361 B1 * | | 4/2004 | Basani et al. ................ 709/201 |
| 6,751,598 B1 | | 6/2004 | Yagawa et al. |
| 6,772,340 B1 * | | 8/2004 | Peinado et al. .............. 713/168 |
| 6,775,559 B1 * | | 8/2004 | Weghorst et al. ............ 455/558 |
| 6,775,771 B1 | | 8/2004 | Shrader et al. |
| 6,775,782 B1 * | | 8/2004 | Buros et al. .................... 726/2 |
| 6,829,708 B1 * | | 12/2004 | Peinado et al. .............. 713/156 |
| 6,898,714 B1 | | 5/2005 | Nadalin et al. |
| 6,914,985 B1 | | 7/2005 | Shrader et al. |
| 6,915,437 B2 * | | 7/2005 | Swander et al. ................ 726/1 |
| 6,931,532 B1 * | | 8/2005 | Davis et al. ................. 713/167 |
| 6,941,459 B1 * | | 9/2005 | Hind et al. .................. 713/167 |
| 6,970,862 B2 * | | 11/2005 | Kwan ........................... 707/3 |
| 6,981,139 B2 * | | 12/2005 | Enokida ..................... 713/156 |
| 6,996,711 B2 * | | 2/2006 | Patterson et al. ............ 713/156 |
| 7,036,013 B2 * | | 4/2006 | Renganarayanan et al. . 713/178 |
| 7,043,024 B1 * | | 5/2006 | Dinsmore et al. ........... 380/278 |
| 7,065,643 B1 * | | 6/2006 | Cornils et al. ............... 713/163 |
| 7,069,438 B2 * | | 6/2006 | Balabine et al. ............. 713/168 |
| 2002/0144112 A1 * | | 10/2002 | Fries et al. .................. 713/163 |

FOREIGN PATENT DOCUMENTS

JP    11-122238    4/1999

OTHER PUBLICATIONS

Capt. James M. Hayes, "Secure In-band Update of Trusted Certificates", Enabling Technologies: Infrastructure for Collaborative Enterprises, XP-010358652, Jun. 16, 1999, pp. 168-173.

* cited by examiner

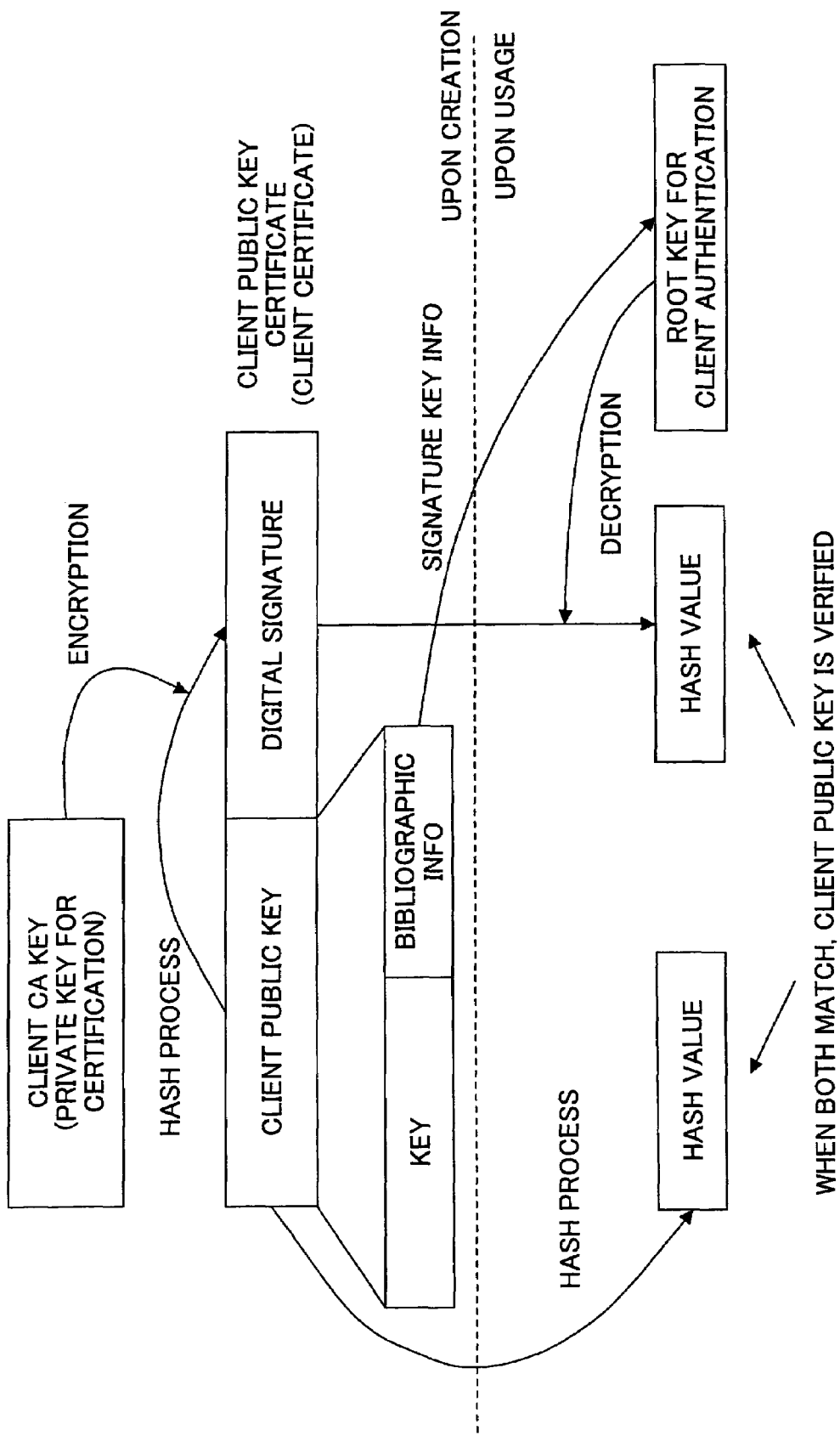

| NODE ID |||
|---|---|---|
| WHETHER DIRECT COMMUNICATION WITH MANAGEMENT APPARATUS IS POSSIBLE |||
| | CLIENT/SERVER ||
| NODE ID OF COMMUNICATION PARTY | USED ROOT KEY (ROOT KEY TO BE STORED IN THIS NODE) | UPDATE STATE |
| | ROOT KEY OF COMMUNICATION PARTY (ROOT KEY TO BE STORED IN COMMUNICATION PARTY) | UPDATE STATE |
| ⋮ | ... | |
| | ... | ... |
| | ... | ... |
| ⋮ | ... | |
| | ... | ... |
| | ... | ... |

FIG.30A

| SERVER APPARATUS 30 | | |
|---|---|---|
| DIRECT COMMUNICATION IS POSSIBLE | | |
| CLIENT APPARATUS 40-1 | SERVER | |
| | CLIENT AUTHENTICATION ROOT KEY | UPDATE UNNECESSARY |
| | SERVER AUTHENTICATION ROOT KEY | UPDATE NECESSARY |
| CLIENT APPARATUS 40-2 | SERVER | |
| | CLIENT AUTHENTICATION ROOT KEY | UPDATE UNNECESSARY |
| | SERVER AUTHENTICATION ROOT KEY | UPDATE NECESSARY |
| CLIENT APPARATUS 40-3 | SERVER | |
| | CLIENT AUTHENTICATION ROOT KEY | UPDATE UNNECESSARY |
| | SERVER AUTHENTICATION ROOT KEY | UPDATE NECESSARY |
| ⋮ | ... | |
| | ... | ... |
| | ... | ... |
| CLIENT APPARATUS 40-n | SERVER | |
| | CLIENT AUTHENTICATION ROOT KEY | UPDATE UNNECESSARY |
| | SERVER AUTHENTICATION ROOT KEY | UPDATE NECESSARY |

FIG.30B

| CLIENT APPARATUS 40-1 ||| 
|---|---|---|
| DIRECT COMMUNICATION IS IMPOSSIBLE |||
| NONE | | |
| | | |
| | | |

FIG.30C

| CLIENT APPARATUS 40-1 |||
|---|---|---|
| DIRECT COMMUNICATION IS IMPOSSIBLE |||
| SERVER APPARATUS 30 | CLIENT ||
| | SERVER AUTHENTICATION ROOT KEY | UPDATE NECESSARY |
| | CLIENT AUTHENTICATION ROOT KEY | UPDATE UNNECESSARY |

FIG.34A

| CLIENT APPARATUS 40 | | |
|---|---|---|
| DIRECT COMMUNICATION IS POSSIBLE | | |
| SERVER APPARATUS 30-1 | CLIENT | |
| | SERVER AUTHENTICATION ROOT KEY | UPDATE NECESSARY |
| | CLIENT AUTHENTICATION ROOT KEY | UPDATE UNNECESSARY |
| SERVER APPARATUS 30-2 | CLIENT | |
| | SERVER AUTHENTICATION ROOT KEY | UPDATE NECESSARY |
| | CLIENT AUTHENTICATION ROOT KEY | UPDATE UNNECESSARY |
| SERVER APPARATUS 30-3 | CLIENT | |
| | SERVER AUTHENTICATION ROOT KEY | UPDATE NECESSARY |
| | CLIENT AUTHENTICATION ROOT KEY | UPDATE UNNECESSARY |
| ⋮ | ... | |
| | ... | ... |
| | ... | ... |
| SERVER APPARATUS 30-n | CLIENT | |
| | SERVER AUTHENTICATION ROOT KEY | UPDATE NECESSARY |
| | CLIENT AUTHENTICATION ROOT KEY | UPDATE UNNECESSARY |

FIG.34B

| SERVER APPARATUS 30-1 | | |
|---|---|---|
| DIRECT COMMUNICATION IS IMPOSSIBLE | | |
| NONE | | |
| | | |
| | | |

FIG.34C

| SERVER APPARATUS 30-1 | | |
|---|---|---|
| DIRECT COMMUNICATION IS IMPOSSIBLE | | |
| CLIENT APPARATUS 40 | SERVER | |
| | CLIENT AUTHENTICATION ROOT KEY | UPDATE UNNECESSARY |
| | SERVER AUTHENTICATION ROOT KEY | UPDATE NECESSARY |

FIG.35

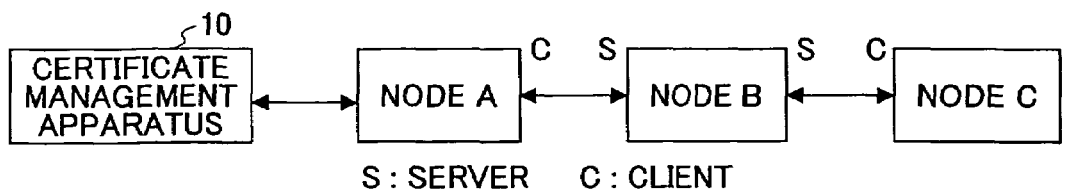

S : SERVER     C : CLIENT

FIG.36A

| NODE A |||
|---|---|---|
| 1 (DIRECT COMMUNICATION) |||
| NODE B | CLIENT ||
| | SERVER AUTHENTICATION ROOT KEY | UPDATE NECESSARY |
| | CLIENT AUTHENTICATION ROOT KEY | UPDATE UNNECESSARY |

FIG.36B

| NODE B |||
|---|---|---|
| 2 |||
| NODE A | SERVER ||
| | CLIENT AUTHENTICATION ROOT KEY | UPDATE UNNECESSARY |
| | SERVER AUTHENTICATION ROOT KEY | UPDATE NECESSARY |
| NODE C | SERVER ||
| | CLIENT AUTHENTICATION ROOT KEY | UPDATE UNNECESSARY |
| | SERVER AUTHENTICATION ROOT KEY | UPDATE NECESSARY |

FIG.36C

| NODE C |||
|---|---|---|
| 3 |||
| NODE B | CLIENT ||
| | SERVER AUTHENTICATION ROOT KEY | UPDATE NECESSARY |
| | CLIENT AUTHENTICATION ROOT KEY | UPDATE UNNECESSARY |

FIG.42

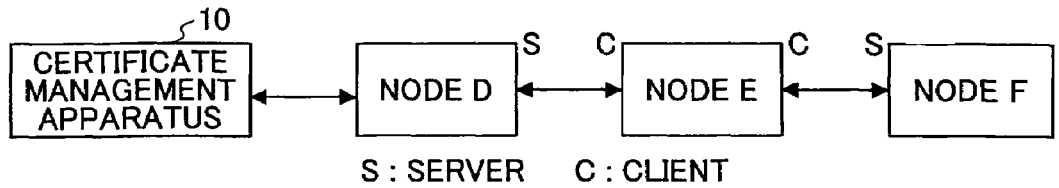

S : SERVER  C : CLIENT

FIG.43A

| NODE D |||
|---|---|---|
| 1 (DIRECT COMMUNICATION) |||
| | SERVER ||
| NODE E | CLIENT AUTHENTICATION ROOT KEY D | UPDATE UNNECESSARY |
| | SERVER AUTHENTICATION ROOT KEY | UPDATE NECESSARY |

FIG.43B

| NODE E |||
|---|---|---|
| 2 |||
| | CLIENT ||
| NODE D | SERVER AUTHENTICATION ROOT KEY | UPDATE NECESSARY |
| | CLIENT AUTHENTICATION ROOT KEY D | UPDATE UNNECESSARY |
| | CLIENT ||
| NODE F | SERVER AUTHENTICATION ROOT KEY | UPDATE NECESSARY |
| | CLIENT AUTHENTICATION ROOT KEY F | UPDATE UNNECESSARY |

FIG.43C

| NODE F |||
|---|---|---|
| 3 |||
| | SERVER ||
| NODE E | CLIENT AUTHENTICATION ROOT KEY F | UPDATE UNNECESSARY |
| | SERVER AUTHENTICATION ROOT KEY | UPDATE NECESSARY |

FIG.45

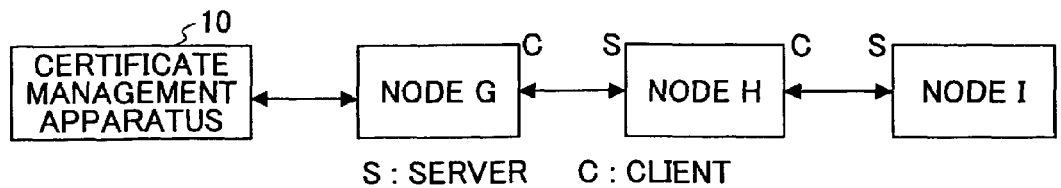

S : SERVER    C : CLIENT

FIG.46A

| NODE G |||
|---|---|---|
| 1 (DIRECT COMMUNICATION) |||
| | CLIENT ||
| NODE H | SERVER AUTHENTICATION ROOT KEY | UPDATE NECESSARY |
| | CLIENT AUTHENTICATION ROOT KEY | UPDATE UNNECESSARY |

FIG.46B

| NODE H |||
|---|---|---|
| 2 |||
| | SERVER ||
| NODE G | CLIENT AUTHENTICATION ROOT KEY | UPDATE UNNECESSARY |
| | SERVER AUTHENTICATION ROOT KEY | UPDATE NECESSARY |
| | CLIENT ||
| NODE I | SERVER AUTHENTICATION ROOT KEY | UPDATE NECESSARY |
| | CLIENT AUTHENTICATION ROOT KEY | UPDATE UNNECESSARY |

FIG.46C

| NODE I |||
|---|---|---|
| 3 |||
| | SERVER ||
| NODE H | CLIENT AUTHENTICATION ROOT KEY | UPDATE UNNECESSARY |
| | SERVER AUTHENTICATION ROOT KEY | UPDATE NECESSARY |

DIGITAL CERTIFICATE MANAGEMENT SYSTEM, DIGITAL CERTIFICATE MANAGEMENT APPARATUS, DIGITAL CERTIFICATE MANAGEMENT METHOD, UPDATE PROCEDURE DETERMINATION METHOD AND PROGRAM

BACKGROUND OF THE INVENTION

1. Field of the Invention

The present invention relates to: a digital certificate management system that manages by a digital certificate management apparatus digital certificates used for authentication processes between one or more clients and one or more servers forming a client server system; a digital certification management apparatus forming such a system; a digital certificate management method of managing digital certificates; an update procedure determination method in a case where an authentication key for verifying a digital certification is updated when managing the digital certificate; and a program for causing a computer to function as the above-mentioned digital certificate management apparatus.

2. Description of the Related Art

Conventionally, client server systems have been constructed in which a plurality of computers such as PCs are connected via a network such that communications can be performed among the computers, and at least one of the computers serves as a server apparatus (server) and at least another one of the computers serves as a client apparatus (client).

In such client server systems, a request is transmitted from the client apparatus to the server apparatus, and the server apparatus carries out a process in accordance with the request and returns the response to the client apparatus. Additionally, such client server systems are widely used for so-called electronic commerce where, for example, the client apparatus transmits an order request of products and the server apparatus receives the order request. Further, systems have been proposed in which various electronic apparatuses are provided with functions of a client apparatus or a server apparatus and connected via a network, and remote management of the electronic apparatuses are performed via communications with each other.

In such a case, it is important to confirm whether a communication party is appropriate or whether transmitted information is altered. Particularly, in the Internet, in many cases, information is transmitted via irrelevant computers until the information reaches the communication party. Hence, in a case where confidential information is transmitted, it is also necessary to prevent the contents of the confidential information from being furtively looked at. A protocol called SSL (Secure Socket Layer), for example, has been developed and widely used as a communication protocol that meets such a demand. By performing communications with the use of the protocol (SSL), it is possible to perform authentication of communication parties by combining the public-key cryptography and the common key cryptography and avoid altering and tapping of information by encrypting the information.

Here, a description is given of a communication procedure in a case where an authentication process is performed by using the public-key cryptography and a digital certificate used in such a case.

First, a description is given of a case where a client apparatus authenticates a server apparatus. In this case, in order to perform an authentication process, a server private key and a server public key certificate (server certificate) are stored in the server apparatus, and a root key certificate for server authentication (server authentication root key certificate) is stored in the client apparatus. The server private key is a private key issued by a certificate authority (CA) with respect to the server apparatus. The server public key certificate is a digital certificate obtained by attaching a digital signature by the CA to a public key corresponding to the server private key. The server authentication root key certificate is a digital certificate obtained by attaching a digital signature by the CA to a server authentication root key, which is a public key for certification (hereinafter also referred to as "certification key") corresponding to a server CA key (root private key for server authentication) that is a private key for certification used for a digital signature with respect to the server public key.

FIGS. 1A and 1B show the above-mentioned relationships.

As shown in FIG. 1A, the server public key is constructed by: a key per se for decrypting a document that is encrypted by using the server private key; and bibliographic information including, for example, a publisher (CA) of the server public key, a party to which the server public key is issued (server apparatus), and the expiration date. In order to indicate that the key per se and the bibliographic information are not altered, the CA encrypts with the use of the server CA key a hash value obtained by performing a hash process on the server public key, and attaches the encrypted hash value to the server public key as a digital signature. Additionally, on this occasion, the CA adds to the bibliographic information of the server public key the identification information of the server CA key, which is used for the digital signature, as signature key information. A public key certificate to which the digital signature is attached is the server public key certificate.

In a case where the server public key certificate is used for an authentication process, the digital signature included therein is decrypted by using the root key for server authentication (server authentication root key), which is a public key corresponding to the server CA key. When the decryption is normally performed, it is determined that the digital signature is surely attached by the CA. Also, when the hash value obtained by performing a hash process on the server public key matches the hash value obtained by the decryption, it is determined that the key per se is not damaged and/or altered. Further, when received data can be normally decrypted by using the server public key, it is determined that the received data are transmitted from the owner of the server public key, i.e., the server apparatus. Then, referring to the bibliographic information, whether to authenticate is determined based on, for example, the reliability of the CA and/or whether the server apparatus is registered.

In order to perform authentication, it is necessary to store in advance the server authentication root key. As shown in FIG. 1B, the server authentication root key is also stored as a server authentication root key certificate obtained by attaching a digital signature by the CA to the server authentication root key. Such a server authentication root key certificate employs a self-signature system in which a digital signature can be decrypted by means of a public key included therein. When using the server authentication root key, the digital signature is decrypted by using the public key included in the server authentication root key certificate, and is compared with a hash value obtained by performing a hash process on the server authentication root key. When the decrypted digital signature matches the hash value, it is possible to confirm that the server authentication root key is not damaged, for example.

When the client apparatus requests the server apparatus for communications in the client/server system constructed by the client apparatus and the server apparatus as mentioned above, each of the client apparatus and the server apparatus performs processes as follows.

First, the server apparatus generates a random number in response to a communication request from the client apparatus, encrypts the random number with the server private key, and transmits the encrypted random number and the server public key certificate to the client apparatus.

Upon reception of the encrypted random number and the server public key certificate, the client apparatus verifies the received server public key certificate by using the root key certificate. This verification includes a process of confirming that the server apparatus is an appropriate communication party by referring to the bibliographic information as well as the process of confirming that the server public key is not damaged and/or altered as mentioned above.

When verified, the received random number is decrypted by using the server public key included in the received server public key certificate. When the decryption succeeds, it is possible to confirm that the first random number is surely received form the server apparatus to which the server public key certificate is issued. Accordingly, with the above-mentioned processes, it is possible to verify the server apparatus as an appropriate communication party.

In addition, by exchanging a key of a common key encryption by encrypting with the use of the above-mentioned public key and the private key, it is possible to safely exchange a common key and establish a safe communication channel in which the contents of communications are encrypted by the common key encryption.

In contradiction to the above-mentioned case, it is also conceivable that the server apparatus authenticates the client apparatus.

In this case, in order to perform an authentication process, a client private key and a client public key certificate (client certificate) are stored in the client apparatus, and a root key certificate for client authentication (client authentication root key certificate) is stored in the server apparatus. The client private key is a private key issued by the CA with respect to the client apparatus. The client public key certificate is a digital certificate obtained by attaching a digital signature by the CA to a public key corresponding to the client private key. The client authentication root key certificate is a digital certificate obtained by attaching a digital signature by the CA to a client authentication root key, which is a certification key corresponding to a CA key for client authentication (client authentication CA key) that is a private key for certification used for a digital signature with respect to the client public key.

Even in a case where the server apparatus authenticates the client apparatus, only the positions of the server apparatus and the client apparatus are reversed from the case where the client apparatus authenticates the server apparatus. Thus, the functions and structure of each key and certificate are similar to those mentioned above. By using the above-mentioned keys and certificates, it is possible to perform authentication similar to that in the above-mentioned case in a procedure of: encrypt a random number with the private key→transmit the encrypted random number together with the public key certificate→verify, by a receiving apparatus, the public key certificate by using the root key certificate→decrypt the random number by using the public key included in the public key certificate.

Further, by combining the above-mentioned two-way authentication processes, it is possible to perform mutual authentication in which the server apparatus and the client apparatus authenticates each other.

It should be noted that it is not always necessary that the server CA key and the client authentication CA key are different, and the server authentication root key certificate and the client authentication root key certificate are different. Additionally, when generically referring to a key for server authentication and that for client authentication, such a key is simply referred to as, for example, "the CA key", "the root key", and "the root key certificate".

In the public-key cryptography, though it depends on the key length, a private key may be obtained from a public key if time is taken. Once the private key is known, it is possible for a third party to pose as the owner of the private key. Thus, the reliability of authentication and security of communications are not maintained. Therefore, more and more users are adopting a security policy that sets expiration dates for keys and the set of the keys are updated at predetermined intervals. Hence, when providing, for example, the above-mentioned remote management system using mutual authentication, it is becoming necessary to guarantee to customers that the system is capable of updating the keys. The same applies to root keys and CA keys. In addition to the coming of a predetermined expiration date, reasons for updating the keys may be, for example, a case where disclosure of a private key to a third party is proved.

A technique related to updating of keys is disclosed in Japanese Laid-Open Patent Application No. 11-122238, for example.

However, in Japanese Laid-Open Patent Application No. 11-122238, though there is a description relating to updating of a key issued for each apparatus, there is no description of updating of a root key.

In the case of the public-key cryptography, in order to update a pair of keys issued to each apparatus, a new public key certificate corresponding to a new private key is stored in the apparatus. By giving the new public key certificate to a communication party, it is possible to perform the authentication process shown in FIG. 5.

However, when updating a root key, it is impossible to decrypt, by a new root key, a digital signature attached to a previous digital certificate. Hence, a problem may occur when carrying out the authentication process shown in FIG. 5 unless a public key certificate for each apparatus is created again by using a new CA key corresponding to a new root key and the created public key certificate is distributed (however, it is not always necessary to update the private key of each apparatus).

Additionally, since a method has not been known for updating a root key without causing a problem for the authentication process, it has been impossible to safely transmit the root key via a network to an apparatus that needs updating of the root key. For this reason, it has been necessary to deliver a root key certificate and/or a new public key certificate to each apparatus via another safe route.

An example of such a route is registered mail. It is conceivable to send to an administrator of an apparatus a recording medium such as a memory card or a flexible disk recording data of a certificate and update a key of the apparatus by the administrator. However, this method is applicable only when there is an administrator with sufficient knowledge about each of a client apparatus and a server apparatus. Additionally, the CA has to trust the administrator of an apparatus with respect to processes after the recording medium is delivered. Thus, there has been a problem in that the authentication process cannot be performed in a case where the administrator fails to perform or erroneously performs updating processes.

On the other hand, the administrator has to determine whether the received certificate is valid or not by trusting, for example, the name of a sender on an envelope or data. Thus, there is always a risk that a false certificate, which is received from a person under a false name of the CA, is stored in an apparatus.

In addition, it is conceivable to update a key by sending a service person from the CA or a provider of service of a client server system to a location where each apparatus is installed. However, in order to adopt such a system in a wide area, a lot of service centers are required, which results in an increase in costs. Also, there are problems such as education of service persons, prevention of fraud by service persons, and management of administrator's IDs for updating operations. For example, when a simple method of manually inputting authentication information is to be adopted, in order to cancel the updating authority of a retired service person, it is necessary to change the authentication information stored in each apparatus. However, it is difficult to perform such a changing operation on a large number of apparatuses installed in a customer place.

After all, there is no choice but to trust human beings for ensuring a safe delivering route of a certificate without using a network, which leaves room for fraud. Additionally, though it is possible to perform management to make the room for fraud small, enormous costs are required for such management. Thus, it has been impractical to build a route that eliminates consideration of the risk of fraud for delivering certificates.

In addition, as for a special communication channel for updating, it is conceivable to prepare a communication channel using a digital certificate for updating process and a root key certificate for updating process, which are different from the digital certificate and the root key certificate used in normal communications. However, in a case where the client apparatus authenticates the server apparatus, such a method has a problem.

That is, in this case, the server apparatus transmits the digital certificate to the client apparatus when there is a connection request from the client apparatus. However, in a case where the server apparatus may receive connection requests from unspecified number of client apparatuses at arbitrary timings, it is difficult for the server apparatus to appropriately determine what digital certificates (that is, whether the digital certificate for normal communications or the digital certificate for updating process) are to be transmitted to the client apparatuses.

It is conceivable that the server apparatus determines what digital certificates are to be transmitted to the client apparatuses by using a session identifier at the time of the communication request, such as a source end-point identifier, a destination end-point identifier, and a URL (Uniform Resource Locator). However, in order to perform such determination, it is necessary to provide in the client apparatuses a function of switching the session identifier (e.g., URL) depending on whether communications are normal communications or communications for updating, and provide in the server apparatus a function of managing a corresponding relationship between the source end-point identifier and a digital certificate to be transmitted. Providing such functions results in an increase in costs.

Accordingly, there has been a demand to avoid providing in the server apparatus a function of selecting a digital certificate to be transmitted to the client apparatus based on information (e.g., the session identifier) before starting communications. In addition, there is a problem in that, if two kinds of communication channels are provided by using the same protocol, in a case where authentication fails, it is difficult to determine whether the failure is caused by an abnormality in the digital certificate or an error in the session identifier.

As mentioned above, providing a special communication channel for root key updating results an increase in costs and loads for management. Thus, there has been a demand to safely update the root key without providing such a special communication channel.

SUMMARY OF THE INVENTION

A general object of the present invention is to provide an improved and useful digital certificate management system, digital certificate management apparatus, digital certificate management method, update procedure determination method and program in which one or more of the above-mentioned problems are eliminated.

Another and more specific object of the present invention is to safely update a certification key used for verifying a digital certificate in an authentication process in a client/server system without providing a special communication channel for updating.

In order to achieve the above-mentioned objects, according to one aspect of the present invention, there is provided a digital certificate management system in which a client/server system constructed by one or more clients and one or more servers is connected to a digital certificate management apparatus capable of communicating with each of the clients and each of the servers, mutual authentication being performed between the clients and the servers by using digital certificates in the client/server system and communications being performed over a communication channel established based on the mutual authentication, wherein the digital certificate management apparatus includes:

a certification key update part updating a server certification key that is a certification key for verifying a server certificate that is one of the digital certificates, used for the mutual authentication by each of the servers, and stored in each of the clients that becomes a communication party of one of the servers, the server certification key being different from a client certification key that is a certification key for verifying a client certificate that is another one of the digital certificates, used for the mutual authentication by each of the clients, and stored in each of the servers that becomes a communication party for one of the clients, the certification key updating part including:

a key obtaining part obtaining a new server certification key for updating;

a certificate obtaining part obtaining a new server certificate that is used by each of the servers for the mutual authentication and can be verified by using the new server certification key;

a first transmission part transmitting the new server certification key to each of the clients; and a second transmission part transmitting, to each of the servers, the new server certificate of the server, the second transmission part performing an operation of transmitting the new server certificate to each of the servers after there are responses, indicating that the new server certification key is received, from all of the clients that become communication parties of the server.

Additionally, according to another aspect of the present invention, there is provided a digital certificate management apparatus that can communicate with one or more clients and one or more servers constructing a client/server system, performing mutual authentication by using digital certificates, and performing communications via a communication channel established based on the mutual authentication, said digital certificate management apparatus including:

a certification key update part updating a server certification key that is a certification key for verifying a server certificate that is one of the digital certificates, used for the mutual authentication by each of the servers, and stored in each of the clients that becomes a communication party of one of the servers, the server certification key being different from a client certification key that is a certification key for verifying a client certificate that is another one of the digital certificates, used for the mutual authentication by each of the clients, and stored in each of the servers that becomes a communication party for one of the clients, the certification key updating part including:

a key obtaining part obtaining a new server certification key for updating;

a certificate obtaining part obtaining a new server certificate that is used by each of the servers for the mutual authentication and can be verified by using the new server certification key;

a first transmission part transmitting the new server certification key to each of the clients; and a second transmission part transmitting, to each of the servers, the new server certificate of the server, and the second transmission part performing an operation of transmitting the new server certificate to each of the servers after there are responses, indicating that the new server certification key is received, from all of the clients that become communication parties of the server.

Additionally, according to another aspect of the present invention, there is provided a digital certificate management method that manages digital certificates used for mutual authentication performed when establishing a communication channel between one or more clients and one or more servers constructing a client/server system by a digital certificate management apparatus capable of communicating with each of the clients and each of the servers, wherein the digital certificate management apparatus updates a server certification key that is a certification key for verifying a server certificate that is one of the digital certificates, used for the mutual authentication by each of the servers, and stored in each of the clients that becomes a communication party of one of the servers, the server certification key being different from a client certification key that is a certification key for verifying a client certificate that is another one of the digital certificates, used for the mutual authentication by each of the clients, and stored in each of the servers that becomes a communication party for one of the clients, wherein updating of the server certification key includes the steps of:

obtaining a new server certification key for updating;

obtaining a new server certificate that is used by each of the servers for the mutual authentication and can be verified by using the new server certification key;

transmitting the new server certification key to each of the clients; and transmitting, to each of the servers, the new server certificate of the server, wherein the updating is performed in accordance with a procedure in which the step of transmitting the new server certificate to each of the servers is performed after there are responses, indicating that the new server certification key is received, from all of the clients that become communication parties of the server.

Additionally, according to another aspect of the present invention, there is provided an update procedure determination method that, in a client/server system constructed by nodes (one or more clients and one or more servers) that perform communications with each other over a communication channel established based on mutual authentication using digital certificates, determines an update procedure for updating, by a digital certificate management apparatus capable of communicating with each of the nodes, a key that is a certification key for verifying a digital certificate used for the mutual authentication by each of the nodes constructing the client/server system, and stored in each of the nodes that become communication parties of the node, wherein the digital certificate management apparatus determines the update procedure such that the update procedure includes a step of transmitting a new certification key for updating and/or a new certificate to each of the nodes that are target nodes and performing mutual authentication using a certification key to be updated based on information of each of the nodes, the information including a communication party of the node, whether the node functions as a client or a server with respect to the communication party, and a certification key used when performing the mutual authentication with the communication party, wherein, when determining the update procedure, a step of creating an order to perform the step of transmitting the new certification key for updating and/or the new certificate on each of the nodes that are the target nodes is performed, and wherein, in the step of creating the order, one of the nodes that are the target nodes is first added to the order, each node that is added to the order is then sequentially taken as a node of notice, and when there is a node that is a communication party performing mutual authentication using the certification key to be updated with the node of notice and is not added to the order, it is determined for each communication party whether the node of notice functions as a client or a server when communicating with the communication party, and when the node of notice functions as the client, the communication party is added to the order such that the communication party is later than the node of notice, and when the node of notice functions as the server, the communication party is added to the order such that the communication party is earlier than the node of notice.

Additionally, according to another aspect of the present invention, there is provided a program for causing a computer that controls a digital certificate management apparatus capable of communicating with one or more clients and one or more servers constructing a client/server system, performing mutual authentication using digital certificates, and performing communications over a communication channel established based on the mutual authentication to function as:

a certification key update part updating a server certification key that is a certification key for verifying a server certificate that is one of the digital certificates, used for the mutual authentication by each of the servers, and stored in each of the clients that becomes a communication party of one of the servers, the server certification key being different from a client certification key that is a certification key for verifying a client certificate that is another one of the digital certificates, used for the mutual authentication by each of the clients, and stored in each of the servers that becomes a communication party for one of the clients, wherein the certification key updating part includes:

a key obtaining part obtaining a new server certification key for updating;

a certificate obtaining part obtaining a new server certificate that is used by each of the servers for the mutual authentication and can be verified by using the new server certification key;

a first transmission part transmitting the new server certification key to each of the clients; and a second transmission part transmitting, to each of the servers, the new server certificate of the server, and the second transmission part performs an operation of transmitting the new server certificate to each of the servers after there are responses, indicating that the new server certification key is received, from all of the clients that become communication parties of the server.

With a digital certificate management system, a digital certificate management apparatus, a digital certificate management method, an update procedure determination method and a program according to the present invention, it is possible to safely update a public key for authentication used for verifying a digital certificate in an authentication process in a client/server system without providing a special communication channel for updating.

With an update procedure determination method according to the present invention, it is possible to determine an appropriate procedure of an updating process for updating a certification key as mentioned above. Thus, by causing a suitable apparatus to perform the updating process in accordance with the procedure, it is possible to obtain effects similar to those mentioned above.

Further, with a program according to the present invention, it is possible to cause a computer to control a digital certificate management apparatus so as to realize a digital certificate management apparatus according to the present invention, and obtain effects similar to those mentioned above.

Other objects, features and advantages of the present invention will become more apparent from the following detailed description when read in conjunction with the following drawings.

BRIEF DESCRIPTION OF THE DRAWINGS

FIGS. 1A and 1B are schematic diagrams for explaining relationships among a root key, a CA key, and a client public key in the authentication process shown in FIG. 5;

FIGS. 30A, 30B and 30C are tables showing a case where the information of the server apparatus 30 and the client apparatus 40-1 shown in FIG. 28 is described in the format shown in FIG. 29;

FIGS. 34A, 34B and 34C are tables showing a case where the information of the client apparatus 40 and the server apparatus 30-1 is described in the format shown in FIG. 29;

FIG. 35 is a block diagram showing relationships among apparatuses constructing the digital certificate management system according to a seventh embodiment of the present invention;

FIGS. 36A, 36B and 36C are tables showing a case where the information of each of the nodes shown in FIG. 33 is described in the format shown in FIG. 29;

FIG. 42 is a block diagram showing relationships among apparatuses constructing the digital certificate management system according to an eighth embodiment of the present invention;

FIGS. 43A, 43B and 43C are tables showing a case where the information of each of the nodes shown in FIG. 42 is described in the format shown in FIG. 29;

FIG. 45 is a block diagram showing relationships among apparatuses constructing the digital certificate management system according to a ninth embodiment of the present invention;

FIGS. 46A, 46B and 46C are tables showing a case where the information of each of the nodes shown in FIG. 45 is described in the format shown in FIG. 29;

DETAILED DESCRIPTION OF THE PREFERRED EMBODIMENTS

Preferred embodiments of the present invention are described below with reference to the drawings.

First Embodiment

FIGS. 3 through 11C

Figure 2:
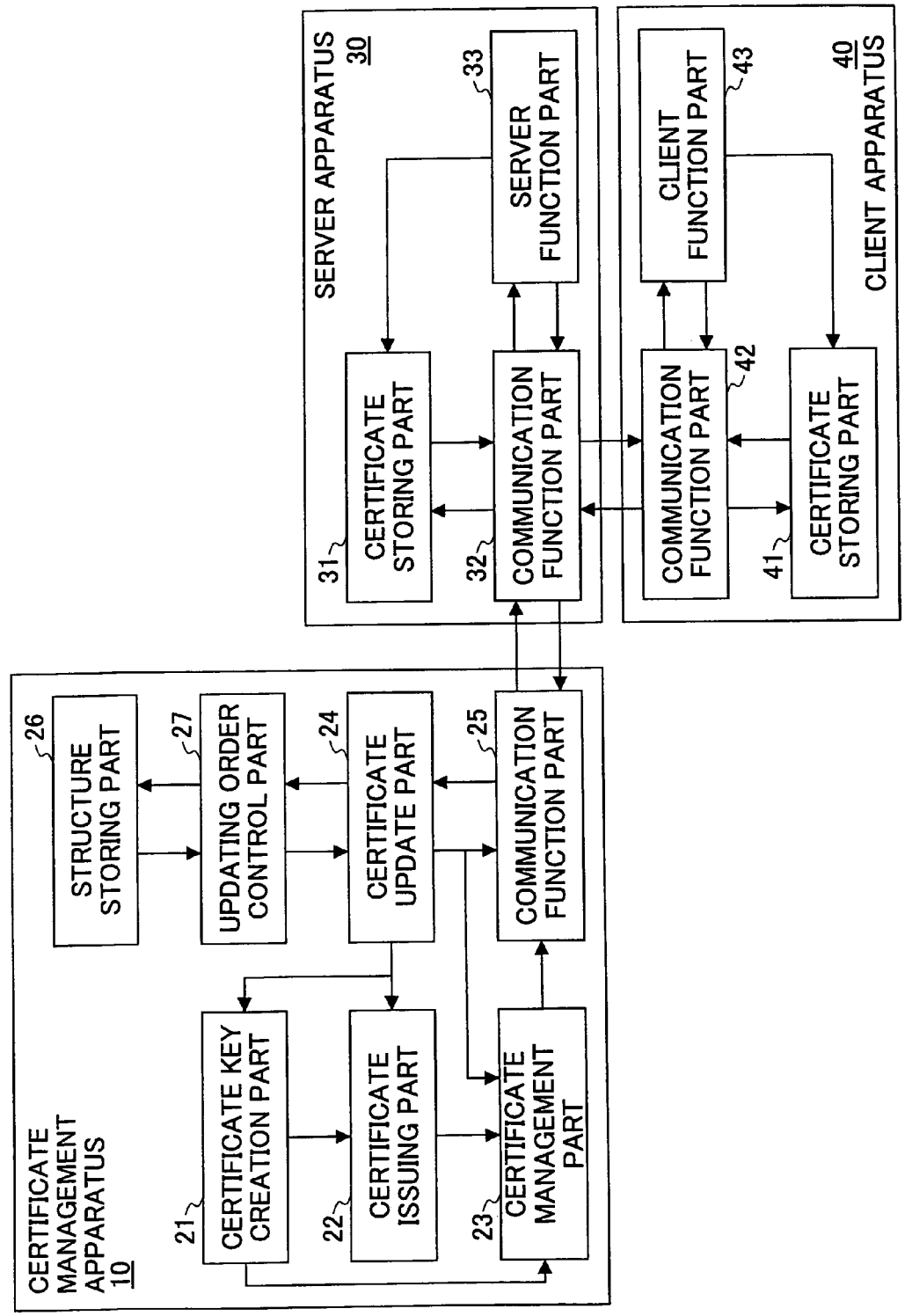
FIG. 2 is a functional block diagram showing the functional structures of apparatuses constructing the digital certificate management system according to a first embodiment of the present invention.

First, a description is given below of a digital certificate management system according to a first embodiment of the present invention constructed by a certificate management apparatus, which is a digital certificate management apparatus, and a client and a server constructing a client/server system. In this embodiment, the client/server system is constructed by one client and one server, and this embodiment represents an example in which the present invention is applied to a most basic system. FIG. 2 is a functional block diagram showing the functional structure of a part of each apparatus constructing the digital certificate management system.

As shown in FIG. 2, the digital certificate management system is constructed by the certificate management apparatus 10, a server apparatus 30, and a client apparatus 40.

The client apparatus (client) 40 and the server apparatus (server) 30 mutually establish communications in a case where the client apparatus 40 and the server apparatus 30 mutually authenticate each other as valid communication parties by mutual authentication according to the SSL, which is an authentication system using public key encryption and digital certificates. This authentication may be whether mutual authentication in which the client apparatus 40 and the server apparatus 30 authenticate each other or one-way authentication in which one of the client apparatus 40 and the server apparatus 30 authenticates the other. However, here, a description is given of the case where mutual authentication is performed. The server apparatus 30 performs a required process in response to a request transmitted from the client apparatus 40 and returns the response. Thereby, the client 40 and the server apparatus 30 function as a client/server system. The certificate management apparatus 10 issues a digital certificate used for the mutual communications, and is an apparatus for, e.g., managing and updating the digital certificate. The certificate management apparatus 10 corresponds to a CA.

In an actual system, it is conceivable that the server 30 includes functions of a client and the client apparatus 30 includes functions of a server. Additionally, it is also conceivable that the server apparatus 30 functions as a client and transmits a request to the client apparatus 40 that functions as a server. In such cases, an operation according to a third embodiment of the present invention, which is described later, may be performed. Accordingly, here, it is assumed that an apparatus that functions as a server in a root key updating process, which is described later, is referred to as a server apparatus, and an apparatus that functions as a client in the root key updating process is referred to as a client apparatus.

In such a digital certificate management system, each node, i.e., the certificate management apparatus 10, the server apparatus 30, and the client apparatus 40, can transmit by RPC (remote procedure call) a "request", which is a request for a process with respect to a method of a mutually installed application program, including the above-mentioned transmission from the client apparatus 40 to the server apparatus 30, and obtain a "response", which is a result of the requested process.

That is, the server apparatus 30 and the client apparatus 40 can each generate a request to the certificate management apparatus 10, deliver the request to the certificate management apparatus 10, and obtain the response to the request. On the other hand, the certificate management apparatus 10 can generate a request to the client/server system, deliver the request to the server apparatus 30, and obtains the response to the request. The request includes transmission of various requests from the client apparatus 40 to the server apparatus 30, and obtaining of responses from the client apparatus 40 via the server apparatus 30.

In order to realize the RPC, known protocols (communication standards) such as SOAP (Simple Object Access Protocol), HTTP (Hyper Text Transfer Protocol), FTP (File Transfer Protocol), COM (Component Object Model), and CORBA (Common Object Request Broker Architecture), and known techniques and specifications may be used.

Figure 3A:
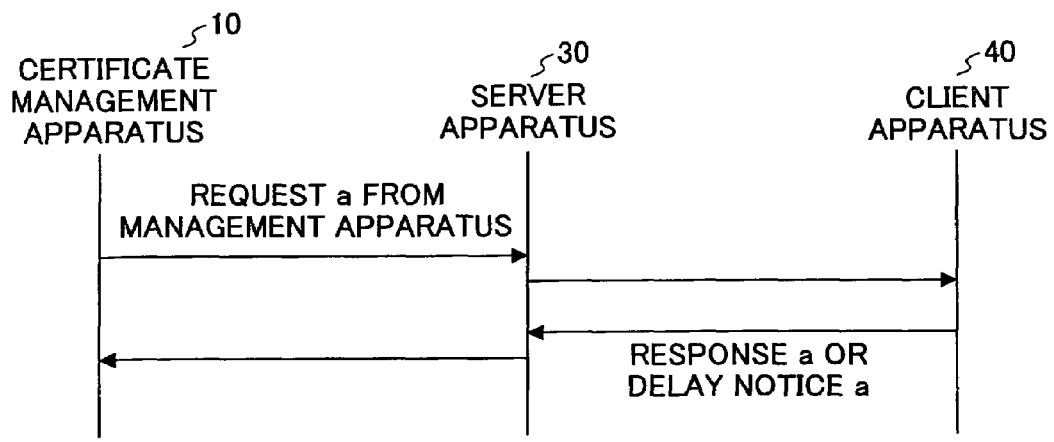
FIGS. 3A and 3B are sequence diagrams showing data transmission/reception models in the digital certificate management system shown in FIG. 2.
Figure 3B:
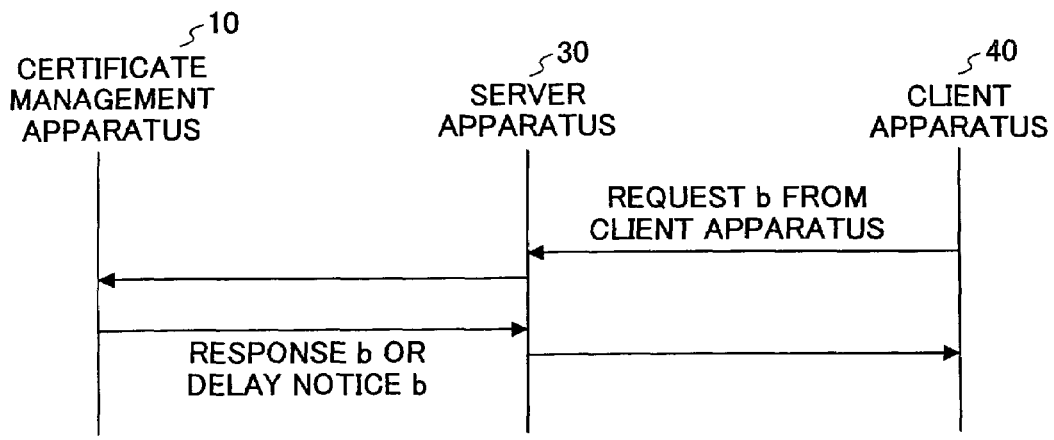

FIGS. 3A and 3B are conceptual diagrams of data reception/transmission models.

FIG. 3A shows a case where a request to the client apparatus 40 is issued in the certificate management apparatus 10. In this case (model), the certificate management apparatus 10 generates a request a from management apparatus, and the client apparatus 40, which receives the request a via the server apparatus 30, returns the response a with respect to the request. FIG. 3A also shows a case where not the response but a response delay notice a is returned. This is because, in a case where the client apparatus 40 receives the request a from management apparatus via the server apparatus 30 and determines that it is impossible to immediately return the response a with respect to the request a, the client apparatus 40 issues the response delay notice a, temporarily disconnects the connecting state, and later delivers the response a with respect to the request a in the next connection.

Additionally, here, the server apparatus 30 cannot request for communications with respect to the client apparatus 40. Thus, a request that should be transmitted from the server apparatus 30 to the client apparatus 40 is transmitted as the response with respect to a connection request from the client apparatus 40 to the server apparatus 30, when there is such a connection request.

FIG. 3B shows a case where a request to the certificate management apparatus 10 is issued in the client apparatus 40. In this case (model), the client apparatus 40 generates a request b of client apparatus, and the certificate management apparatus 10, which receives the request b via the server apparatus 30, returns a response b with respect to the request b. It should be noted that, also in the case of FIG. 3B, a response delay notice b is returned when it is impossible to immediately return the response b with respect to the request b, as in the case of FIG. 3A.

Next, a more detailed description is given below of the structure and functions of each apparatus constructing the digital certificate management system.

Figure 4:
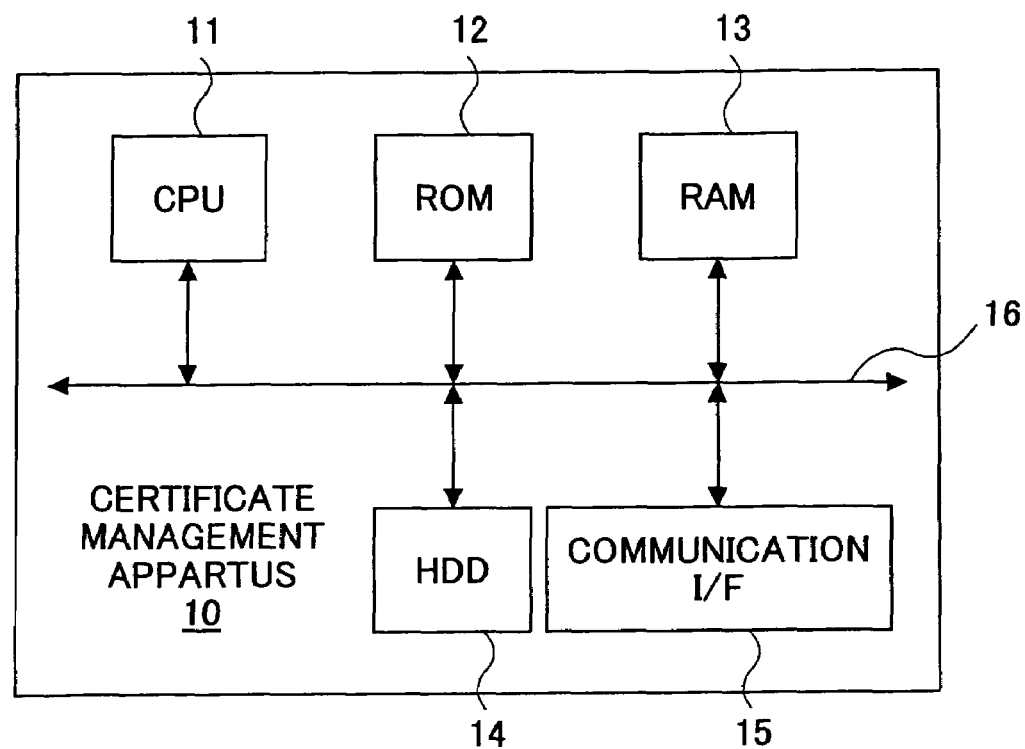
FIG. 4 is a block diagram showing the hardware structure of a certificate management apparatus according to one embodiment of the digital certificate management apparatus of the present invention.

FIG. 4 is a block diagram showing the hardware structure of the certificate management apparatus 10 shown in FIG. 2. As shown in FIG. 4, the certificate management apparatus 10 includes a CPU 11, a ROM 12, a RAM 13, a HDD 14, and a communication interface (I/F) 15, which are connected via a system bus 16. The CPU 11 executes various control programs stored in the ROM 12 and the HDD 14, thereby controlling the operation of the certificate management apparatus 10 and causing the certificate management apparatus 10 to function as each of the means according to the present invention (certification key updating means, structure storing means, update order control means, first transmission means, second transmission means, and other means) as described below.

In addition, a known computer may be appropriately used as the hardware of the certificate management apparatus 10. Of course, other hardware may be added according to need.

Various structures may be used for the client apparatus 40 and the server apparatus 30, which construct the client/server system, in accordance with the objects such as remote management of the apparatuses and electronic commerce. For example, in a case of remote management, it is conceivable to use as the server apparatus 30, which is an apparatus to be managed (managed apparatus), an electronic apparatus such as a network-connected home appliance, an automatic vending machine, a medical instrument, power supply equipment, an air conditioning system, a measuring system of, for example, gas, water, or electricity, including an image processing apparatus such as a printing apparatus, a facsimile apparatus, a copying machine, a scanner and a digital multi-function apparatus, and to use as the client apparatus 40 a management apparatus that collects information from the managed apparatus and operate the managed apparatus by transmitting commands.

It is assumed that each of the server apparatus 30 and the client apparatus 40 includes at least a CPU, a ROM, a RAM, a communication I/F for communicating with an external apparatus via a network, and storing means for storing information required for an authentication process; and the apparatus can be caused to function as a client or a server by executing a predetermined program stored in, for example, the ROM by the CPU.

Further, whether wire or radio, various communication lines (communication channels) that can construct a network may be used for the communications. The same applies to communications with the certificate management apparatus 10.

As mentioned above, FIG. 2 shows the functional structure of the part of each apparatus.

First, the certificate management apparatus 10 includes a certification key creation part 21, a certificate issuing part 22, a certificate management part 23, a certificate update part 24, a communication function part 25, a structure storing part 26, and an update order control part 27.

The certification key creation part 21 includes functions of certification key creation means, which creates: a CA key, which is a private key for certification used for creating a digital signature; and a root key, which is a public key (certification key) for certification corresponding to the CA key.

The certificate issuing part 22 includes functions of certificate issuing means, which issue a client public key certificate and a server public key certificate, which are digital certificates, by attaching a digital signature to a client public key and a server public key, which are authentication information used for an authentication process between the server apparatus 30 and the client apparatus 40. In addition, the certificate issuing part 22 also includes functions of creating a client public key, a client private key, a server public key and a server private key, and creating a root key certificate, which is a digital certificate obtained by attaching a digital signature to a root key.

The certificate management part 23 includes functions of certificate management means, which manage the digital certificate issued by the certificate issuing part 22, a CA key used for creating the digital certificate, and a root key corresponding to the CA key. The certificate and keys are stored together with information such as the expiration date, a party to which the certificate and/or keys are issued, an ID, and whether the certificate and/or keys are updated. Further, the identification information of the CA key used for creating a digital certificate may be stored for each digital certificate.

The certificate update part 24 includes functions of certification key updating means, which cause the certification key creation part 21 to create and update a new CA key and a new root key corresponding to the new CA key for each valid CA key. In addition, the certificate update part 24 also includes functions of: causing, upon the creation, the certificate issuing part 22 to issue, for example, a new server public key certificate, which is obtained by attaching a digital signature to a server public key by using a new server CA key, a server authentication root key certificate for confirmation, which is obtained by attaching a digital signature to a new server authentication root key by using a client authentication root key, and a new root key certificate to which a digital signature is attached by using a corresponding new CA key; causing the communication function part 25 to transmit the above-mentioned certificates to the server apparatus 30 and the client apparatus 40; and causing the server apparatus 30 and the client apparatus 40 to request updating of the certificates. Further, the update order control part 27 manages the procedure and progress of each process required for updating, a detailed description of which is given below.

The communication function part 25 includes functions of communicating with an external apparatus via a network, transmits necessary data to the server apparatus 30 and/or the client apparatus 40 in accordance with an instruction from the certificate management part 23, and delivers received data to the certificate update part 24.

The structure storing part 26 includes functions of structure storing means, which store, for each of the nodes (here, the server apparatus 30 and the client apparatus 40) constructing the client/server system in which the certificate management apparatus 10 manages digital certificates, information of at least a communication party of the node and whether the node functions as a client or a server with respect to the communication party. Here, further, information of a private key, a public key certificate, and the ID of a root key certificate used for mutual authentication by each node, and update states of the keys and certificate are also stored.

The update order control part 27 functions as update order control means, which, in a case where updating of a root key is required, determines an update procedure of a key and/or a certificate by the certificate update part 24 based on the information stored in the structure storing part 26, causes the certificate update part 24 to perform an updating operation, and controls the certificate update part 24. In addition, such a determination (creation) process of an update procedure is a process according to an update procedure determination method of the present invention. The same applies to the determination processes of an update procedure, which are described in each of the following embodiments.

The functions of each of the above-mentioned parts are realized by the CPU 11 shown in FIG. 4 by executing a predetermined control program and controlling the operation of each part of the certificate management apparatus the certificate management apparatus 10.

On the other hand, the server apparatus 30 includes a certificate storing part 31, a communication function part 32, and a server function part 33.

Figure 5:
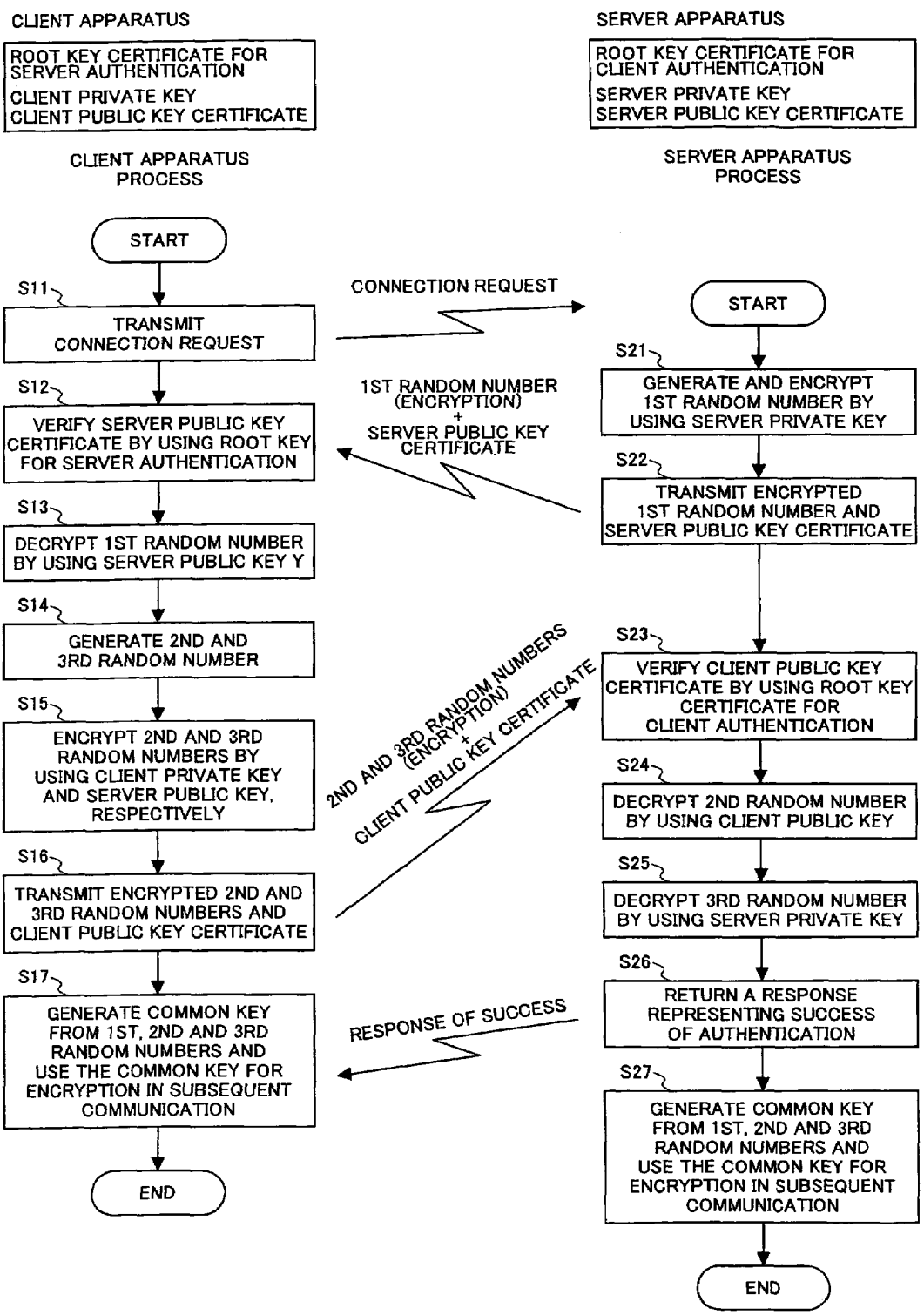
FIG. 5 is a schematic diagram showing flowcharts of processes, which are performed by a client apparatus and a server apparatus when the client apparatus and the server apparatus perform mutual authentication according to the SSL, together with information used in the processes.

The certificate storing part 31 includes functions of storing a key used for mutual authentication according to the SSL, and stores a root key certificate for client authentication (client authentication root key certificate), a server private key, and a server public key certificate, which are shown in FIG. 5.

The communication function part 32 includes functions of communicating with an external apparatus via a network, delivers received data to the server function part 33, and transmits data to the external apparatus in accordance with an instruction from the server function part 33.

The server function part 33 includes functions as a server that performs a predetermined process in response to a request received from the client apparatus 40 and returns the response thereto. In addition, the server function part 33 also returns the response by performing a predetermined process with respect to a request for, e.g., updating of a certificate, which request is received from the certificate management apparatus 10.

The functions of each of the above-mentioned parts are realized by the CPU of the server apparatus 30 by executing a predetermined program and controlling the operation of each of the parts.

The client apparatus 40 includes a certificate storing part 41, a communication function part 42, and a client function part 43.

The certificate storing part 41 includes functions of storing a key used for mutual authentication according to the SSL, and stores a root key certificate for server authentication (server authentication root key certificate), a client private key, and a client public key certificate, which are shown in FIG. 5.

The communication function part 42 includes functions of communicating with an external apparatus via a network, delivers received data to the client function part 43, and transmits data to the external apparatus in accordance with an instruction from the client function part 43.

The client function part 43 includes functions as a client that transmits a predetermined request to the server apparatus 30, which transmission is triggered by, for example, an operation by a user, a change in the state detected by a sensor (not shown), or elapse of a predetermined time interval measured by a timer (not shown). In a case where the response to the request is received from the server apparatus 30, the client function part 43 functions as a client that performs a process in accordance with the contents of the response. Further, in a case where a request for, e.g., updating of a certificate is received as the response from the certificate management apparatus 10, the client function part 43 performs a predetermined process and returns a response, a detailed description of which is described later.

The functions of each of the above-mentioned parts are realized by the CPU of the client apparatus 40 by executing a predetermined program and controlling the operation of each of the parts.

It is assumed that, in the digital certificate management apparatus, the certificate management apparatus 10 can directly communicate only with the server apparatus 30 among the apparatuses constructing the client/server system, and a request from the certificate management apparatus 10 to the client apparatus 40 is transmitted via the server apparatus 30. The same applies to a response from the client apparatus 40 to the certificate management apparatus 10.

Additionally, it is assumed that first root keys are stored in advance in the server apparatus 30 and the client apparatus 40 at the time of factory shipment or the time close to the factory shipment, in other words, at least before the user starts operation of a mutual authentication process. On this occasion, a public key certificate and a private key may also be stored.

Next, a description is given below of a root key updating process, which is a process related to the present invention, in the digital certificate management system shown in FIG. 2 having the basic functions as mentioned above, and a structure required for the root key updating process. In this embodiment, a root key for server authentication (server authentication root key) stored in the server apparatus 30 is updated. Thus, here, this process is explained.

It is assumed that, with respect to a communication process between the server apparatus 30 and the client apparatus 40 shown in sequence diagrams used in the following description, a mutual authentication process according to the SSL, which is described above in the prior art with reference to FIG. 5, is performed before establishing communications, and data are transferred over the communication channel ensured by the SSL only when authentication succeeds. In the present invention, it is possible to update a root key certificate without affecting the mutual authentication process. The same applies to the following embodiments.

In addition, here, communications between the certificate management apparatus 10 and the server apparatus 30 are performed via a communication channel that can ensure safety (free from falsification and/or tapping of data) such as a dedicated line.

Here, first, referring to FIG. 5, a description is given below of a communication procedure in a case where mutual (two-way) authentication is performed by using the SSL.

FIG. 5 shows flowcharts for explaining processes carried out by a client apparatus and a server apparatus when the client apparatus and the server apparatus perform mutual authentication according to the SSL, and showing information used for the processes.

As shown in FIG. 5, when performing mutual authentication according to the SSL, first, a root key certificate for server authentication, a client private key, and a client public key certificate (client certificate) are stored in the client apparatus 40. A root key certificate for client authentication, a server private key, and a server public key certificate (server certificate) are stored in the server apparatus 30.

Among the above-mentioned keys, the client private key is a private key issued by the certificate management apparatus 10 to the client apparatus 40. The client public key certificate is a digital certificate issued by the certificate management apparatus 10 by attaching a digital signature to the public key corresponding to the private key. The root key certificate for client authentication (client authentication root key certificate) is a digital certificate issued by the certificate management apparatus 10 by attaching a digital signature to a root key for client authentication, which is a certification key corresponding to the client authentication CA key that is the private key for certification used for the digital signature.

In addition, the server private key and the server public key certificate are a private key and a public key certificate that are issued by the certificate management apparatus 10 to the server apparatus 30. The server authentication root key certificate is a digital certificate issued by the certificate management apparatus 10 by attaching a digital signature to the server authentication root key, which is a certification key corresponding to the server CA key that is a private key for certification used for the digital signature with respect to the server public key.

That is, here, the certificate management apparatus 10 issues to the server apparatus 30 and the client apparatus 40 the public key certificates to which a digital signature is attached by using different CA keys.

Figure 1B:
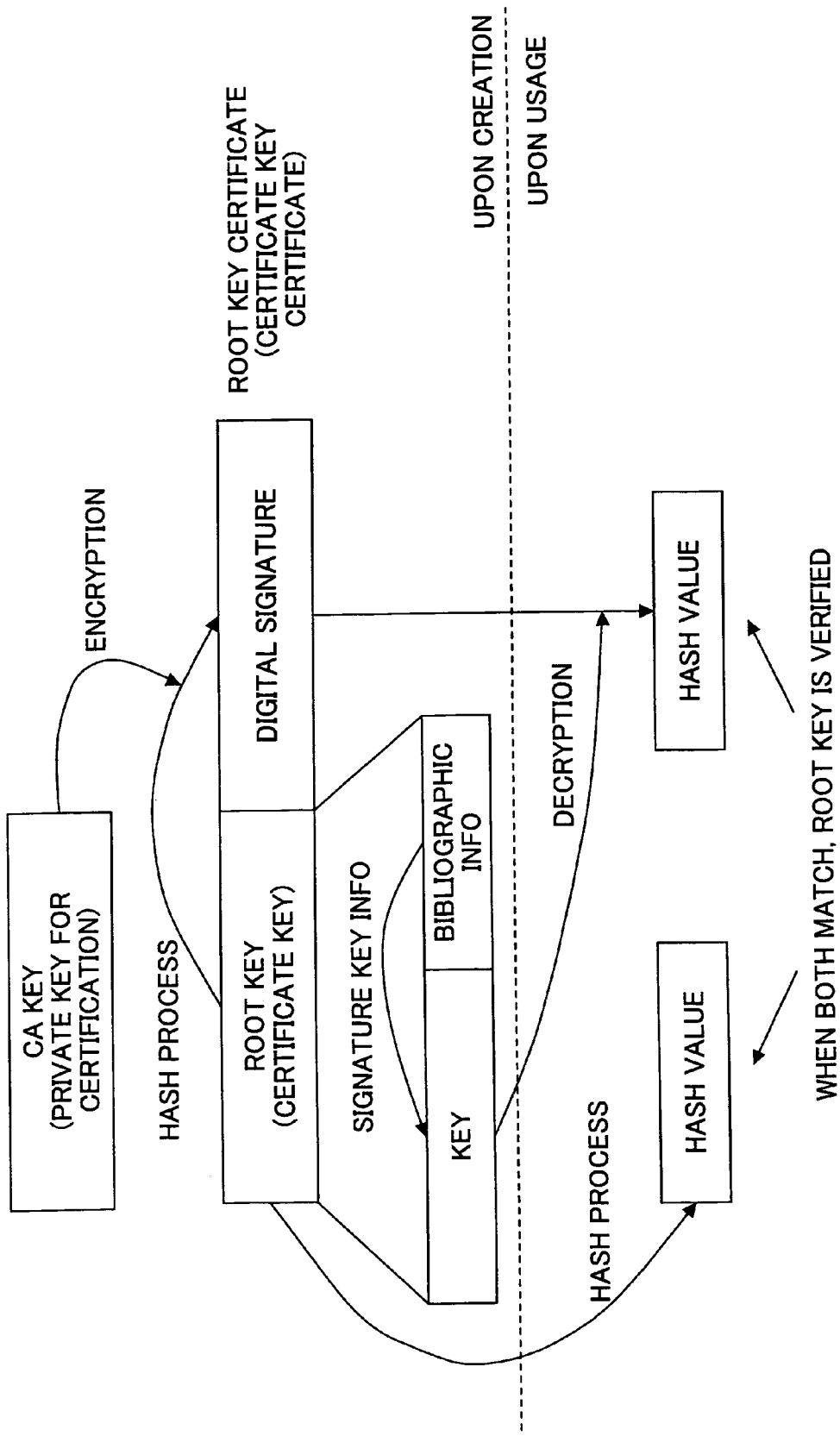

It should be noted that the relationships among each of the above-mentioned keys and certificates are as described in the background of the invention with reference to FIGS. 1A and 1B.

A description is given below of the flowcharts of FIG. 5. In FIG. 5, it is assumed that the arrows between the two flowcharts represent transfer of data: a transmitter performs a transfer process at the step corresponding to the base of an arrow; and a receiver performs the process corresponding to the head of the arrow upon reception of transferred information. Additionally, in a case where the process of each step is not normally completed, a response indicating the failure of authentication is returned at the time and the process is interrupted. The same applies to a case where a response indicating a failure of authentication is received from a communication party, and a case where a process times out.

When the CPU of the client apparatus 40 requests the server apparatus 30 for communications, the CPU carries out a predetermined control program, thereby starting the processes represented by the left flowchart in FIG. 5. In step S11, a connection request is transmitted to the server apparatus 30.

On the other hand, upon reception of the connection request, the CPU of the server apparatus 30 carries out a predetermined control program, thereby starting the processes represented by the right flowchart in FIG. 5. In step S21, a first random number is generated, and the generated first random number is encrypted by using the server private key. In step S22, the encrypted first random number and the server public key certificate are transmitted to the client apparatus 40.

Upon reception of the encrypted first random number and the server public key certificate, the client apparatus 40 verifies in step S12 the server public key certificate by using the root key certificate for server authentication (server authentication root key certificate). This process includes not only a process of confirming that there is no damage and/or altering, but also a process of confirming that the server apparatus 30 is an appropriate communication party with reference to bibliographic information.

When confirmed, the first random number is decrypted in step S13 by using a server public key, which is included in the received server public key certificate. When the decryption succeeds, it is confirmed that the first random number is surely received from the server apparatus 30 to which the server public key certificate is issued. Additionally, the server apparatus is authenticated as a valid communication party.

Then, in step S14, a second random number and a third random number are generated separately from the first random number. In step S15, the second random number is encrypted by using the client private key, and the third random number is encrypted by using the server public key. In step S16, the encrypted second and third random numbers are transmitted to the server apparatus 30 together with the client public key certificate. The encryption of the third random number is performed to prevent the third random number from being known by an apparatus other than the server apparatus 30.

Upon reception of the encrypted second and third random numbers and the client public key certificate, the server apparatus 30 verifies in step S23 the client public key certificate by using the root key certificate for client authentication (client authentication root key certificate). As in the case of step S12, this process also includes a process of confirming that the client apparatus 40 is an appropriate communication party. When confirmed, the second random number is decrypted in step S24 by using the client public key, which is included in the received client public key certificate. When the decryption succeeds, it is confirmed that the second random number is surely received from the client apparatus 40 to which the client public key certificate is issued, and the client apparatus 40 is authenticated as a valid communication party.

Then, in step S25, the third random number is decrypted by using the server private key. With the processes until step S25, the server apparatus 30 and the client apparatus 40 share the common first through third random numbers. At least the third random number is not known by an apparatus other than the client apparatus 40, which generates the third random number, and the server apparatus 30, which has the server private key. When the processes until step S25 succeed, a response indicating a success of authentication is returned to the client apparatus 40 in step S26.

Upon reception of the response, the client apparatus 40 generates in step S17 a common key from the first through third random numbers for the use in encryption in subsequent communications, and ends the authentication process. The server apparatus 30 also performs in step S27 a similar process, thereby ending the authentication process. With the above-mentioned processes, the server apparatus 30 and the client apparatus 40 establish communications with each other, and subsequent communications are performed by encrypting data according to the common key cryptography with the use of the common key generated in step S17 or S27.

By performing the above-mentioned processes, it is possible for the client apparatus 40 and the server apparatus 30 to safely exchange the common key after mutual authentication and safely perform communications with a valid party.

Next, a description is given of an updating process of the root key certificate. A server authentication root key updating process described here is a process according to a first embodiment of the digital certificate management method of the present invention, and performs the processes shown in the sequence diagrams of FIGS. 6 through 9 in this order. The processes shown in each of the following figures are performed by the CPUs of the certificate management apparatus 10, the server apparatus 30, and the client apparatus 40 by executing a predetermined control program.

Figure 6:
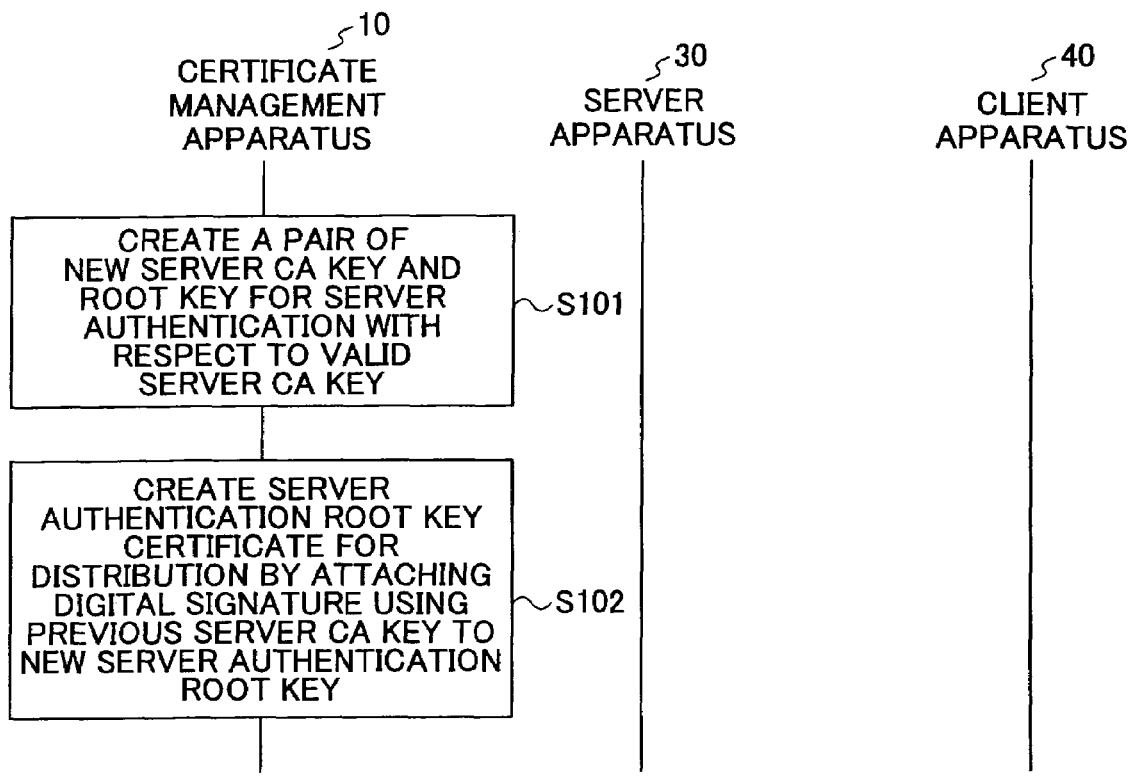
FIG. 6 is a sequence diagram showing a server authentication root key certificate creation process of a server authentication root key updating process in the digital certificate management system shown in FIG. 2.

In this process, first, a process S (a server authentication root key certificate creation process) shown in the sequence diagram of FIG. 6 is performed.

The certificate management apparatus 10 first creates in step S101 a pair of a new server CA key and a root key for server authentication (server authentication root key) for a valid server CA key. Here, the "valid" CA key means a CA key used in mutual authentication in the client/server system at the time. More properly, a certificate to which a digital signature is attached by using the CA key is stored in the server apparatus 30 or the client apparatus 40 in a state that the certificate may be used for an authentication process. This definition applies to the above-mentioned server CA key and a client CA key, which is described later.

Whether a private key previously created is valid may be determined based on, for example: information of the expiration date of a public key certificate and a root key certificate and information of whether these keys are updated stored in the certificate management part 23; information of IDs of a public key certificate and a root key certificate used by each node and stored in the structure storing part 26; and information of the identification information of a CA key used for a digital signature included in a certificate. In addition, a key previously used, which should be replaced with a new key, is hereinafter referred to as a "previous" key. The same applies to certificates.

Then, in step S102, a server authentication root key certificate for distribution, which is a first certification key certificate, is created by attaching a digital signature using the previous server CA key to the new server authentication root key created in step S101.

In the aforementioned manner, the server authentication root key certificate creation process is performed.

Figure 7:
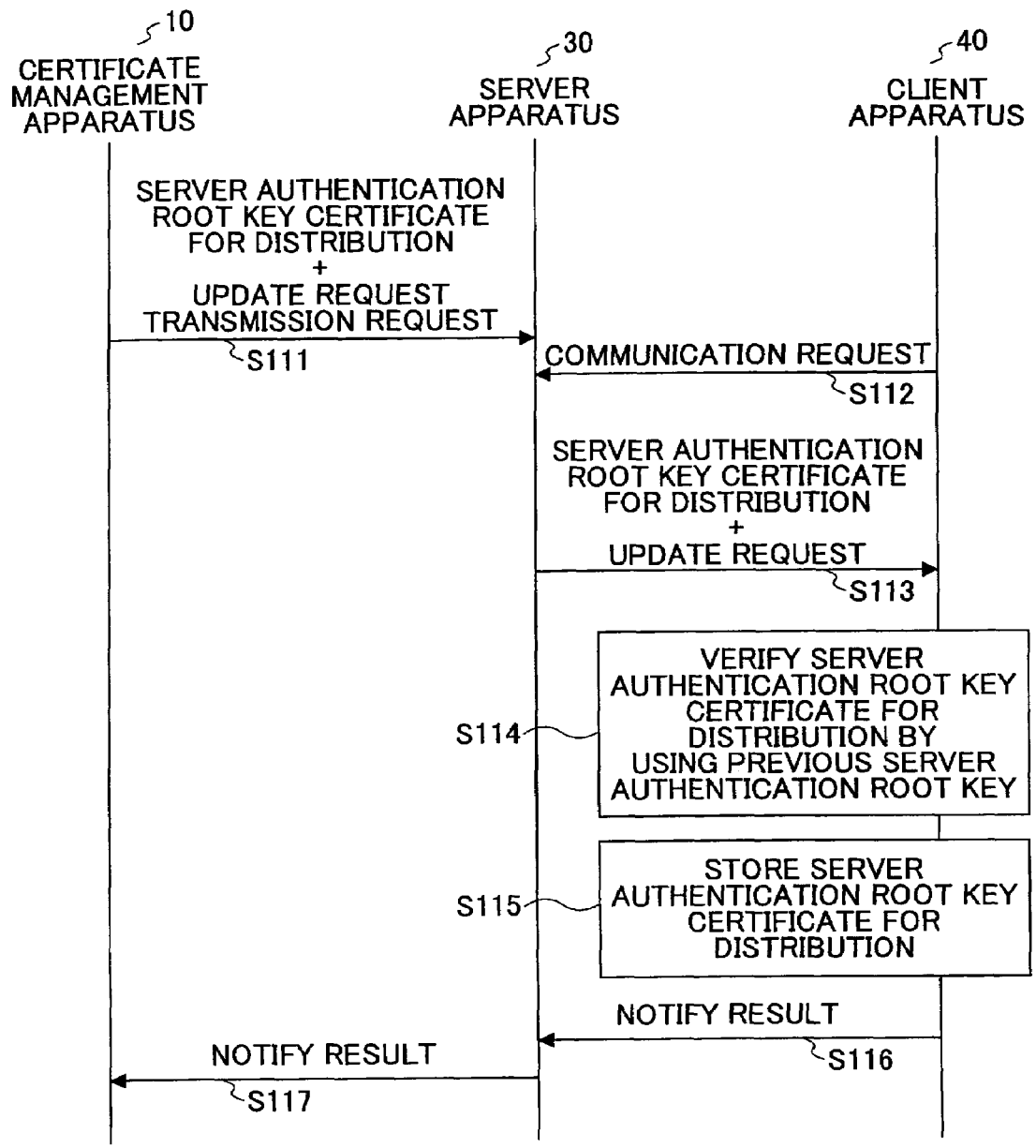
FIG. 7 is a sequence diagram showing a root key certificate storing process in a client apparatus.

Thereafter, subsequently, a process 1 (a root key certificate storing process in the client apparatus 40) shown in the sequence diagram of FIG. 7 is performed.

In this process, first, in step S111, the certificate management apparatus 10 transmits to the server apparatus 30 the server authentication root key certificate for distribution created in step S102 of FIG. 6 and an update request transmission request that requests the server apparatus 30 to transmit to the client apparatus 40 an update request thereof. In response to the process of step S111, the server apparatus 30 transmits to the client apparatus 40 the server authentication root key certificate for distribution and the update request. However, it is impossible for the server apparatus 30 to transmit a transmission request. Thus, the client apparatus 40 transmits in step S112 a communication request at predetermined timings (regular intervals) to request the server apparatus 30 to perform communications. Thereby, the server authentication root key certificate and the update request thereof are transmitted in step S113 as the response to the process of step S112.

Further, it is preferable that the client apparatus 40 transmits the communication request to the server apparatus 30 as an HTTP request, and the server apparatus 30 transmits a request or data to the client apparatus 40 as an HTTP response, which is the response to the HTTP request. In the aforementioned manner, even when the client apparatus 40 is installed behind a firewall, it is possible for the server apparatus 30 to transmit data to the client apparatus 40 through the firewall.

This is not a limitation of means for transmitting data or the like through a firewall. For example, it is conceivable to use the SMTP (Simple Mail Transfer Protocol) and send an e-mail on/to which data to be transmitted are described/attached. However, in terms of reliability, the HTTP is superior.

With the above-mentioned process, the server authentication root key certificate for distribution and the update request thereof are transmitted from the certificate management apparatus 10 to the client apparatus 40 via the server apparatus 30. In the process of step S111, the CPU 11 of the certificate management apparatus 10 functions as the first transmission means.

Upon reception of the update request, the client apparatus 40 verifies in step S114 the server authentication root key certificate for distribution by using the previous server authentication root key. As mentioned above, the digital signature using the previous server CA key is attached to the server authentication root key certificate for distribution. Thus, it is possible to confirm that the server authentication root key certificate for distribution is surely issued by the certificate management apparatus 10 by decrypting the contents of the server authentication root key certificate for distribution with the use of the previous server authentication root key included in the previous server authentication root key certificate. In addition, on this occasion, as described in the prior art with reference to FIGS. 2A and 2B, it is also possible to confirm that the server authentication root key is not damaged and/or altered, for example. Accordingly, with the use of such a server authentication root key certificate for distribution, it is possible to verify a received root key without manpower.

When the received root key is verified, in step S115, the server authentication root key certificate for distribution is stored in the certificate storing part 41. On this occasion, the previous server authentication root key certificate is not yet deleted. Accordingly, the two root key certificates are stored in the certificate storing part 41.

In a case where an authentication process is performed in this state, when verifying the received public key certificate, verification is performed by sequentially using the two root key certificates. When the verification succeeds by using any one of the root key certificates, it is considered that the received public key certificate is verified. Thus, it is possible to verify a digital certificate irrespective of whether a digital signature is attached to the digital certificate by using the new server CA key or the previous server CA key. Additionally, when using the server authentication root key certificate for distribution in an authentication process, it is possible to confirm that there is no damage and/or falsification of the root key by using the previous server authentication root key certificate. In steps S114 and S115, the CPU of the client apparatus 40 functions as second client-side update means.

Then, in step S116, the client apparatus 40 returns to the certificate management apparatus 10 a result notice as the response to the update request (the client apparatus 40 notifies the certificate management apparatus 10 of the result as the response to the update request). That is, when the server authentication root key certificate for distribution is successfully stored, the success is transmitted, and when not stored for some reasons such as a failure of the verification, the failure is transmitted. The result is first transmitted to the server apparatus 30, and then the server apparatus 30 transmits in step S117 the result to the certificate management apparatus 10. It should be noted that the result notice is information indicating that at least the server apparatus 30 receives the root key certificate for distribution. Hereinafter, it is assumed that the result notice has a similar meaning.

In the aforementioned manner, the root key certificate storing process of the client apparatus is performed.

Figure 8:
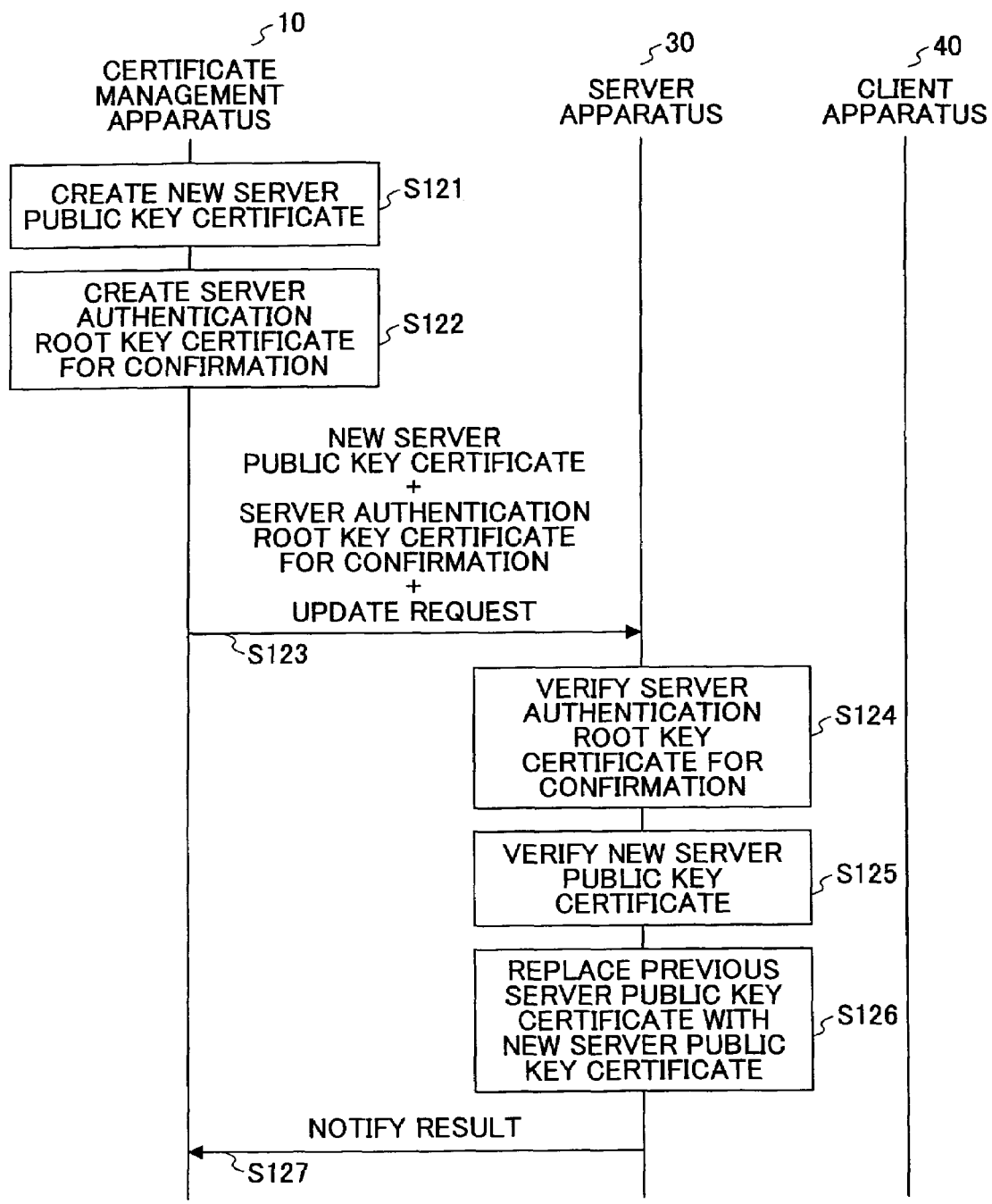
FIG. 8 is a sequence diagram showing a public key certificate storing process in a server apparatus.

Then, a process 2 (a public key certificate storing process in the server apparatus 30) shown in the sequence diagram of FIG. 8 is subsequently performed.

In this process, first, in step S121, the certificate management apparatus 10 creates a new server public key certificate by attaching a digital signature using the new server CA key to the server public key issued with respect to the server apparatus 30. It should be noted that, since the server private key is not updated, it is unnecessary to update the server public key.

Next, in step S122, the certificate management apparatus 10 creates a server authentication root key certificate for confirmation by attaching to the new server authentication root key a digital signature using a client CA key corresponding to the client authentication root key stored in the server apparatus 30. Here, since the client authentication root key is not updated, it is possible to use the client CA key that is previously created and stored in the certificate management apparatus 10.

Then, in step S123, the certificate management apparatus 10 transmits to the server apparatus 30 the new server public key certificate created in step S121, the server authentication root key certificate for confirmation created in step S122, and an update request of the new server public key certificate. The reason for transmitting the server authentication root key certificate for confirmation to the server apparatus 30 is, as described later, to enable the server apparatus 30 to verify the new server public key certificate by using the new server authentication root key included in the server authentication root key certificate for confirmation. In this process, the CPU 11 of the certificate management apparatus 10 functions as the second transmission means.

Upon reception of the update request, the server apparatus 30 verifies in step S124 the server authentication root key certificate for confirmation by using the stored client authentication root key. As mentioned above, since the digital signature using the client private key is attached to the server authentication root key certificate for confirmation, it is possible to confirm that the server authentication root key certificate for confirmation is surely issued by the certificate management apparatus 10 by encrypting the contents thereof with the use of the client authentication root key stored in the server apparatus 30.

When the server authentication root key certificate for confirmation is verified, the new server public key certificate is verified in step S125 by using the new server authentication root key included in the verified server authentication root key certificate for confirmation. Since the digital signature using the new server CA key is attached to the new server public key certificate, it is impossible to verify the new server public key certificate with the use of the client authentication root key stored in the server apparatus 30. However, with the use of the new server authentication root key included in the server authentication root key certificate for confirmation, it is possible to decrypt the contents of the new server public key certificate and to confirm that the new server public key certificate is surely issued by the certificate management apparatus 10 with respect to the client apparatus 40 and is not damaged and/or altered.

Upon the confirmation, in the next step S126, the new server public key certificate is stored in the certificate storing part 31, and the previous server public key certificate is replaced with the new server public key certificate. Here, it is unnecessary to store the server authentication root key certificate for confirmation. In steps S124 through S126, the CPU of the server apparatus 30 functions as first server-side update means.

As for the server apparatus 30, when storing the new server public key certificate, it is necessary not to add the new server public key certificate to the previous server public key certificate, but to replace the previous server public key certificate with the new server public key certificate. In this regard, a description is given below.

As for the server apparatus 30, a public key certificate is transmitted to the client apparatus 40 in a case where there is a connection request from the client apparatus 40. When the server apparatus 30 stores a plurality of server public key certificates, one of the server public key certificates is selected and transmitted for each transmission. In a case where a server public key certificate does not allow the client apparatus 40 to decrypt a digital certificate, authentication fails. Examples of such a case include a case where a new server public key certificate is transmitted to the client apparatus 40 before the client apparatus 40 stores the new server authentication root key.

There is an idea that, even if authentication fails, another server public key certificate may be transmitted when there is a subsequent connection request. However, as for a server apparatus, which may receive connection requests from an unspecified number of client apparatuses at arbitrary timings, it is not practical to select a server public key certificate to be transmitted for each of the client apparatuses. Additionally, since it is generally not until authentication ends that the server apparatus identifies what kind of an apparatus a client is, it is difficult to appropriately select a server public key certificate to be transmitted at the beginning. Accordingly, it is necessary for the server apparatus to store only one server public key certificate and transmit the stored server public key certificate every time a connection request is received from a client apparatus.

Here, it is assumed that one server constitutes a constitutional unit that returns one public key certificate for performing mutual authentication when there is a connection request from a client apparatus. For example, it is conceivable to cause common hardware to function as a plurality of servers by using, e.g., functions of virtual server, and use a different public key certificate for each of the servers. In this case, it is considered that a different server is used for each public key certificate to be used, that is, the same hardware functions as a plurality of nodes.

Thus, in the server apparatus 30, the previous server public key certificate is deleted at the time when the new server public key certificate is stored. Hence, when such deletion is performed before the client apparatus 40 stores the new server authentication root key, it becomes impossible for the client apparatus 40 to decrypt a digital signature of the server public key certificate and perform mutual authentication. For this reason, it is necessary to perform the public key certificate storing process of the server apparatus 30 after completion of the root key certificate storing process of the client apparatus 40.

After the process of step S126 ends, the server apparatus 30 returns in step S127 a result response to the certificate management apparatus 10 as the response to the update request. When the new server public key certificate is successfully stored, the success is transmitted to the certificate management apparatus 10, and when not successfully stored for some reasons, the failure is transmitted to the certificate management apparatus 10.

In the aforementioned manner, the public key certificate storing process of the server apparatus 30 is performed.

Figure 9:
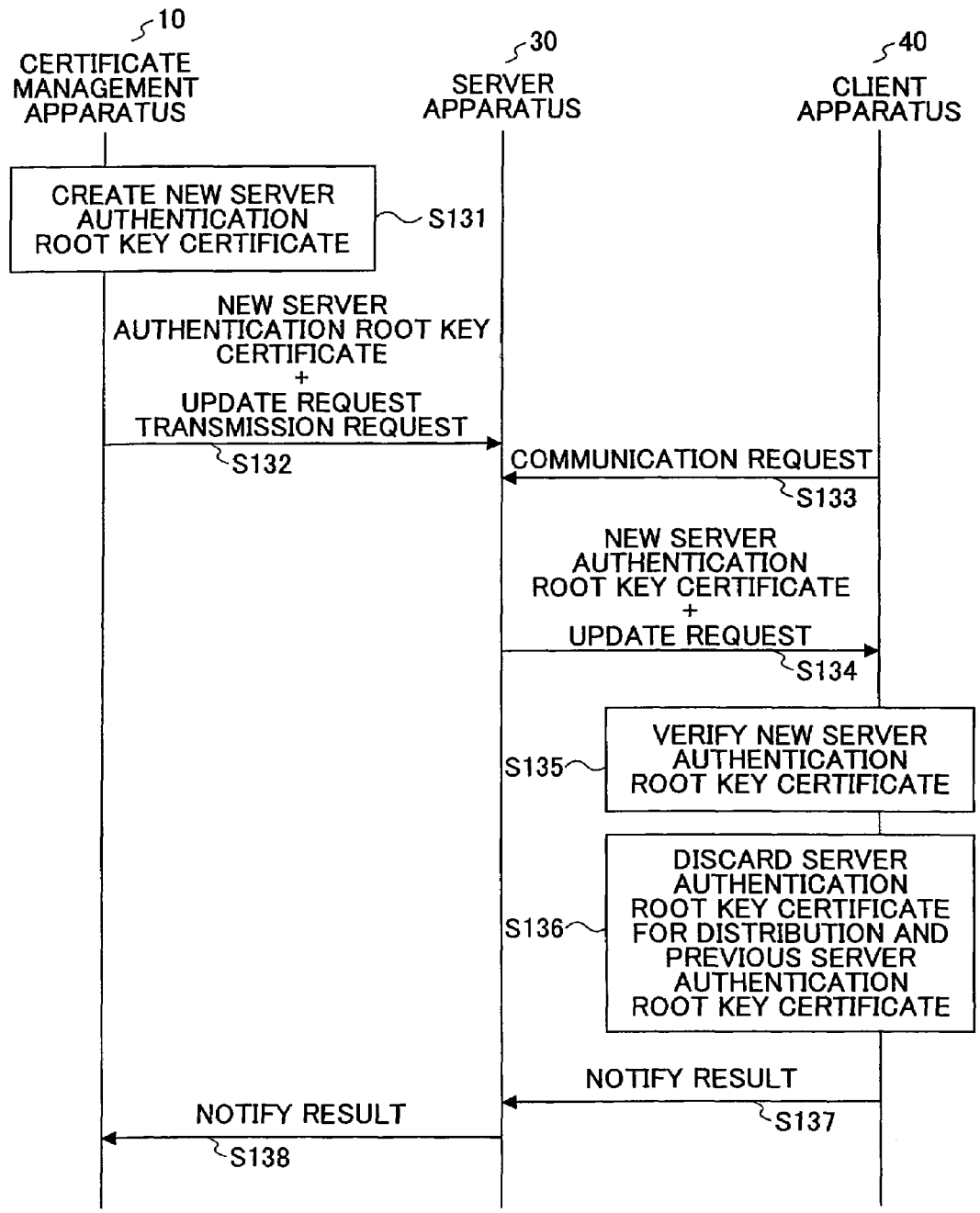
FIG. 9 is a sequence diagram showing a root key certificate rewriting process in the client apparatus.

Then, a process 3 (a root key certificate rewriting process in the client apparatus 40) shown in the sequence diagram of FIG. 9 is subsequently performed.

In this process, first, in step S131, the certificate management apparatus 10 creates, as a second server certification key certificate, a new server authentication root key certificate by attaching a digital signature using the new server CA key to the new server authentication root key.

In step S132, the certificate management apparatus 10 transmits to the server apparatus 30 the new server authentication root key certificate created in step S131 and an update request transmission request that requests the server apparatus 30 to transmit to the client apparatus 40 an update request of the new server authentication root key certificate. In response to the process of S132, as in the cases of steps S112 and S113 of FIG. 7, the server apparatus 30 transmits in step S134 the new server authentication root key certificate and the update request thereof as a response to a communication request from the client apparatus 40 in step S133.

With the above-mentioned process, the new server authentication root key certificate and the update request thereof are transmitted from the certificate management apparatus 10 to the client apparatus 40 via the server apparatus 30. Also in the process of step S132, the CPU 11 of the certificate management apparatus 10 functions as the first transmission means.

Upon reception of the update request, the client apparatus 40 verifies in step S135 the new server authentication root key certificate by using the server authentication root key certificate for distribution. As mentioned above, since the digital signature using the new server CA key is attached to the new server authentication root key certificate, it is possible to decrypt the contents of the new server authentication root key certificate with the use of the new server authentication root key included in the server authentication root key certificate for distribution and confirm that the new server authentication root key certificate is surely issued by the certificate management apparatus 10.

Upon the confirmation, in the next step S136, the new server authentication root key certificate is stored in the certificate storing part 41. The server authentication root key certificate for distribution and the previous server authentication root key certificate are disposed of (discarded), and the server authentication root key certificate is replaced with the new server authentication root key certificate. Consequently, it becomes impossible to decrypt the digital certificate to which the digital signature is attached by using the previous server CA key. However, if the new server public key certificate is stored in the server apparatus 30, there is no problem in confirming the public key certificate transmitted from the server apparatus 30. Thus, there is no problem in the authentication process.

Then, in step S137, the client apparatus 40 returns a result notice to the certificate management apparatus 10 as the response to the update request. The result notice is first transmitted to the server apparatus 30, and then the server apparatus 30 transmits in step S138 the result notice to the certificate management apparatus 10.

In the aforementioned manner, the root key certificate rewriting process in the client apparatus 40 is performed, and the server authentication root key updating process ends.

Further, each of the above-mentioned processes may be considered to be completed when the response indicating success of updating in response to the update request is received. As mentioned above, the response also includes information indicating that a certificate to be updated is received. The same process may be performed again when a response indicating a failure of updating and the process times out. However, when the process subsequently fails for a predetermined number of times, the updating process may be considered to have failed.

Figure 10:
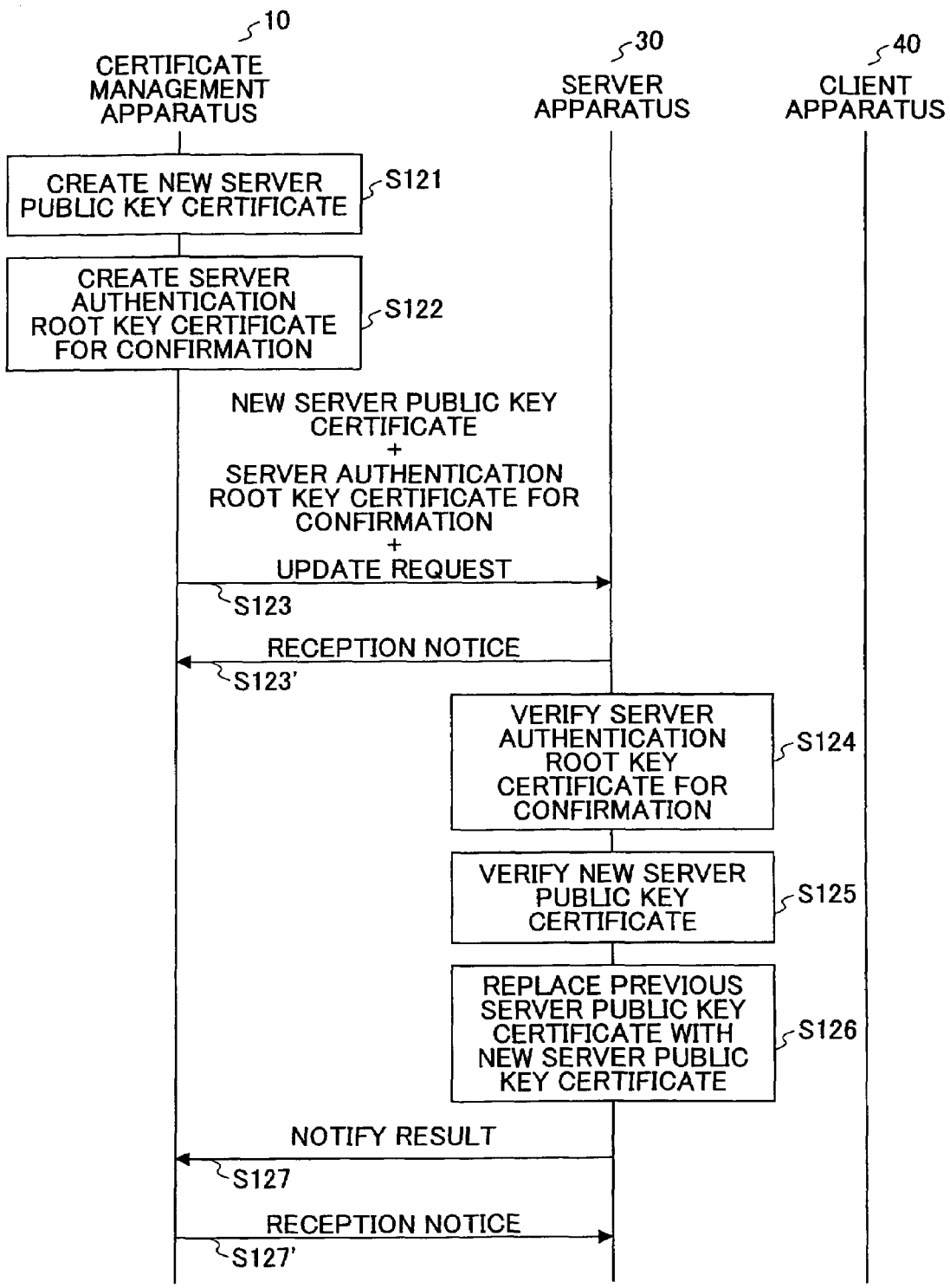
FIG. 10 is a sequence diagram showing a variation of the sequence shown in FIG. 8.

In addition, here, the description is given above of the case where, when the certificate management apparatus 10 transmits the update request to the server apparatus 30, the server apparatus 30 returns the result notice after storing of, for example, the received certificate is completed as shown in FIG. 8. However, as shown in FIG. 10, the server apparatus 30 may immediately return a reception notice in step S123' upon reception of the update request. In this case, the reception notice in step S123' serves as information indicating that the update request, the new server public key certificate, and the server authentication root key certificate for confirmation transmitted from the certificate management apparatus 10 are normally received. Additionally, the result notice in step S127 serves as information indicating, for example, whether updating succeeds and the causes thereof. It is preferable that the certificate management apparatus 10 returns the reception notice in step S127' in response to the result notice in step S127 as well. In the aforementioned manner, it is possible for the server apparatus 30 to determine that the result notice is normally received by the certificate management apparatus 10.

Figure 11:
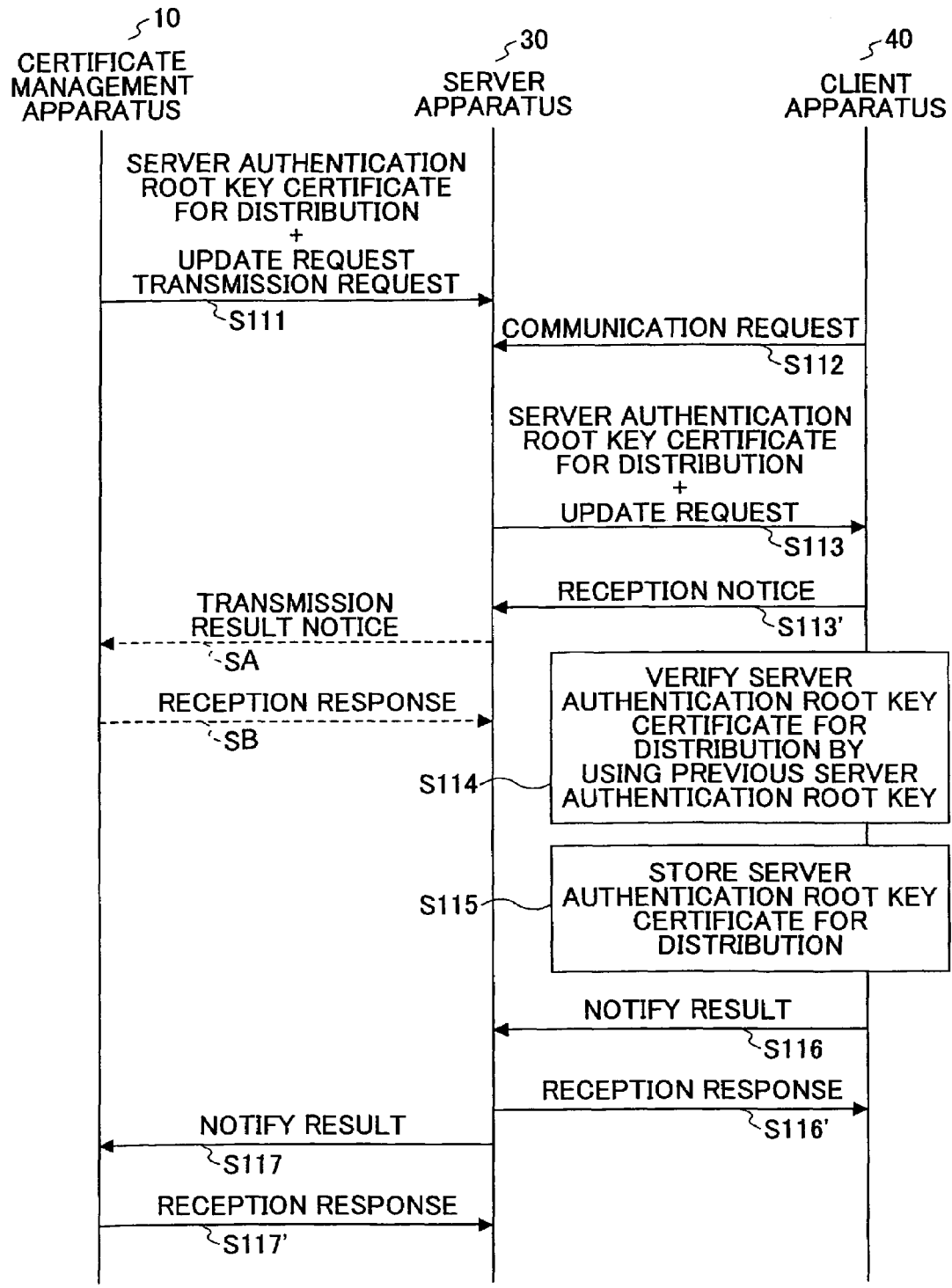
FIG. 11 is a sequence diagram showing a variation of the sequence shown in FIG. 7.

Additionally, a similar procedure may be applied to communications between the server apparatus 30 and the client apparatus 40. That is, when a request is received, the reception notice is immediately returned to the transmitting source of the request, and when a result notice is received, the reception notice is immediately retuned to the transmitting source of the result notice. FIG. 11 is a sequence diagram showing a sequence that introduces such an idea in the sequence shown in FIG. 7.

The reception notice in step S113' serves as information indicating that the client apparatus 40 receives the root key certificate for distribution and the update request thereof. However, with the sequence obtained by merely introducing the above-mentioned idea in the sequence shown in FIG. 7, such information is not transmitted to the certificate management apparatus 10 until the server apparatus 30 transmits a result notice in step S117.

Therefore, as indicated by the dotted lines (arrows) in FIG. 11, after there is the reception notice from the client apparatus 40 in step S113', the server apparatus 30 may transmits to the certificate management apparatus 10 only whether the transmission succeeds as a transmission result notice (SA). In the aforementioned manner, it is possible to immediately transmit to the certificate management apparatus 10 whether the transmission to the client apparatus 40 succeeds.

Further, in the case where the result notice is transmitted as mentioned above, when there is a reception notice from a transmission destination of, for example, a certificate, while managing the timing for performing each process, it is also possible to proceed to the next process under the estimation that storing and setting of the certificate will be performed without delay in the transmission destination. Specifically, even if all of the processes of the process 1 are not completed, when there is a reception notice as in step SA of FIG. 11, the process 1 may be considered to be completed and the process 2 may be started. Also, even if the processes of the process 2 are not completed, when there is a transmission result notice as in step S123' of FIG. 10, the process 2 may be considered to be completed and the process 3 may be started.

Additionally, here, only the variations of the sequences in FIGS. 8 and 7 are shown in FIGS. 10 and 11, respectively. However, such ideas may be applied to all of the processes and sequences including those described in the following embodiments and variations.

When the root key updating process is performed in the above-mentioned procedure, it is possible for the server apparatus 30 and the client apparatus 40 to perform mutual authentication according to the SSL at any time of the process. Hence, even if the updating process is interrupted in the middle of the process as mentioned above, there is no major problem in communications between the server apparatus 30 and the client apparatus 40. Accordingly, in a case where the updating process fails, there is no particular problem in performing the updating process again after specifying the cause of the failure by spending a long time interval. The same applies to each of the following embodiments.

In the digital certificate management system, by performing the server authentication root key updating process in such a procedure, it is possible to update the server authentication root key by automatic control without significantly affecting the mutual authentication process between the server apparatus 30 and the client apparatus 40. In addition, it is possible to ensure a communication channel according to the SSL by performing authentication that uses the previous root key (root key before updating) and the public key certificate, and transmit a new root key for updating and a new public key certificate over the communication channel. Further, after updating ends, it is possible to ensure a communication channel according to the SSL by using the new root key and the new public key certificate. Accordingly, by using such a digital certificate management system, it is possible to operate a client/server system that performs the authentication process according to the SSL at the time of communications at low cost. The same also applies to each of the following embodiments.

It is necessary to provide a different safe communication channel between the certificate management apparatus 10 and the server apparatus 30. However, such a communication channel may be a common communication channel that is used for a process generally required, such as a process of updating the public key certificate because of, for example, the expiration. In addition, such a communication channel may be provided only between the certificate management apparatus 10 and one apparatus, which is not a particular burden. In a case where the certificate management apparatus 10 and the server apparatus 30 are physically close to each other, it is easy to provide such a communication channel by, for example, connecting the certificate management apparatus 10 and the server apparatus 30 via a dedicated cable. This embodiment is preferable for such a case.

According to the present invention, in the above-mentioned procedure, the process 2 (the public key certificate storing process in the server apparatus 30) is performed after the process 1 (the root key certificate storing process in the client apparatus 40), that is, after there is a response from the client apparatus 40, which response indicates that the server authentication root key certificate for distribution is received.

As mentioned in the description of the process 2, simultaneously storing two public key certificates in the server apparatus 30 may cause an inconvenience. Hence, when causing the server apparatus 30 to store the new server public key certificate, it is necessary to dispose of the previous server public key certificate. Even if such rewriting is performed, when the rewriting is performed after the new server authentication root key is stored in the client apparatus 40, there is no problem in an authentication process.

As for the process 3, which is not a mandatory process, if the previous server authentication root key certificate is indefinitely stored, the storage capacity is consumed in vain. It is preferable to use storing means having high reliability for storing the keys and certificates. Thus, the cost per capacity is high, which is a major problem. In addition, since the root key certificate for distribution is not of a self-signature type, it is necessary upon usage to refer to the previous server authentication root key certificate, which results in inefficient processing. Thus, by performing the process 3, the server authentication root key certificate of a self-signing type may be stored, and the previous server certificate may be disposed of.

Rewriting of the server authentication root key certificate to that of a self-signing type may be performed immediately after storing the server authentication root key certificate for distribution, for example, immediately after completion of the process 1. At this time, however, the new server public key certificate is not yet stored in the server apparatus 30. Thus, it is impossible to dispose of the previous server authentication root key certificate. Hence, it becomes necessary to issue again a request for disposing of the previous root key certificate after the process 2 ends. Accordingly, in terms of simplification of the process, it is preferable to perform the process 3 after completion of the process 1 and the process 2.

Additionally, once the root key is stored, it is generally unnecessary to transmit the root key to the outside. Thus, it is unlikely that the root key is damaged and/or altered after being stored. Therefore, it is conceivable to store not the root key certificate but only the root key. In this case, since the new server authentication root key included in the server authentication root key certificate for distribution may be stored, it is unnecessary to separately transmit the new server authentication root key certificate from the certificate management apparatus 10. Thus, in this case, in the process 3, only disposition of the previous server authentication root key may be requested without transmitting the new server authentication root key certificate. The same applies to a case where confirmation of a digital signature is not performed upon usage of the root key.

In addition, in the above-mentioned process, the description is given of the example in which the server apparatus 30 verifies the new server public key certificate by using the server authentication root key certificate for confirmation. However, the new server public key certificate may be transmitted in a format that allows verification with the use of the client authentication root key.

In this case, instead of the above-mentioned process 2, a process 2' shown in the flowchart of FIG. 10 is performed as the public key certificate storing process in the server apparatus 30.

In this process, in step S141, a new server public key certificate is stored as in step S121 of FIG. 8. However, in step S142, a new server public key certificate for distribution is created by further attaching to the new server public key certificate a digital signature using the client CA key corresponding to the client authentication root key stored in the server apparatus 30.

Figure 13A:
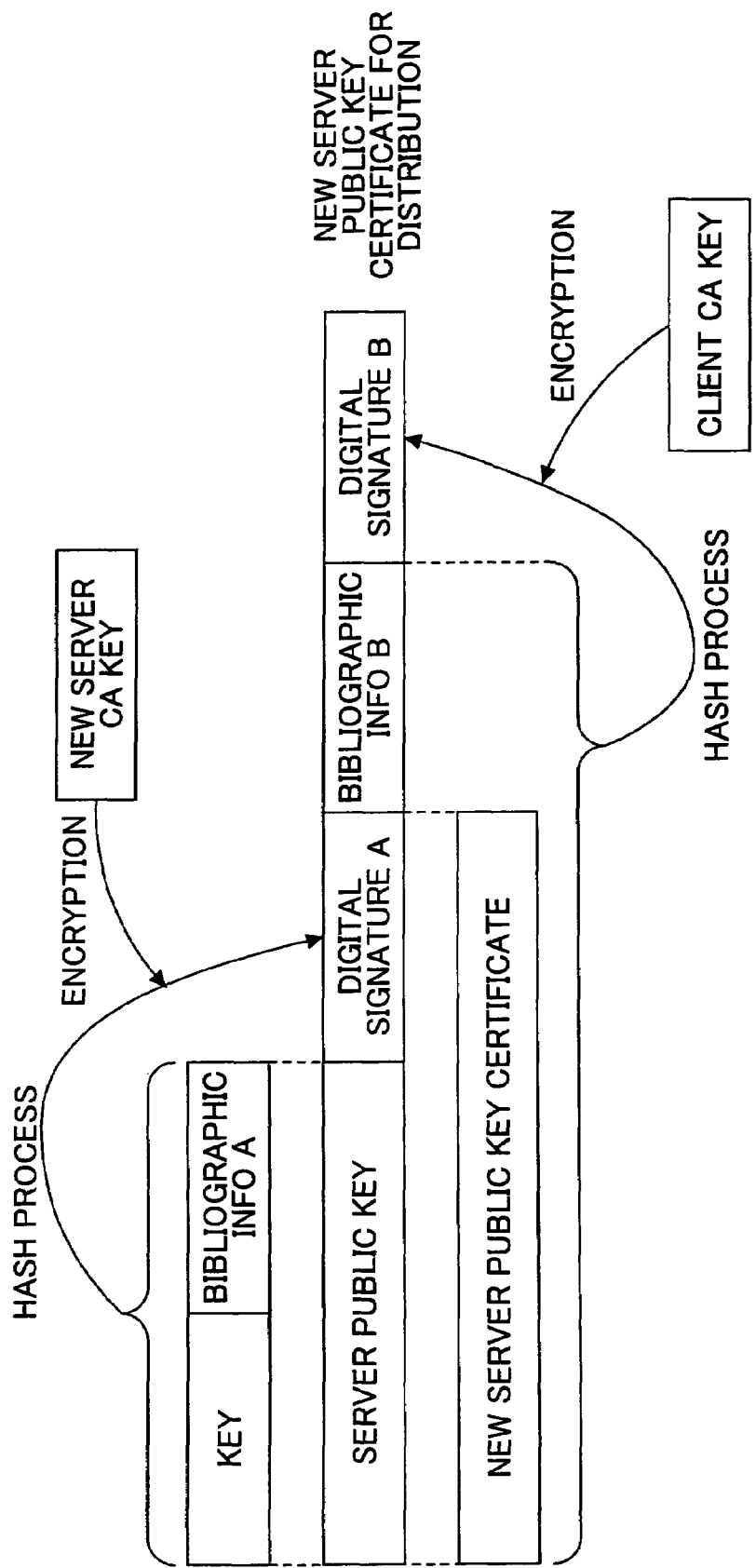
FIGS. 13A, 13B and 13C are schematic diagrams for explaining the structure of a new server public key certificate for distribution used in the process of FIG. 12.

FIG. 13A shows the new server public key certificate for distribution. The new server public key certificate for distribution is obtained by adding bibliographic information B and a digital signature B to the new server public key certificate. The bibliographic information B includes information of, for example: the issuer (CA) of the certificate; the party (server apparatus) to which the certificate is issued; the expiration date; and the identification information of a CA key used for a digital signature. The digital signature B is data obtained by performing a hash process on and encrypting, with the use of the client CA key, the new server public key certificate to which the bibliographic information B is attached. The new server public key certificate is obtained by adding to the server public key the digital signature A, which is obtained by encrypting the hash value of the server public key with the use of the new server CA key, as in the case of the client public key certificate described in the prior art with reference to FIGS. 1A and 1B.

Figure 13B:
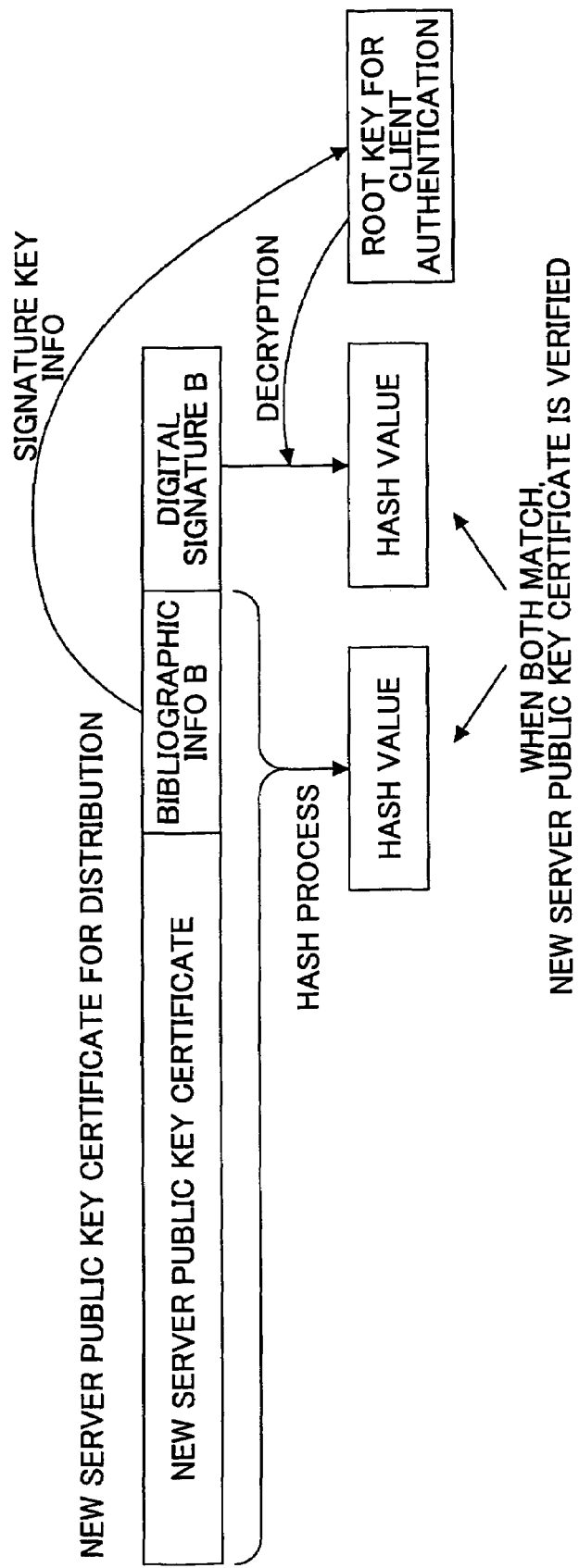
Figure 13C:
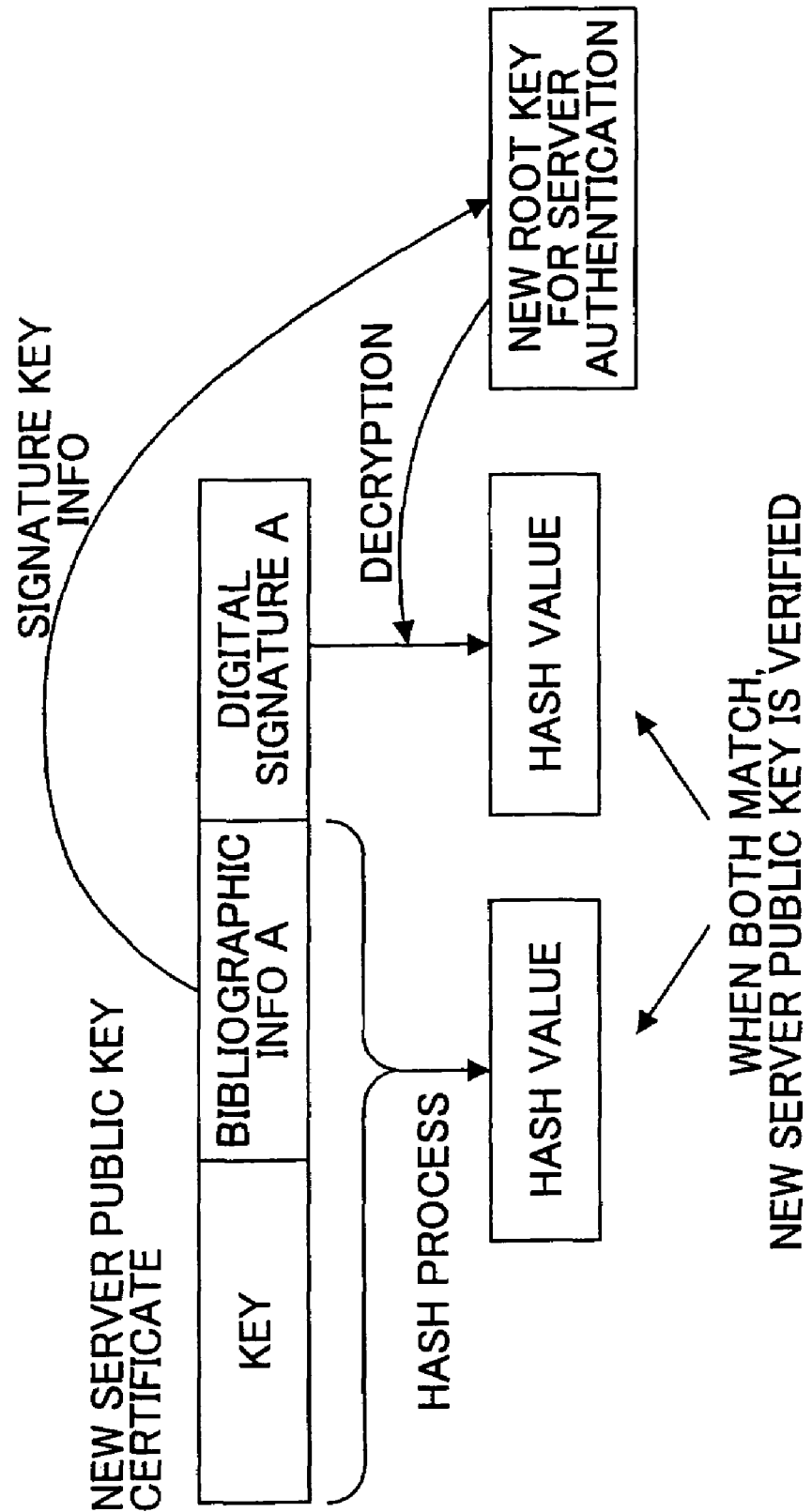

As shown in FIG. 13B, the new server public key certificate for distribution is verified as in the case shown in FIGS. 2A and 2B by decrypting the digital signature B included in the new server public key certificate with the use of the client authentication root key, and comparing the hash value obtained by performing a hash process on the new server public key certificate and the bibliographic information B and the hash value obtained by the decryption of the digital signature B. However, it is impossible to verify the new server public key certificate. In order to verify the new server public key certificate, it is necessary to perform verification with the use of the new server authentication root key as shown in FIG. 13C.

Figure 12:
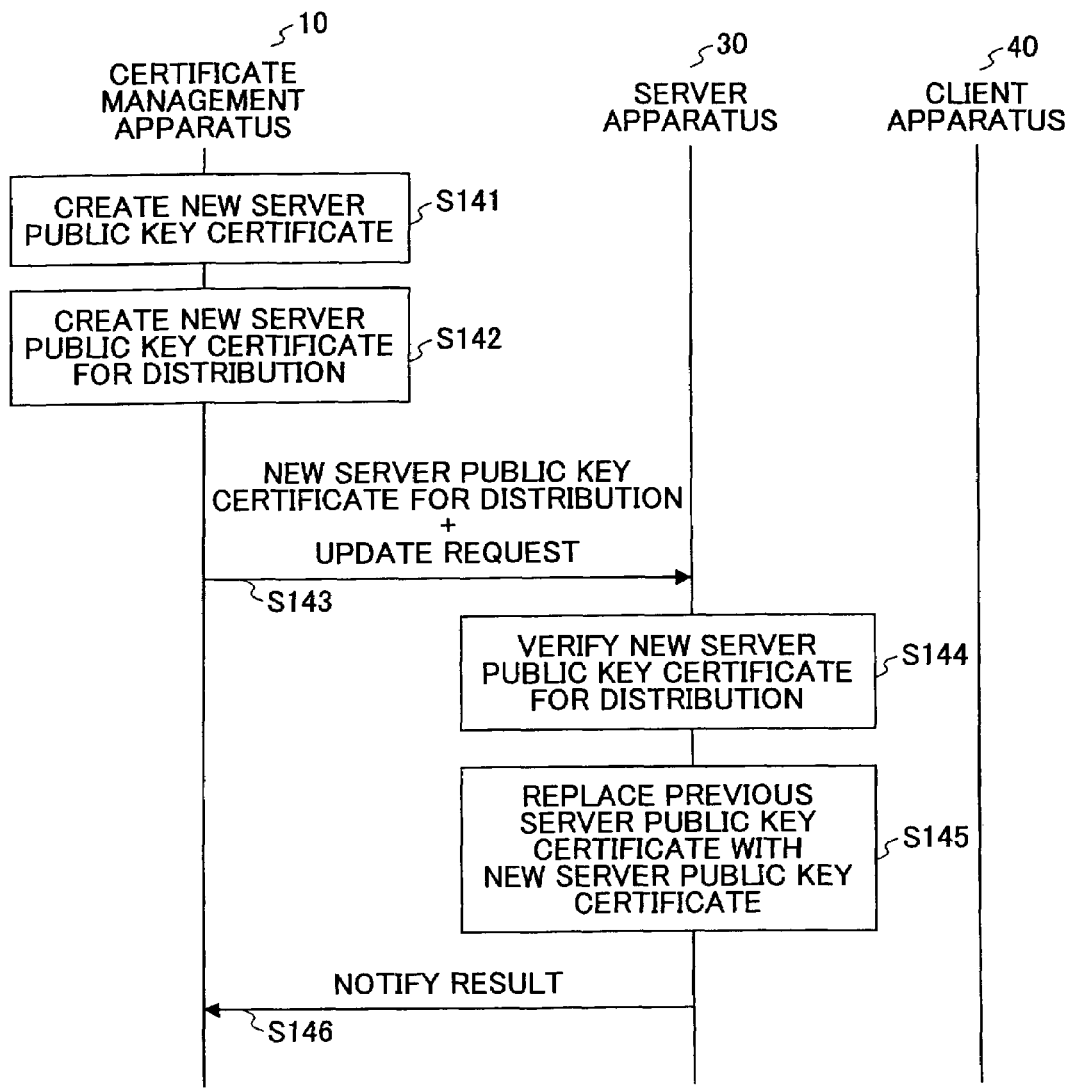
FIG. 12 is a sequence diagram showing a public key certificate storing process in the server apparatus according to a variation of the server authentication root key updating process.

Referring again to FIG. 12, in step S143, the certificate management apparatus 10 transmits to the server apparatus 30 the new server public key certificate for distribution created in step S142 and an update request thereof. In this process, the CPU 11 of the certificate management apparatus 10 functions as the second transmission means.

Upon reception of the update request, the server apparatus 30 verifies in step S144 the new server public key certificate for distribution with the use of the stored client authentication root key as mentioned above. When the new server public key certificate for distribution is verified, the server apparatus 30 stores the new server public key certificate in the certificate storing part 41 in step S145. On this occasion, the previous server public key certificate is replaced with the new server public key certificate as in step S126 of FIG. 8. In steps S144 and S145, the CPU of the server apparatus 30 functions as the first server-side update means.

Then, in step S146, the server apparatus 30 returns a result notice to the certificate management apparatus 10 as the response to the update request.

Instead of transmitting the server authentication root key certificate for confirmation separately from the new server public key certificate, by transmitting the new server public key certificate in the format that allows verification with the use of the client authentication root key in the aforementioned manner, it is impossible to cause the server apparatus 30 to store the new server public key certificate after verifying the new server public key certificate as in the case shown in FIG. 8.

Here, the description is given only of the server authentication root key updating process. However, in a case where it is necessary to update the client authentication root key stored in the server apparatus 30, the client authentication root key may be updated in an appropriate procedure. It is also possible to adopt a process described in a second embodiment of the present invention, which is described below. However, this process is not mandatory.

On this occasion, since the client authentication root key and the server authentication root key are completely different root keys, updating of one of the root keys does not affect updating of the other one of the root keys. It is possible to update the root keys at different timings. However, in a case where the root keys are simultaneously updated, it is necessary to pay attention to a digital signature that is attached to the root key certificate for confirmation. That is, it is necessary to attach a signature that allows verification with the use of a root key stored in a transmission destination at the time of transmission of the root key certificate for confirmation. The same applies to the case of the second embodiment, which is described later.

Further, in this embodiment, the description is given of the case where transmission from the server apparatus 30 to the client apparatus 40 is performed as the response to a communication request from the client apparatus 40. However, by allowing the server apparatus 30 to also function as a client and allowing the client apparatus 40 to also function as a server, data and/or a request may be directly transmitted from the server apparatus 30 to the client apparatus 40. In such a case, a communication request by the client apparatus 40 is not required. The same applies to the following embodiments.

Second Embodiment

FIGS. 14 through 17

A description is given below of a digital certificate management system according to a second embodiment of the present invention, which system is constructed by the certificate management apparatus 10, which is the digital certificate management apparatus according to the present invention, and the client apparatus 40 and the server apparatus 30 constructing a client/server system.

The digital certificate management system of the second embodiment is different from that of the first embodiment only in the process of updating the client authentication root key stored in the server apparatus. The structures of the apparatuses are the same as those in the first embodiment, and a description thereof is omitted. Here, a description is given of a process in a case where the client authentication root key is updated.

A client authentication root key updating process described below is a process according to the second embodiment of the digital certificate management method of the present invention. In the client authentication root key updating process, the processes shown in the sequence diagrams of FIG. 14 through 17 are performed in this order. The processes shown in each of the following figures are performed by the CPUs of the certificate management apparatus 10, the server apparatus 30, and the client apparatus 40 by executing predetermined programs.

Figure 14:
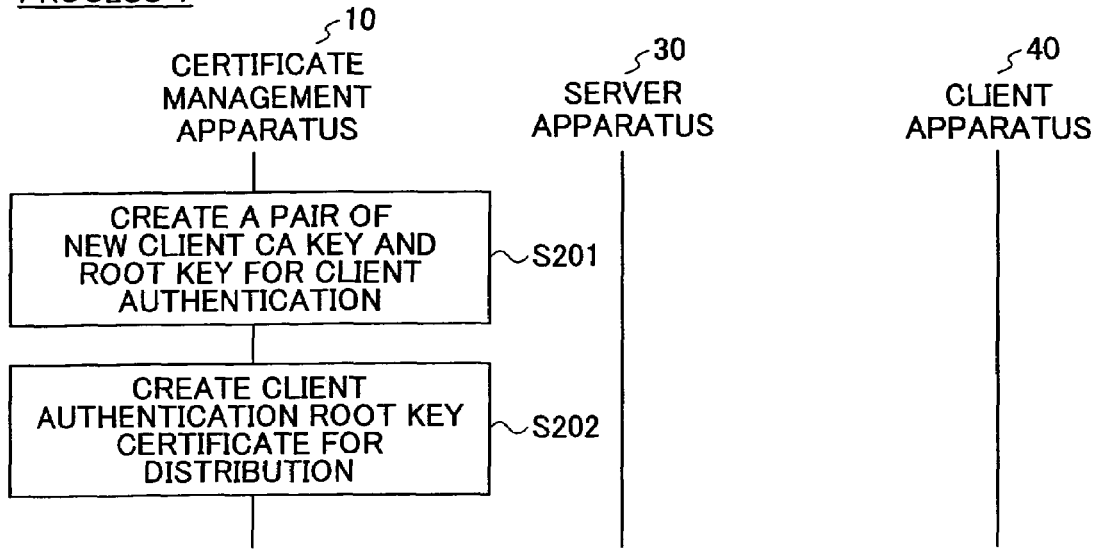
FIG. 14 is a sequence diagram showing a client authentication root key certificate creation process of a client authentication root key updating process in the digital certificate management system according to a second embodiment of the present invention.

In the client authentication root key updating process, first, a process T (a client authentication root key certificate creation process) shown in the sequence diagram of FIG. 14 is performed.

First, in step S201, the certificate management apparatus 10 creates a pair of a new client CA key and a root key for client authentication (client authentication root key) with respect to a valid client CA key. Here, the definition of the "valid" CA key is the same as that described in the first embodiment with reference to FIG. 6.

Then, in step S202, a digital signature using a previous client CA key is attached to the new client authentication root key created in step S201, thereby creating a client authentication root key certificate for distribution, which is a first certification key certificate.

In the aforementioned manner, the client authentication root key certificate creation process is performed.

Figure 15:
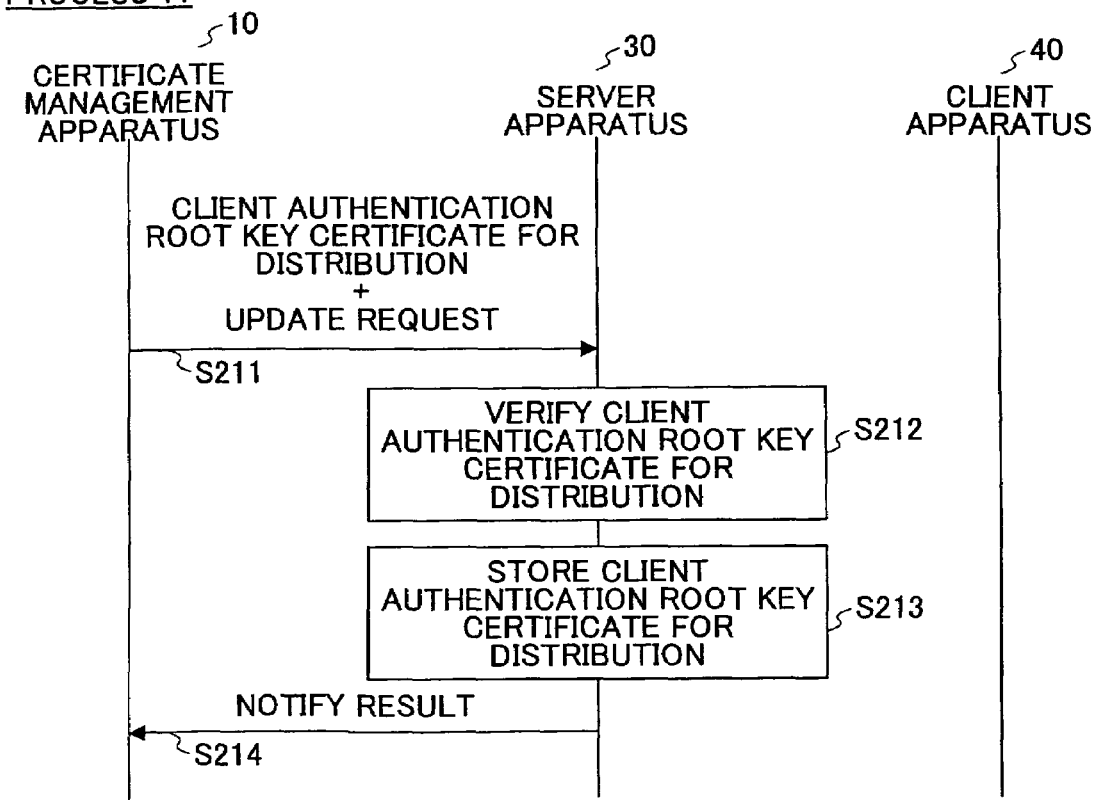
FIG. 15 is a sequence diagram showing a root key certificate storing process in the server apparatus.

Then, a process 11 (a root key certificate storing process in the server apparatus 30) shown in the sequence diagram of FIG. 15 is sequentially performed.

In this process, first, in step S211, the certificate management apparatus 10 transmits to the server apparatus 30 the client authentication root key certificate created in step S202 of FIG. 14 and an update request thereof. In the process of step S211, the CPU 11 of the certificate management apparatus 10 functions as the second transmission means.

Upon reception of the update request transmission request, the server apparatus 30 verifies in step S212 the client authentication root key certificate for distribution with the use of a previous client authentication root key. As mentioned above, a digital signature using the previous client CA key is attached to the client authentication root key certificate for distribution. Thus, it is possible to decrypt the contents of the client authentication root key certificate for distribution with the use of the previous client authentication root key included in the previous client authentication root key certificate, and to confirm that the client authentication root key certificate is surely issued by the certificate management apparatus 10 and that the client authentication root key is not damaged and/or altered, for example. Accordingly, by using the client authentication root key certificate for distribution, it is possible to verify the received root key without manual intervention.

When the received root key is verified, in step S213, the client authentication root key certificate for distribution is stored in the certificate storing part 31. On this occasion, the previous client authentication root key certificate is not yet deleted. Accordingly, the two root key certificates are stored in the certificate storing part 31.

As for the process in a case where an authentication process is performed in this state, a process the same as that described in the first embodiment with reference to FIG. 7 is performed. In steps S212 and S213, the CPU of the server apparatus 30 functions as second server-side update means.

Then, in step S214, the server apparatus 30 returns a result notice to the certificate management apparatus 10 as the response to the update request.

In the aforementioned manner, the root key certificate storing process in the server apparatus 30 is performed.

Figure 16:
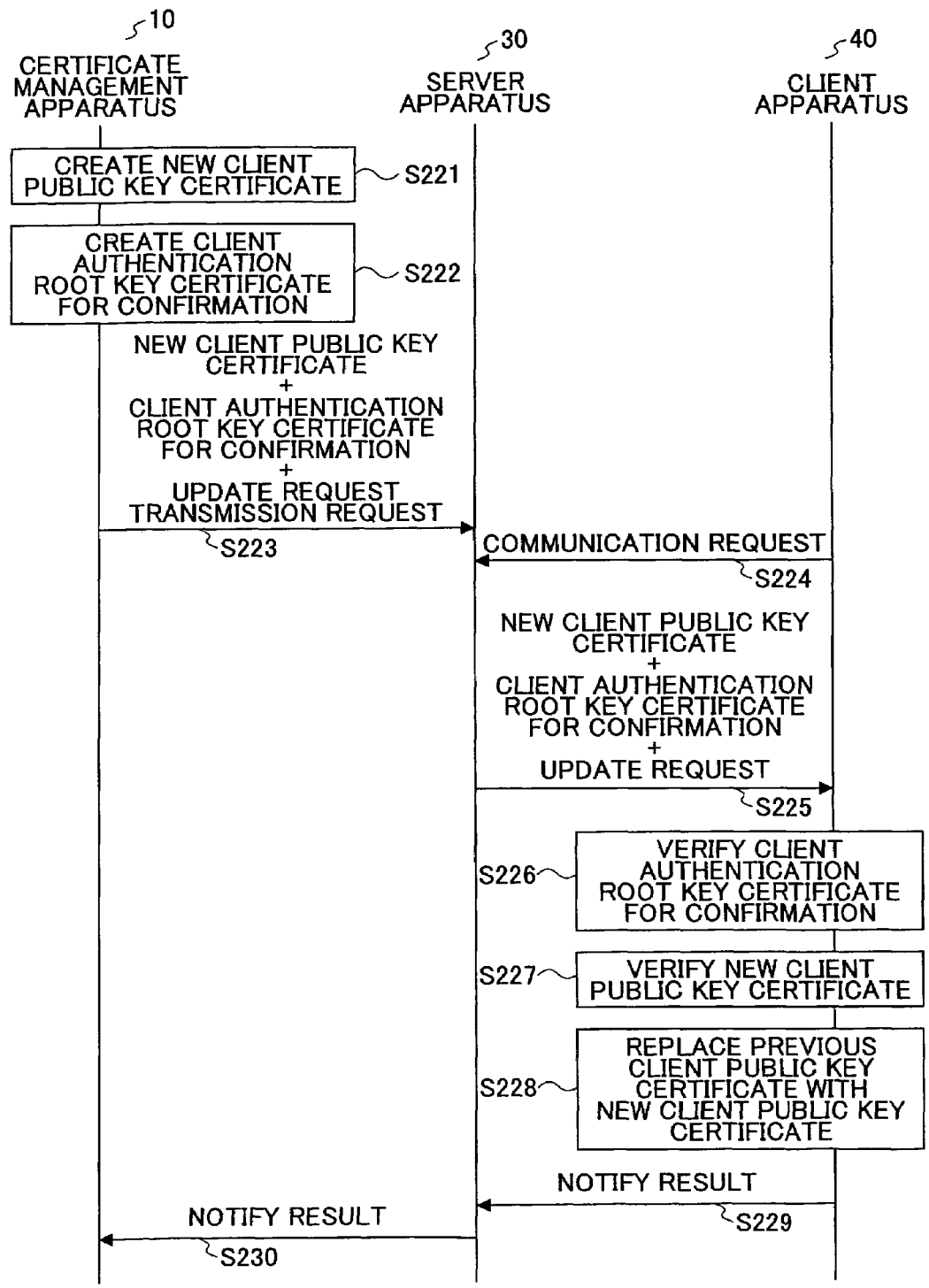
FIG. 16 is a sequence diagram showing a public key certificate storing process in the client apparatus.

Then, a process 12 (a public key certificate storing process in the client apparatus 40) shown in the sequence diagram of FIG. 16 is subsequently performed.

In this process, first, in step S221, the certificate management apparatus 10 creates a new client public key certificate by attaching a digital signature using the new client CA key to a client public key issued with respect to the client apparatus 40. It should be noted that, since a client private key is hot updated, it is unnecessary to update the client public key.

Next, in step S222, a client authentication root key certificate is created by attaching to the new client authentication root key a digital signature using a server CA key corresponding to the server authentication root key stored in the client apparatus 40. Here, since the server authentication root key is not updated, it is possible to use the server CA key that is already created and stored in the certificate management apparatus 10.

In step S223, the certificate management apparatus 10 transmits to the server apparatus 30 the new client public key certificate created in step S221, the client authentication root key certificate for confirmation created in step S222, and an update request transmission request that requests to transmit an update request of the new client public key certificate to the client apparatus 40. In response to the update request, the server apparatus 30 transmits in step S225 the above-mentioned certificates and the update request to the client apparatus 40 as the response to a communication request from the client apparatus 40 in step S224, as in steps S112 and S113 of FIG. 7.

The reason for transmitting the client authentication root key certificate for confirmation to the client apparatus 40 is, as described later, to allow the client apparatus 40 to verify the new client public key certificate with the use of the new client authentication root key included in the client authentication root key certificate for confirmation. In this process, the CPU 11 of the certificate management apparatus 10 functions as the first transmission means.

Upon reception of the update request, the client apparatus 40 verifies in step S226 the client authentication root key certificate for confirmation with the use of the stored server authentication root key. As mentioned above, the digital signature using the server CA key is attached to the client authentication root key certificate for confirmation. Thus, it is possible to decrypt the contents of the client authentication root key certificate for confirmation with the use of the server authentication root key stored in the client apparatus 40, and to confirm that the client authentication root key certificate for confirmation is surely issued by the certificate management apparatus 10.

Then, in step S227, the new client public key certificate is verified with the use of the new server authentication root key included in the verified client authentication root key certificate for confirmation. Since the digital signature using the new client CA key is attached to the new client public key certificate, it is impossible to perform verification with the use of the server authentication root key stored in the client apparatus 40. However, by using the new server authentication root key included in the client authentication root key certificate for confirmation, it is possible to decrypt the contents of the client authentication root key certificate for confirmation and to confirm that the client authentication root key certificate for confirmation is surely issued by the certificate management apparatus 10 with respect to the client apparatus 40.

When the new client public key certificate is verified, in step S228, the new client public key certificate is stored in the certificate storing part 41 and the previous client public key certificate is replaced with the new client public key certificate. In steps S226 through S228, the CPU of the client apparatus 40 functions as the first client-side update means.

Here, the new client public key certificate is stored in the client apparatus 40 after the client authentication root key certificate for distribution is stored in the server apparatus 30, which becomes a communication party. Thus, at the time of step S228, it is possible for the server apparatus 30 to verify the client public key certificate. Hence, even if the previous client public key certificate is deleted, there is no problem in mutual authentication.

After the above-mentioned step S228 ends, in step S229, the client apparatus 40 returns to the certificate management apparatus 10 a result notice as a response with respect to the update request. The result notice is first transmitted from the client apparatus 40 to the server apparatus 30 in step S229, and then the server apparatus 30 transmits the result notice to the certificate management apparatus 10 in step S230.

In the aforementioned manner, the public key certificate storing process in the client apparatus 40 is performed.

However, in the case of the client apparatus 40, it is not mandatory to delete the previous client public key certificate in step S228. When the previous client public key certificate is not deleted, the two client public key certificates are stored in the certificate storing part 41. In a case where an authentication process is performed and a public key certificate is transmitted to a communication party in this state, first, a new public key certificate is transmitted.

Also in this case, when the communication party already stores therein the new client authentication root key (as the client authentication root key certificate for distribution or a new client authentication root key certificate, which is described later), it is possible to decrypt the digital signature of the new public key certificate. Thus, it is possible to be authenticated without problems. On the other hand, in a case where the new client authentication root key is not yet stored in the communication party, it is impossible to decrypt the digital signature of the new public key certificate, which results in reception of a response indicating a failure of authentication. However, also in this case, when communication is requested again and the previous public key certificate is transmitted on this occasion, it is possible to decrypt the digital signature attached thereto with the use of the previous client authentication root key. Thus, it is possible to be authenticated without problems.

Accordingly, by storing the two public key certificates, even in a case where the new client authentication root key is not stored in the communication party, it is possible to perform mutual authentication without problems, though some overhead processing may occur. In addition, since the public keys included in the two public key certificates are the same, it is possible to perform decryption of data, which are encrypted by using the client private key, in a similar manner regardless of which public key certificate is used.

In this case, it is not mandatory to perform the process 12 after the process 11. However, as mentioned above, since overhead processing may occur in communications and it is necessary to separately delete the previous client authentication root key afterward, it is preferable to perform the process 12 after completion of the process 11.

Figure 17:
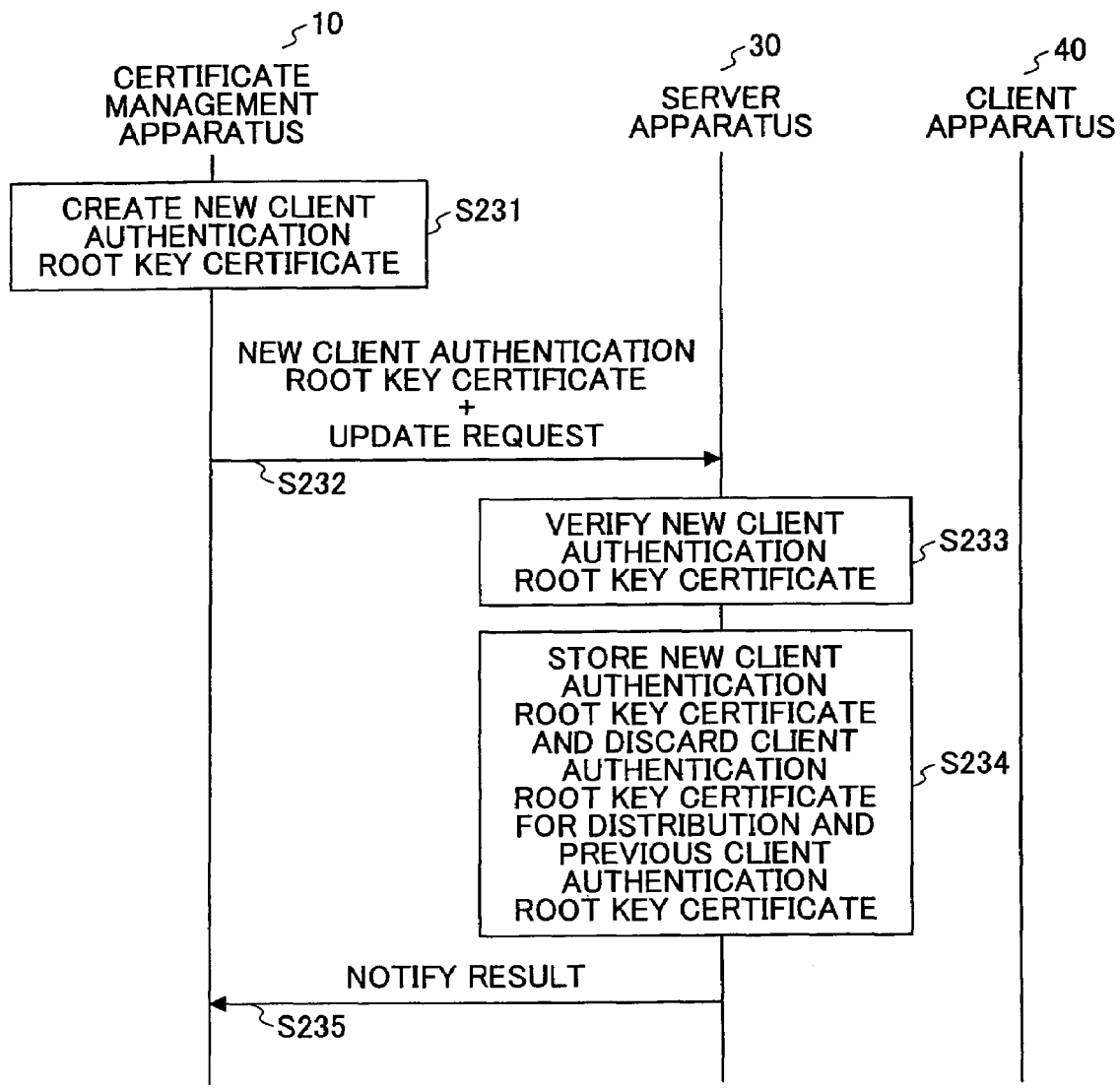
FIG. 17 is a sequence diagram showing a root key certificate rewriting process in the server apparatus.

After the process 12, a process 13 (a root key certificate rewriting process in the server apparatus 30) shown in the sequence diagram of FIG. 17 is subsequently performed.

In this process, first, in step 231, the certificate management apparatus 10 creates as a second client certification key certificate a new client authentication root key certificate by attaching a digital signature using the new client CA key to the new client authentication root key.

Then, in step S232, the certificate management apparatus 10 transmits to the server apparatus 30 the new client authentication root key certificate created in step S231 and an update request thereof. Also in this process, the CPU 11 of the certificate management apparatus 10 functions as the second transmission means.

Upon reception of the update request, the server apparatus 30 verifies in step S233 the new client authentication root key certificate by using the client authentication root key certificate for distribution. As mentioned above, the digital signature using the new client CA key is attached to the new client authentication root key certificate. Thus, it is possible to decrypt the contents of the new client authentication root key certificate by using the new client authentication root key included in the client authentication root key certificate for distribution, and confirm that the new client authentication root key certificate is surely issued by the certificate management apparatus 10.

When the new client authentication root key certificate is verified, in step S234, the new client authentication root key certificate is stored in the certificate storing part 31. The client authentication root key certificate for distribution and the previous client authentication root key certificate are disposed of, and the client authentication root key certificate is rewritten to the new client authentication root key certificate. As a result, it becomes impossible to decrypt the digital certificate to which the digital signature is attached by using the previous client CA key. However, after the new client public key certificate is stored in the client apparatus 40, there is no problem in confirming the public key certificate transmitted from the client apparatus 40. Thus, there is no problem in the authentication process.

Then, in step S235, the server apparatus 30 returns a result notice to the certificate management apparatus 10 as the response to the update request.

In the aforementioned manner, the root key certificate rewriting process in the server apparatus 30 is performed, and the client authentication root key updating process ends.

In the digital certificate management system, by performing the client authentication root key updating process in the aforementioned procedure, it is possible to update the client authentication root key by automatic control without significantly affecting the mutual authentication process between the server apparatus 30 and the client apparatus 40. Accordingly, by using such a digital certificate management system, it is possible to update the root key without preparing a special communication channel for updating the root key. Hence, it is possible to operate a client/server system that performs the authentication process according to the SSL at the time of communications at low cost.

Here, the description is given only of the client authentication root key updating process. However, in a case where it is necessary to update the server authentication root key stored in the server apparatus 30, the server authentication root key may be updated in an appropriate procedure. The process described in the first embodiment may be adopted. However the process is not mandatory.

Further, the variation described with respect to the server authentication root key updating process in the first embodiment may be similarly applied to the client authentication root key updating process.

Third Embodiment

FIG. 18 through FIG. 21

Next, a description is given below of the digital certificate management system according to a third embodiment of the present invention, which system is constructed by the certificate management apparatus 10, which is the digital certificate management apparatus according to the present invention, and the client apparatus 40 and the server apparatus 30 constructing a client/server system. Also in this embodiment, one client and one server construct the client/server system. This embodiment is different from the first embodiment in which the present invention is applied to the most basic system.

Figure 18:
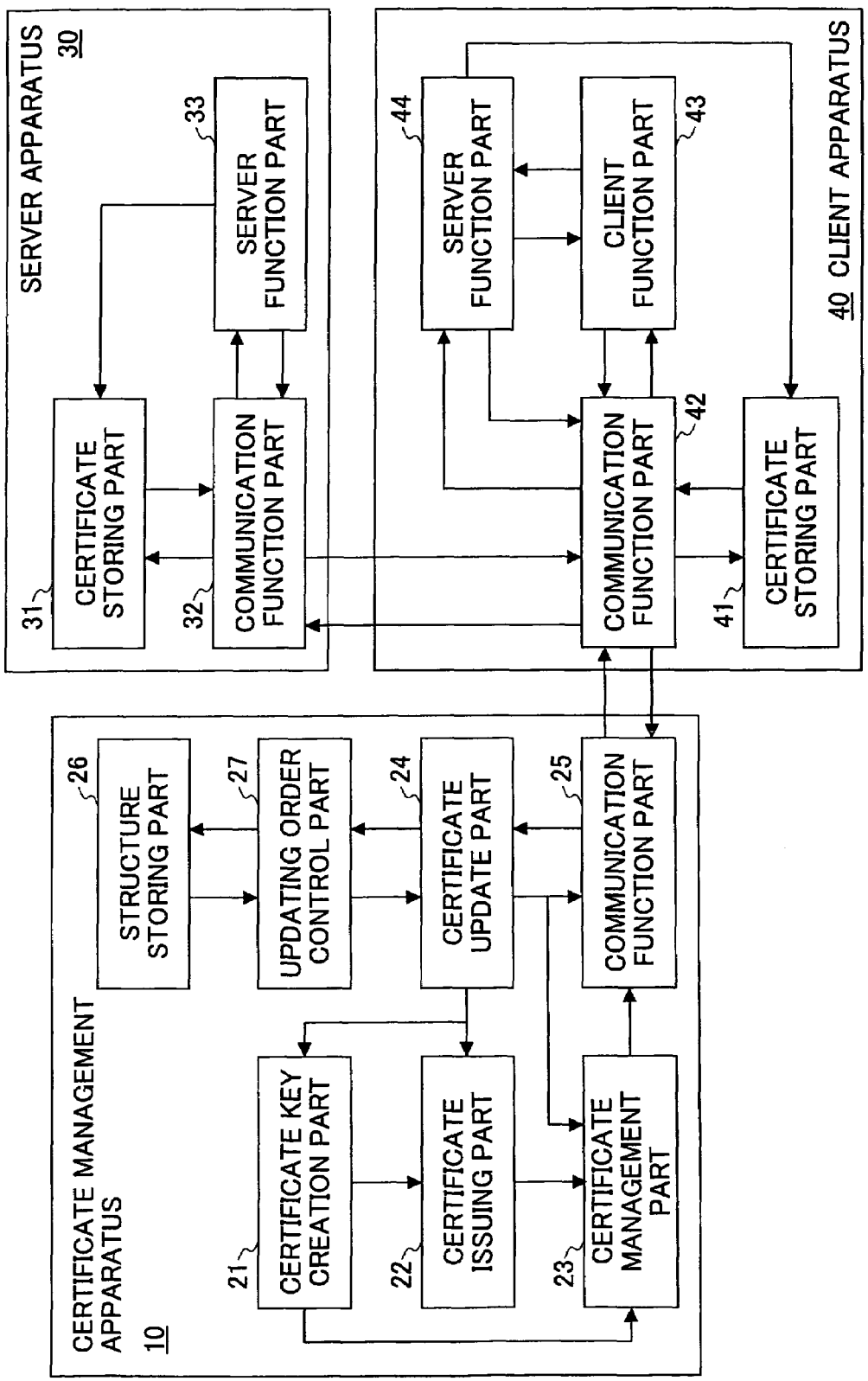
FIG. 18 is a functional block diagram corresponding to FIG. 2 and showing the functional structures of apparatuses constructing the digital certificate management system according to a third embodiment of the present invention.

FIG. 18 is a functional block diagram corresponding to FIG. 2 and showing a part of the functional structures of apparatuses constructing the digital certificate management system. In FIG. 18, those parts that are the same as those corresponding parts in FIG. 2 are designated by the same reference numerals.

As can be appreciated from FIG. 18, the digital certificate management apparatus according to the third embodiment is different from that of the first embodiment in that the certificate management apparatus 10 can directly communicate with the client apparatus 40 among the apparatuses constructing the client/server system, and a request from the certificate management apparatus 10 with respect to the server apparatus 30 is transmitted via the client apparatus 40.

Another difference between the third embodiment and the first embodiment is that the client apparatus 40 is also provided with a server function part 44. The server function part 44 includes functions as a server, which returns a response with respect to a received request by performing a predetermined process. The server function part 44 is provided for communications with the certificate management apparatus 10. If the client apparatus 40 includes the client function part 43 but does not include the server function part 44, in a case where the certificate management apparatus 10 transmits data and/or a request to the client apparatus 40, it is necessary for the certificate management apparatus 10 to wait for a communication request from the client apparatus 40.

However, the updating process of a root key is not frequently performed: for example, the frequency is about once a year. Thus, if the client apparatus 40 transmits a communication request to the certificate management apparatus 10 at regular intervals for the updating process, almost all of communications are wasted. Hence, the client apparatus 40 is provided with the server function part 44 so that the certificate management apparatus 10 can request communications. The functions of the server function part 44 are also realized by controlling the operation of each part of the client apparatus 40 by executing a predetermined program by the CPU of the client apparatus 40.

However, the client apparatus 40 always functions as a client with respect to the server apparatus 30 constructing the client/server system. Accordingly, in a case where communications from the certificate management apparatus 10 to the server apparatus 30 are performed via the client apparatus 40, data and/or a request received by the communication function part 42 from the certificate management apparatus 10 are received by the server function part 44, delivered to the client function part 43, and transmitted to the server apparatus 30 by requesting communications with the server apparatus 30 based on an instruction from the client function part 43. When returning a response from the server apparatus 30 to the certificate management apparatus 10, the reverse process is performed.

With the above-mentioned changes, the sequence of the root key updating process is changed. However, other than this point, the sequence is the same as that in the first embodiment, and a description thereof is omitted.

Further, here, it is assumed that communications between the certificate management apparatus 10 and the client apparatus 40 are performed via a communication channel that can ensure safety such as a dedicated line. In the case of the third embodiment, the SSL may be used for communications between the certificate management apparatus 10 and the client apparatus 40. The structure in this case is described later as a variation of the third embodiment.

Next, a description is given below of the root key updating process in the digital certificate management system and the structure required for the root key updating process. First, a description is given of a process in a case where the server authentication root key stored in the client apparatus 40 is updated.

Figure 19:
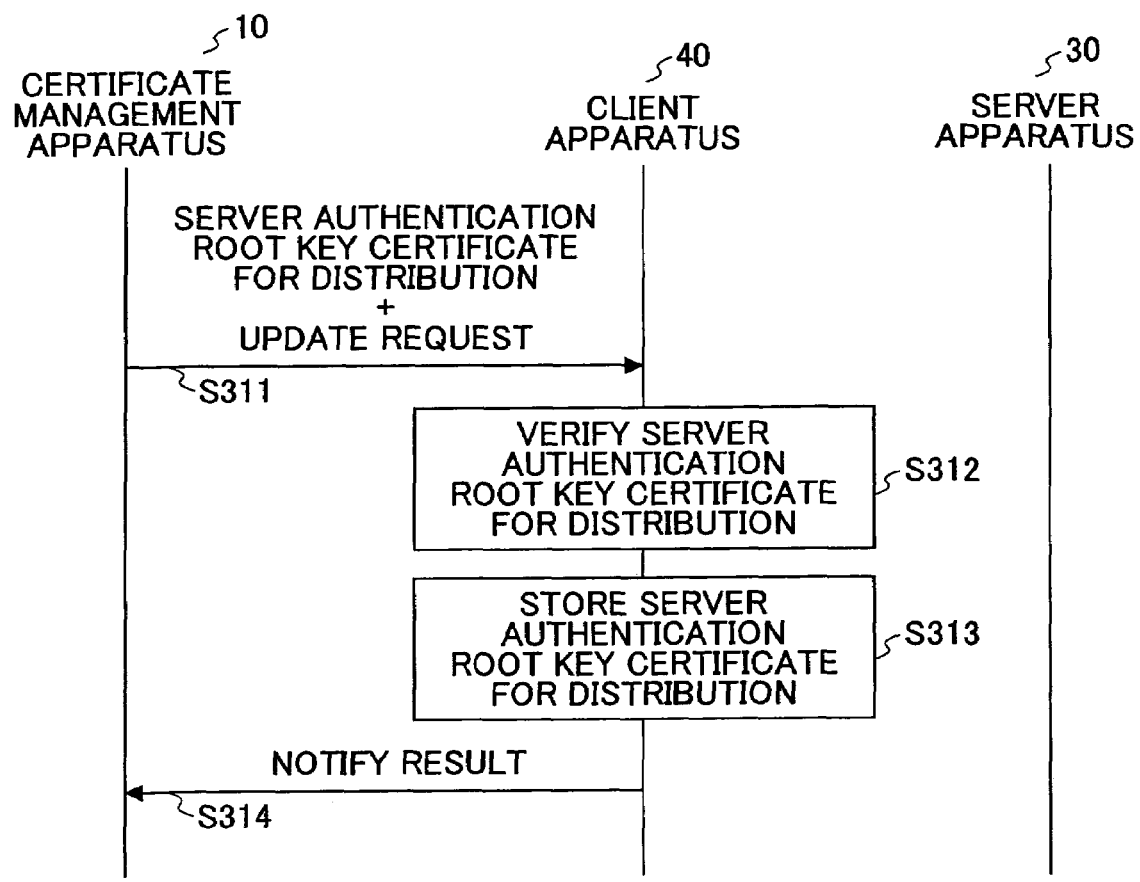
FIG. 19 is a sequence diagram showing a root key certificate storing process in the client apparatus of the server authentication root key updating process in the digital certificate management system shown in FIG. 18.
Figure 20:
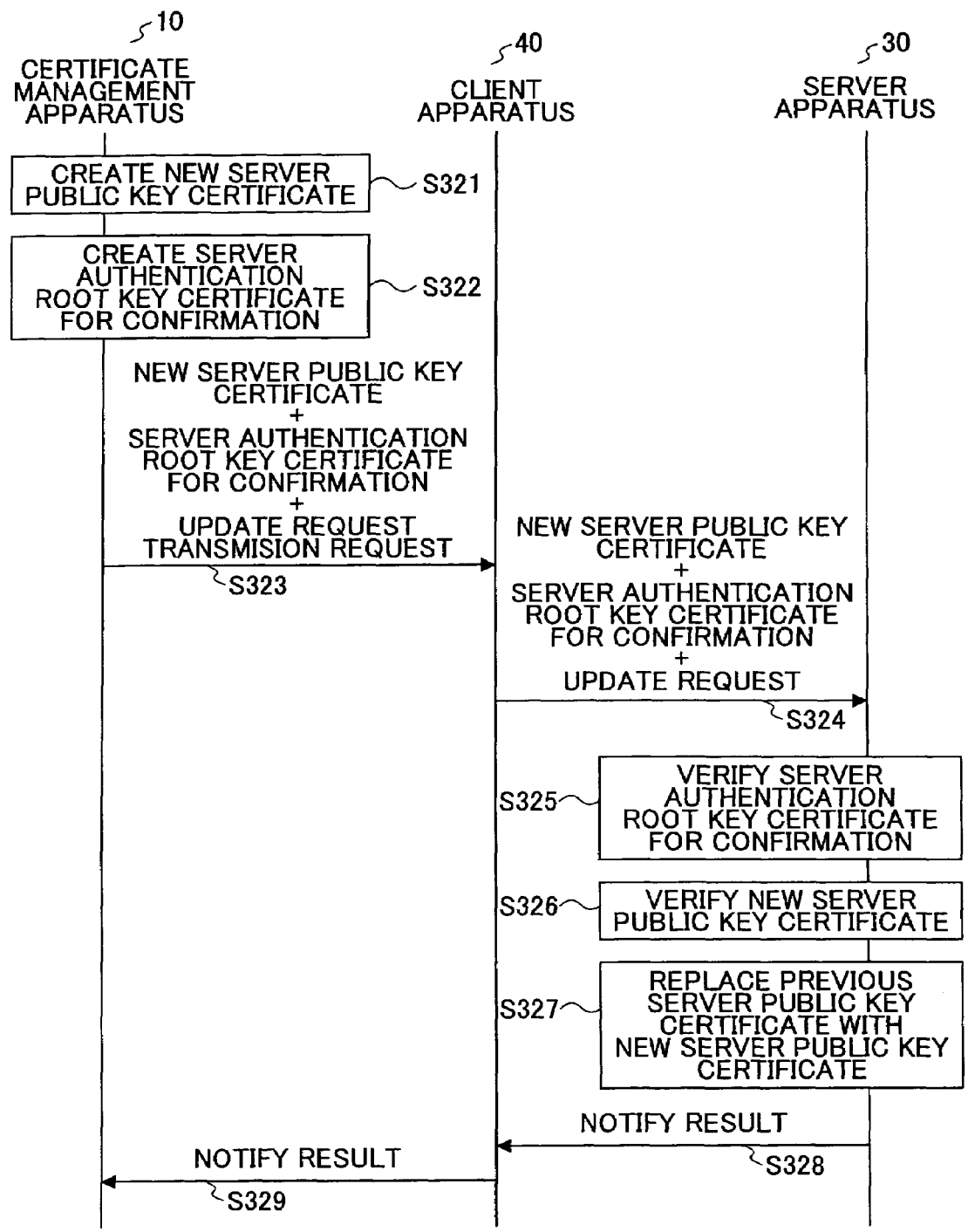
FIG. 20 is a sequence diagram showing a public key certificate storing process in the server apparatus.

The server authentication root key updating process described here is a process according to the third embodiment of the digital certificate management method of the present invention. In this process, the process S shown in the sequence diagram of FIG. 6 and processes 21 through 23 shown in the sequence diagrams of FIGS. 17 through 19 are performed in this order. Each of these processes is performed by executing a predetermined control program by each of the CPUs of the certificate management apparatus 10, the server apparatus 30, and the client apparatus 40.

In the server authentication root key updating process, as in the first embodiment, first, the process 21 (a root key certificate storing process in the client apparatus 40) shown in FIG. 19 is performed after performing the process S (the server authentication root key certificate creation process) shown in FIG. 6.

This process has the object the same as that of the process 1 shown in FIG. 7. However, here, since it is the client apparatus 40 that directly communicates with the certificate management apparatus 10, the procedure is somewhat different.

That is, first, in step S311, the certificate management apparatus 10 transmits to the client apparatus 40 the server authentication root key certificate for distribution created in step S102 of FIG. 6 and an update request thereof. In the case of the process 1, the above-mentioned certificate and the update request are transmitted to the client apparatus 40 via the server apparatus 30. However, here, it is possible to directly transmit the certificate and the update request to the client apparatus 40. In this process, the CPU 11 of the certificate management apparatus 10 functions as the first transmission means.

Upon reception of the update request transmitted in step S311, the client apparatus 40 verifies in step S312 the server authentication root key certificate for distribution by using the previous server authentication root key. When the server authentication root key certificate for distribution is verified, in step S313, the server authentication root key certificate for distribution is stored in the certificate storing part 41. These processes are the same as those in steps S114 and S115 of FIG. 7.

Then, in step S314, the client apparatus 40 returns a result notice to the certificate management apparatus 10 as the response to the update request.

In the aforementioned manner, the root key certificate storing process in the client apparatus 40 is performed.

Then, the process 22 (a public key certificate storing process in the server apparatus 30) shown in the sequence diagram of FIG. 18 is subsequently performed.

This process has the object the same as that in the process 2 shown in FIG. 8. However, as in the case of the process 21, the procedure is somewhat different.

That is, first, in steps S321 and S322, as in the cases of steps S121 and S122 of FIG. 8, the new server public key certificate and the server authentication root key certificate for confirmation are created. Then, in step S323, the certificate management apparatus 10 transmits to the client apparatus 40 the new server public key certificate, the server authentication root key certificate for confirmation, and an update request transmission request that requests the client apparatus 40 to transmit an update request of the new server public key certificate to the server apparatus 30.

In response to the update request transmission request, the client apparatus 40 transmits in step S324 the server authentication root key certificate for confirmation and the update request thereof to the server apparatus 30. Since it is possible for the client apparatus 40 to request communications with respect to the server apparatus 30, it is unnecessary to wait for the communication request as in the case of steps S112 and S113 of FIG. 7.

With the above-mentioned processes, the server authentication root key certificate for confirmation and the update request are transmitted from the certificate management apparatus 10 to the server apparatus 30 via the client apparatus 40. In the process of step S323, the CPU 11 of the certificate management apparatus 10 functions as the second transmission means.

Upon reception of the update request, the server apparatus 30 verifies in step S325 the server authentication root key certificate for confirmation by using the client authentication root key. In step S326, the server apparatus 30 verifies the new server public key certificate by using the new server authentication root key included in the verified server authentication root key certificate for confirmation. When the new server public key certificate is verified, in step S327, the server apparatus 30 stores the new server public key certificate in the certificate storing part 41, and the previous server public key certificate is replaced with the new server public key certificate. These processes are the same as those in steps S124 through S126 of FIG. 8.

In step S328, the server apparatus 30 returns a result notice to the certificate management apparatus 10 as the response to the update request. The result notice is first transmitted to the client apparatus 40, and then the client apparatus 40 transmits the result notice to the certificate management apparatus 10 in step S329.

In the aforementioned manner, the root key certificate storing process in the server apparatus 30 is performed.

Figure 21:
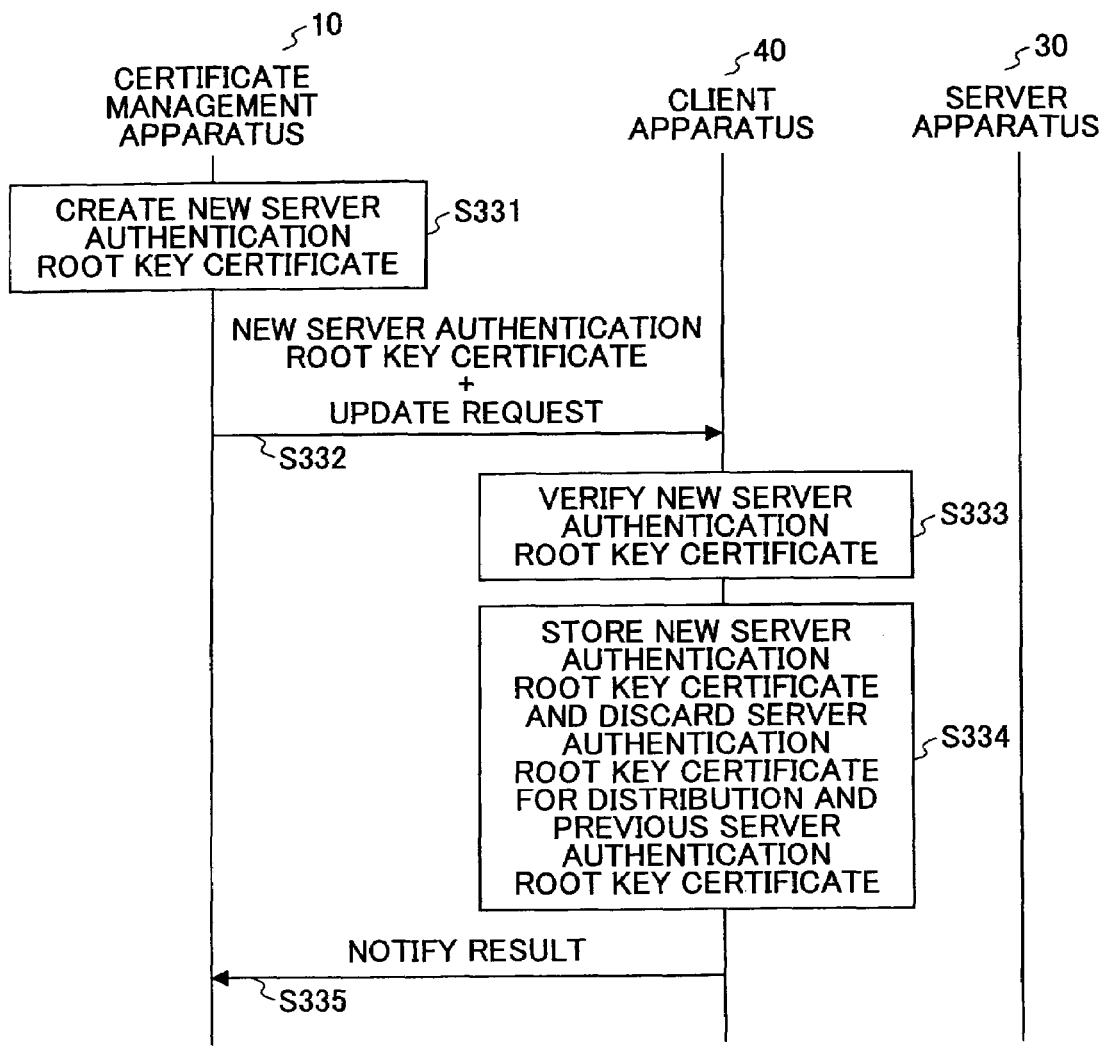
FIG. 21 is a sequence diagram showing a root key certificate rewriting process in the client apparatus.

Then, the process 23 (a root key certificate rewriting process in the client apparatus 40) shown in the sequence diagram of FIG. 21 is subsequently performed, and the server authentication root key updating process ends. The process 23 has the object the same as that of the process 3, which is described above in the first embodiment with reference to FIG. 9. As in the case of the process 21, the communication procedure is somewhat changed since it is the client apparatus 40 that directly communicates with the certificate management apparatus 10. Thus, a description of the process is omitted.

As mentioned above, in the server authentication root key updating process according to the third embodiment, the processes corresponding to those in the first embodiment shown in FIG. 15 are performed in a similar manner. In addition, the effects obtained by the processes are similar to those in the first embodiment.

That is, in the digital certificate management system according to the third embodiment, by performing the server authentication root key updating process in such a procedure, even in a case where the certificate management apparatus 10 can communicate only with the client apparatus 40 among the apparatuses constructing the client/server system, as in the case of the first embodiment, it is possible to update the root key by automatic control without significantly affecting the mutual authentication process between the server apparatus 30 and the client apparatus 40. Accordingly, by using such a digital certificate management system, it is possible to operate a client/server system that performs the authentication process according to the SSL at the time of communications at low cost.

As for the client authentication root key updating process, since it is the client apparatus 40 that directly communicates with the certificate management apparatus 10, by performing each of the processes described with reference to FIGS. 12 through 15 by somewhat changing the communication procedure as in the case of the process 21, it is possible to obtain the effects similar to those in the case of the second embodiment.

In addition, a variation similar to that in the case of the first embodiment may also be applied.

Further, in this embodiment, though it is necessary to provide the server function part 44 in the client apparatus 40, it is unnecessary to wait for a communication request in the procedure of the root key updating process. Thus, it is possible to perform the process without delay and complete the process in a short time interval.

Fourth Embodiment

FIGS. 22 through 27

Next, a description is given of the digital certificate management system according to a fourth embodiment of the present invention, which system is constructed by the certificate management apparatus 10, which is the digital certificate management apparatus according to the present invention, and the client apparatus 40 and the server apparatus 30 constructing a client/server system.

The digital certificate management system of the fourth embodiment is different from that of the first embodiment only in the contents of the root key updating process. The structures of the apparatuses are the same as those in the first embodiment, and a description thereof is omitted.

The root key updating operation in the digital certificate management system is an operation according to the fourth embodiment of the digital certificate management method of the present invention. In this operation, a process U and processes 31 through 33 shown in the sequence diagrams of FIGS. 20 through 25 are performed in this order. The processes shown in each of the following figures are performed by the CPUs of the certificate management apparatus 10, the server apparatus 30, and the client apparatus 40 by executing a predetermined control program.

The operation described in this embodiment is an operation that is effective in a case where the server authentication root key and the client authentication root key are updated at the same time. In such a case, as described below, it is effective to perform a process in which updating of both root keys is performed as a series of processes, and the public key certificate and the root key certificate are transmitted at a time for each apparatus.

Figure 22:
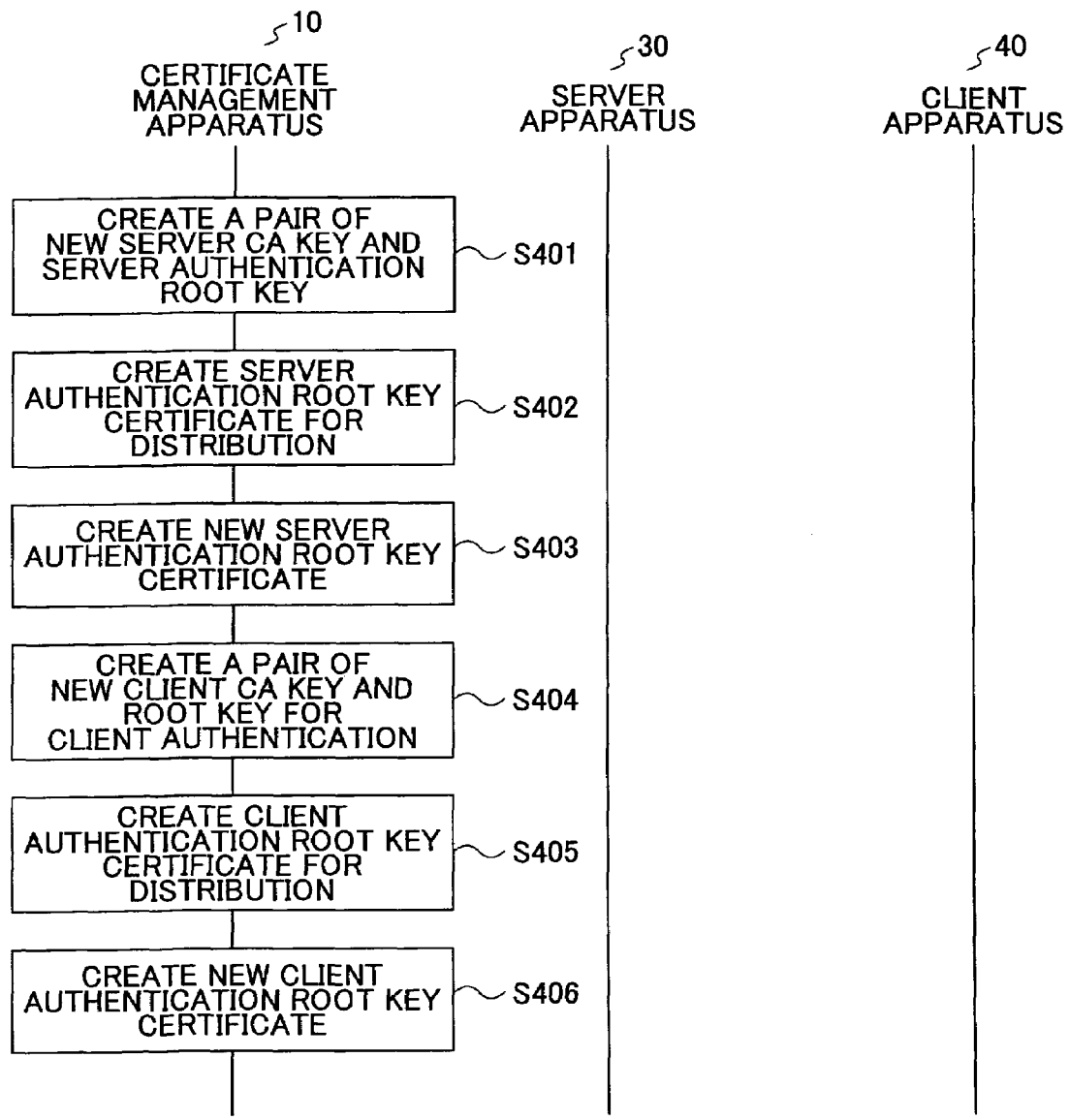
FIG. 22 is a sequence diagram showing a root key certificate creation process, which is a part of the root key updating process in the digital certificate management system according to a fourth embodiment of the present invention.

Upon detection of a reason for updating, the certificate management apparatus 10 of the digital certificate management system starts a process shown in the sequence diagram of FIG. 22.

The process shown in FIG. 22 is a process U (root key certificate creation process) corresponding to the process S described in the first embodiment with reference to FIG. 6. First, in steps S401 and S402, as in the case of steps S101 and S102 of FIG. 6, a pair of the new server CA key and the server authentication root key are created with respect to a valid server CA key, and the server authentication root key certificate for distribution, which is the first server certification key certificate, is created by attaching a digital signature using the previous server CA key to the new server authentication root key. In step S403, as in the case of step S131 of FIG. 9, the new server authentication root key certificate, which is the second server certification key certificate, is created by attaching a digital signature using the new server CA key to the new server authentication root key.

In steps S404 through S406, a pair of the new client CA key and the client authentication root key are created with respect to a valid client CA key, and the client authentication root key certificate for distribution, which is the first client certification key certificate, is created by attaching a digital signature using the previous client CA key to the new client authentication root key. Further, the new client authentication root key certificate, which is the second client certification key certificate, is created by attaching a digital signature using the new client CA key to the new client authentication root key.

Figure 23:
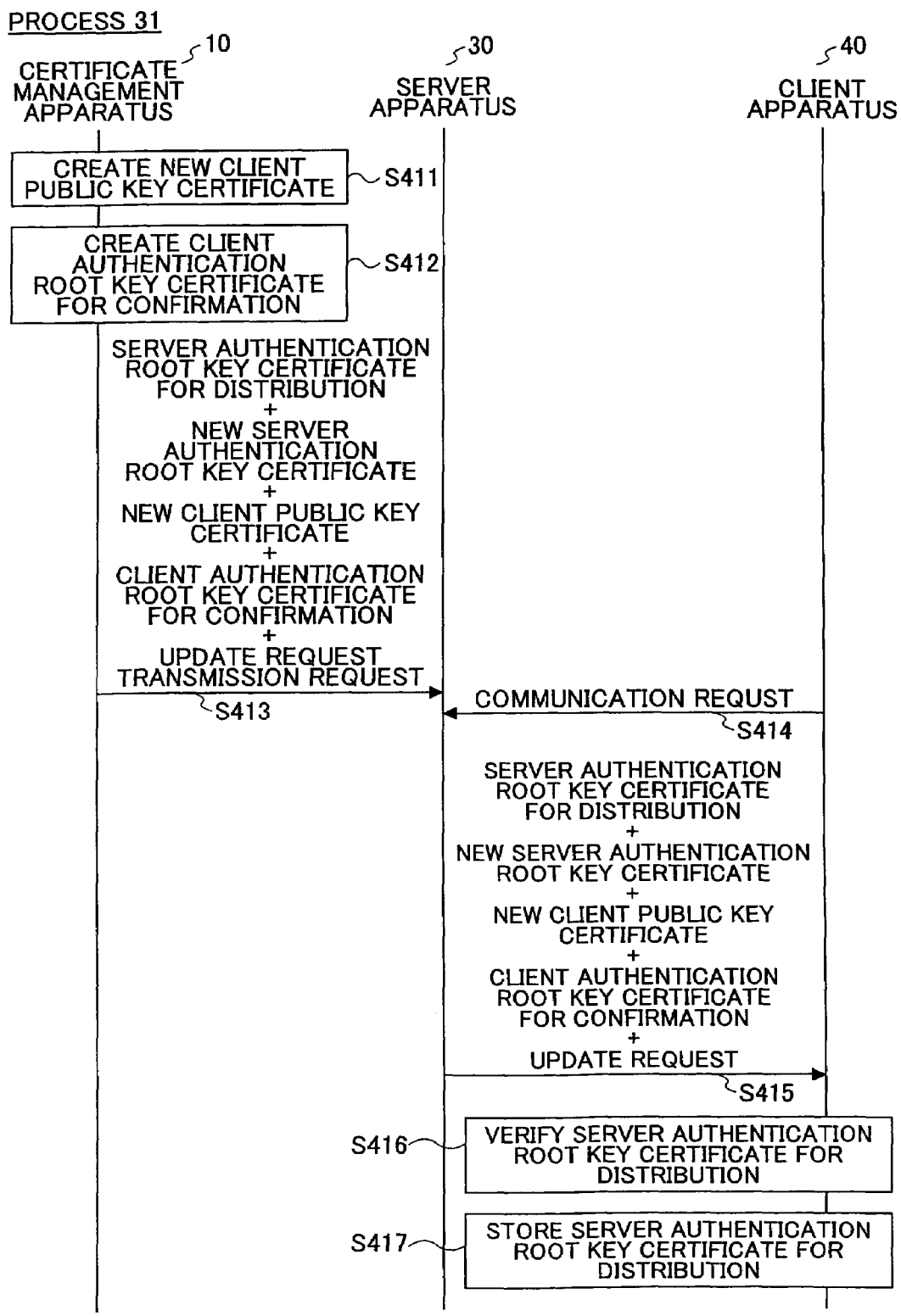
FIG. 23 is a sequence diagram showing a subsequent part of the root key updating process in the client apparatus.
Figure 24:
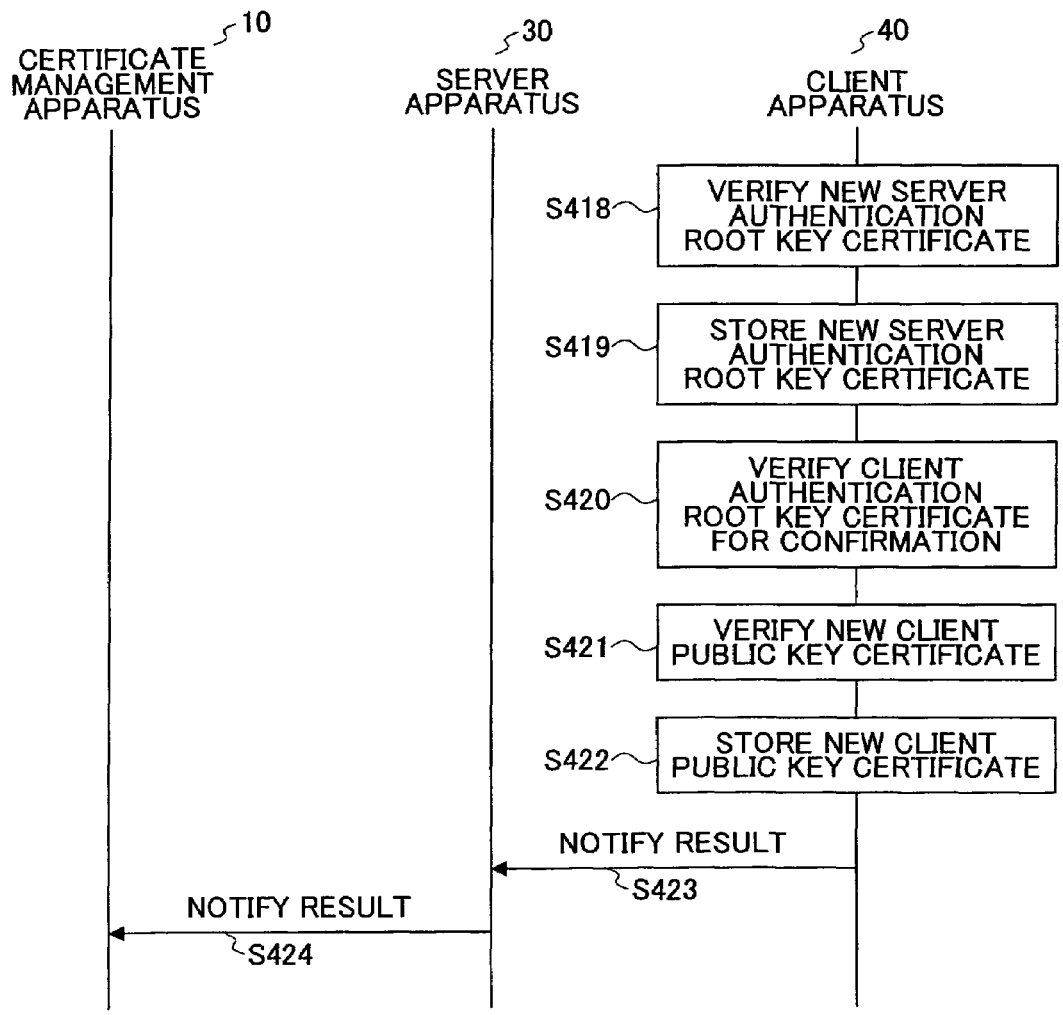
FIG. 24 is a sequence diagram showing a continuation of the subsequent part of the root key updating process in the client apparatus.

Then, a process 31 (an updating process in the client apparatus 40) shown in the sequence diagrams of FIGS. 23 and 24 is subsequently performed. This process corresponds to a process including the process 1 shown in FIG. 7, the process 12 shown in FIG. 16, and a part of the process 3 shown in FIG. 9.

First, in steps S411 and S412, as in the case of steps S221 and S222 of FIG. 14, the certificate management apparatus 10 creates the new client public key certificate by attaching a digital signature using the new client CA key to the client public key, and the client authentication root key certificate for confirmation by attaching a digital signature using the new server CA key to the new client authentication root key. Step S412 is different from step S222 of FIG. 14 in that the new server CA key is used for creation of the client authentication root key certificate for confirmation.

In step S413, the certificate management apparatus 10 transmits to the server apparatus 30 the server authentication root key certificate for distribution created in step S402 of FIG. 22, the new server authentication root key certificate created in step S403 of FIG. 22, the new client public key certificate created in step S411, the client authentication root key certificate for confirmation created in step S412, and an update request transmission request that requests the server apparatus 30 to transmit to the client apparatus 40 an update request of each of the above-mentioned certificates other than the client authentication root key certificate for confirmation. In response to the update request transmission request, as in the case of steps S224 and S225 of FIG. 16, the server apparatus 30 transmits in step S415 the certificates and the update request to the client apparatus 40 as a response to a communication request from the client apparatus 40 in step S414.

With the above-mentioned processes, the certificates and the update request are transmitted from the certificate management apparatus 10 to the client apparatus 40 via the server apparatus 30. In the process of step S413, the CPU 11 of the certificate management apparatus 10 functions as the first transmission means.

Upon reception of the update request, in steps S416 and S417, as in the case of steps S114 and S115 of FIG. 7, the client apparatus 40 verifies the server authentication root key certificate for distribution by using the previous server authentication root key, and when verified, stores the server authentication root key certificate for distribution in the certificate storing part 41. On this occasion, the previous server authentication root key certificate is not yet deleted.

FIG. 24 shows the subsequent processes of the process 31. In steps S418 and S419, as in the case of steps S135 and S136 of FIG. 9, the new server authentication root key certificate is verified by using the server authentication root key certificate for distribution, and when verified, the new server authentication root key certificate is stored. Although the server authentication root key certificate for distribution may be deleted at this point, here, the server authentication root key certificate for distribution remains stored.

In the processes of steps S416 through S419, the CPU of the client apparatus 40 functions as the second client update means.

In steps S420 through S422, as in the case of steps S226 through S228 of FIG. 16, the client authentication root key certificate for confirmation is verified by using the new server authentication root key included in the new server authentication root key certificate, and when verified, the new client public key certificate is verified by using the client authentication root key certificate for confirmation. When the new client public key certificate is verified, the new client public key certificate is stored in the certificate storing part 41. It should be noted that, here, since the new server authentication root key certificate is already stored, not the previous server authentication root key but the new server authentication root key included in the new server authentication root key certificate is used for verification of the client authentication root key certificate for confirmation.

Further, here, since the new client authentication root key is not stored in the server apparatus 30, the previous client public key certificate is not deleted and remains stored. The reason for this is described in the second embodiment with reference to FIG. 16.

In the processes of steps S420 through S422, the CPU of the client apparatus 40 functions as the first client-side update means.

The process of steps S420 through S422 may be performed before the processes of steps S418 and S419. In this case, the verification in step S420 is performed by using the root key certificate for distribution.

In step S423, the client apparatus 40 returns a result notice to the certificate management apparatus 10 as the response to the update request. The result notice is first transmitted to the server apparatus 30, and then the server apparatus 30 transmits the result notice to the certificate management apparatus 10 in step S424.

In the aforementioned manner, the updating process in the client apparatus 40 ends.

In the updating process, the previous server authentication root key certificate is also stored in the client apparatus 40 at the time of step S420. Thus, the client authentication root key certificate for confirmation may be verified by using the previous server authentication root key certificate. In this case, the client authentication root key certificate for confirmation is created by attaching a digital signature using the previous server CA key to the new client authentication root key.

Figure 25:
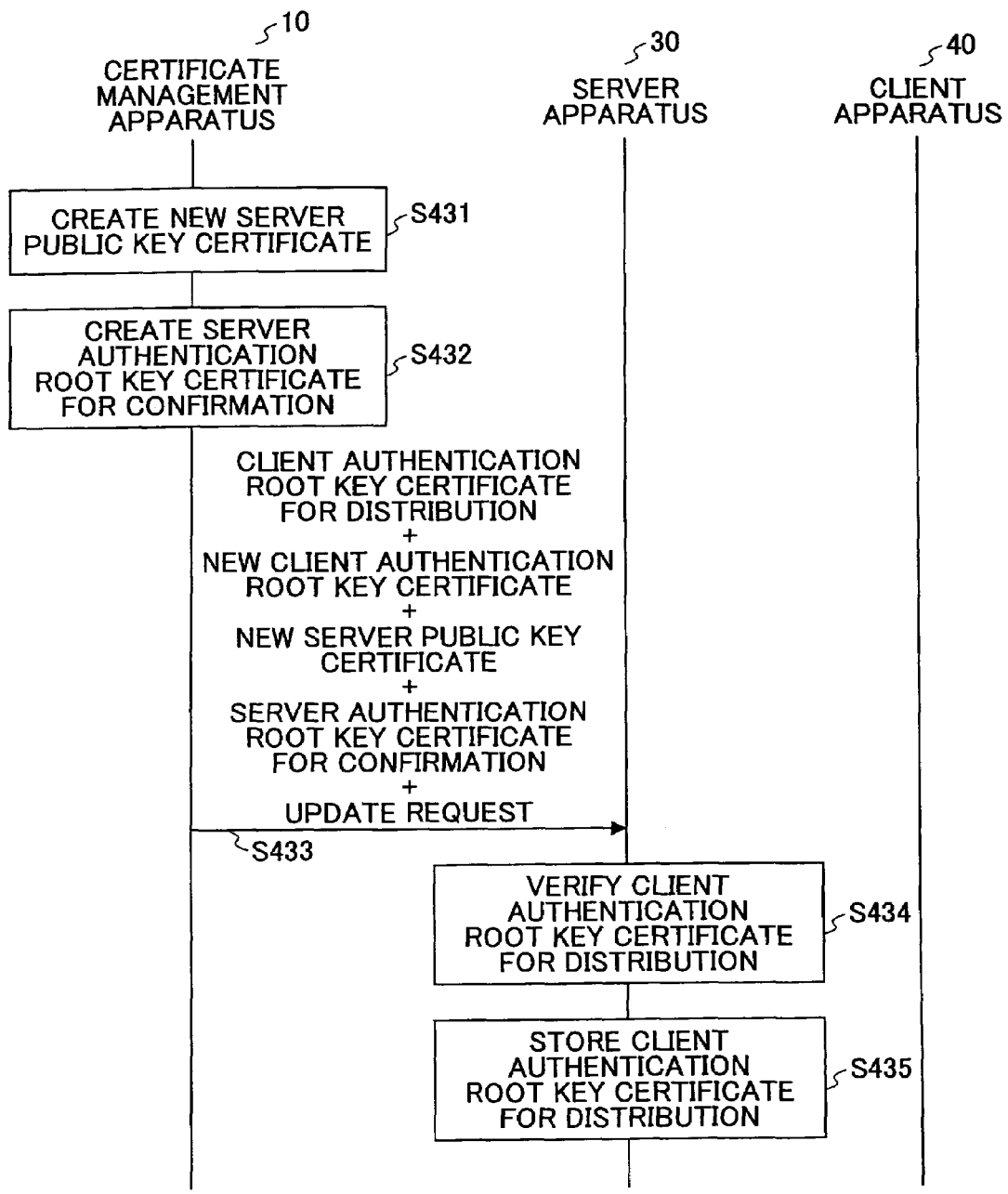
FIG. 25 is a sequence diagram showing a subsequent part of the updating process in the server apparatus.
Figure 26:
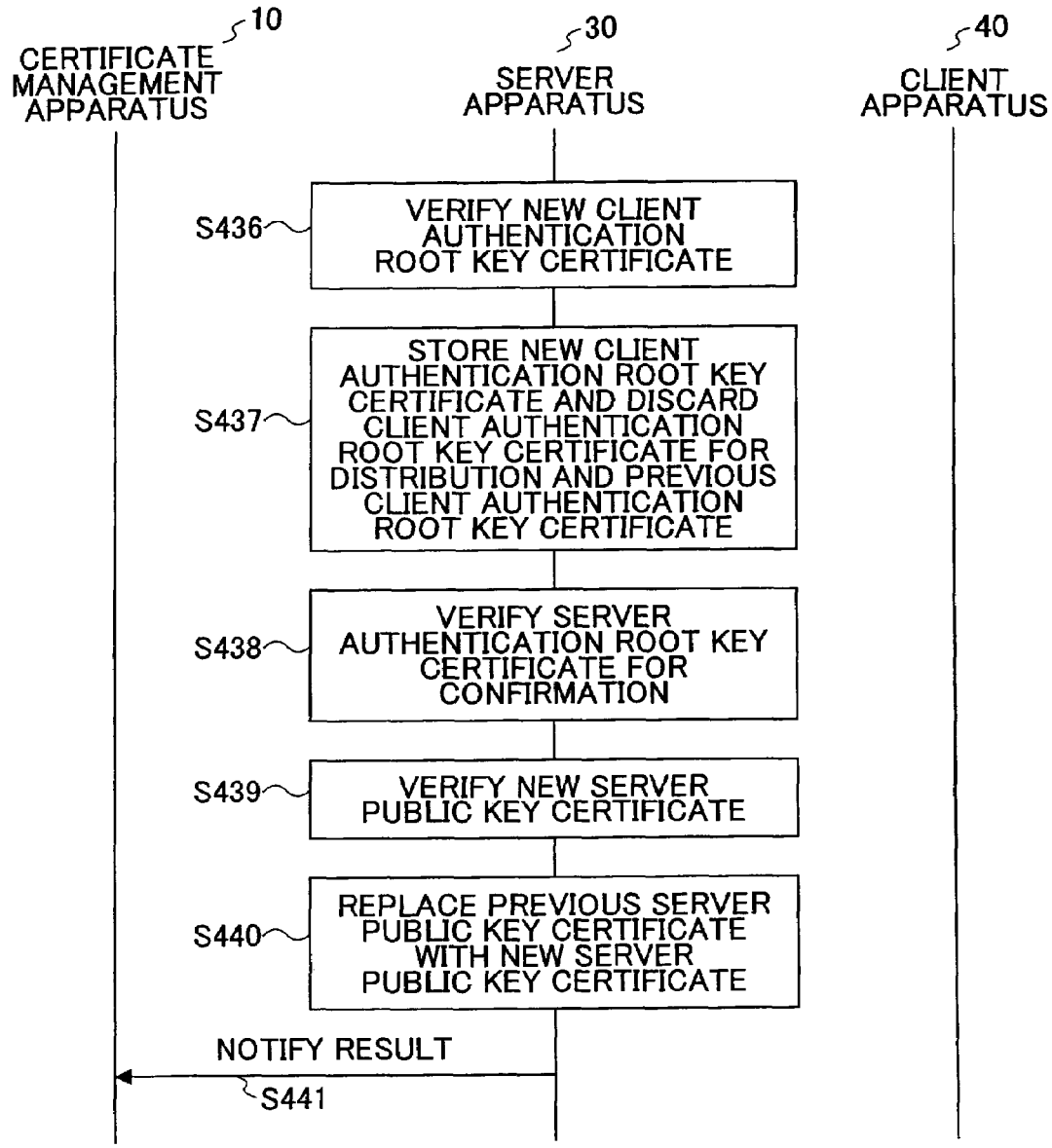
FIG. 26 is a sequence diagram showing a continuation of the updating process in the server apparatus.

Then, a process 32 (an updating process in the server apparatus 30) shown in the sequence diagrams of FIGS. 25 and 26 is subsequently performed. This process corresponds to a process including the process 11 shown in FIG. 15, the process 2 shown in FIG. 8, and a part of the process 13 shown in FIG. 17.

First, in steps S431 and S432, as in the case of steps S121 and S122 of FIG. 8, the certificate management apparatus 10 creates a new server public key certificate by attaching a digital signature using the new server CA key to the server public key, and creates a server authentication root key certificate for confirmation by attaching a digital signature using the new client CA key to the new server authentication root key. Step S432 is different from step S122 of FIG. 8 in that the new client CA key is used for creation of the server authentication root key certificate for confirmation.

In step S433, the certificate management apparatus 10 transmits to the server apparatus 30 the client authentication root key certificate for distribution created in step S405 of FIG. 22, the new client authentication root key certificate created in step S406 of FIG. 22, the new server public key certificate created in step S431, and the server authentication root key certificate for confirmation created in step S432, and an update request of each of the above-mentioned certificates other than the server authentication root key certificate for confirmation. In the process of step S433, the CPU 11 of the certificate management apparatus 10 functions as the second transmission means.

Upon reception of the update request, in steps S434 and S435, as in the case of steps S212 and S213, the server apparatus 30 verifies the client authentication root key certificate for distribution by using the previous client authentication root key, and when verified, stores the client authentication root key certificate for distribution in the certificate storing part 31. On this occasion, the previous client authentication root key certificate is not yet deleted.

FIG. 26 shows the subsequent processes of the process 32. In steps S436 and S437, as in the case of steps S233 and S234 of FIG. 17, the new client authentication root key certificate is verified by using the client authentication root key certificate for distribution, and when verified, the new client authentication root key certificate is stored. At this point, since the new client public key certificate is already stored in the client apparatus 40, the previous client authentication root key certificate is unnecessary. Hence, the previous client authentication root key certificate is disposed of. In addition, since the client authentication root key certificate for distribution is also unnecessary, the client authentication root key certificate for distribution is also disposed of. These certificates are disposed of at this point, since the procedure of the process is more simplified by disposing of the certificates at this point than by disposing of the certificates in a further process. Of course, a request for disposal may be issued in a further process.

In steps S434 through S437, the CPU of the server apparatus 30 functions as the second server-side update means.

In steps S438 through S440, as in the case of steps S124 through S126 of FIG. 8, the server authentication root key certificate for confirmation is verified by using the new client authentication root key certificate, and when verified, the new server public key certificate is verified by using the server authentication root key certificate for confirmation. When the new server public key certificate is verified, the new server public key certificate is stored in the certificate storing part 31, and the previous server public key certificate is deleted and replaced with the new server public key certificate. Here, since the new client authentication root key certificate is already stored, not the previous client authentication root key but the new client authentication root key included in the new client authentication root key certificate is used for verification of the server authentication root key certificate for confirmation.

In the processes of steps S420 through S422, the CPU of the client apparatus 40 functions as the first client-side update means.

The reason for deleting the previous server public key certificate at this point is the same as that described in the first embodiment with reference to FIG. 8. At the time of step S440, the new root key is already stored in the client apparatus 40. Thus, if the new server public key certificate is stored, there is no problem in the authentication process.

The processes of steps S438 through S440 may be performed before the processes of steps S436 and S437. In this case, the verification in step S438 is performed by using the client authentication root key certificate for distribution. Alternatively, in this case, verification of the server authentication root key certificate for confirmation may be performed by using the previous client authentication root key certificate.

In step S441, the server apparatus 30 returns a result notice to the certificate management apparatus 10 as a response with respect to the update request.

In the aforementioned manner, the updating process in the client apparatus 40 ends, and the root key updating process in the server apparatus 30 is completed.

Figure 27:
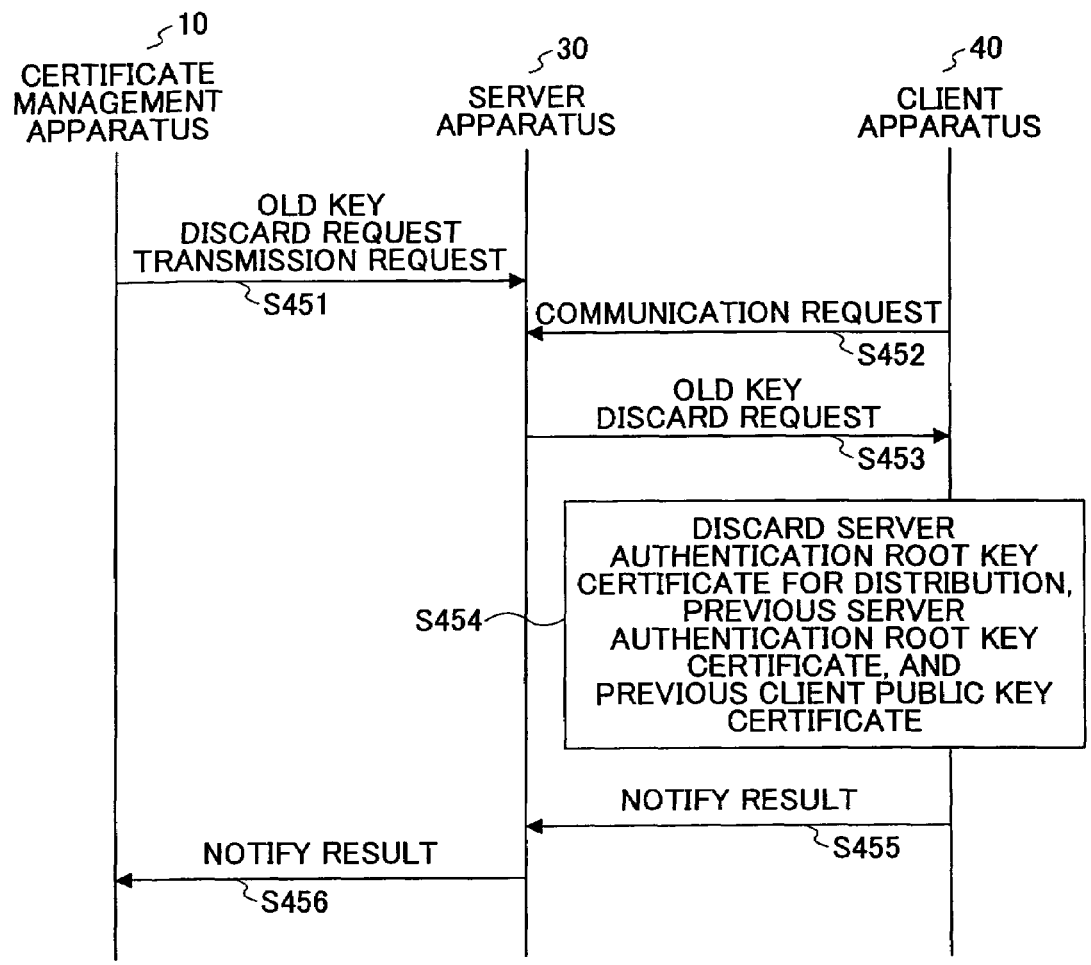
FIG. 27 is a sequence diagram showing a subsequent old key disposal process in the client apparatus.

Then, a process 33 (an old key discard process in the client apparatus 40) shown in the sequence diagram of FIG. 27 is subsequently performed.

First, in step S451, the certificate management apparatus 10 transmits to the server apparatus 30 an old key discard request transmission request that requests the server apparatus 30 to transmit to the client apparatus 40 an old key discard request that requests for disposal of an unnecessary digital certificate. In response to the old key discard request transmission request, the server apparatus 30 transmits the old key discard request to the client apparatus 40 in step S453 as a response to a communication request from the client apparatus 40 in step S452.

In the aforementioned manner, the old key discard request is transmitted from the certificate management apparatus 10 to the client apparatus 40 via the server apparatus 30.

Upon reception of the old key discard request, the client apparatus 40 discards in step S454 the server authentication root key certificate for distribution, the previous server authentication root key certificate, and the previous client public key certificate, which are stored in the certificate storing part 41. At this point, even if these certificates are deleted, mutual authentication is not affected since the new client authentication root key certificate and the new server public key certificate are stored in the server apparatus the server apparatus 30.

In step S455, the client apparatus 40 returns a result notice to the certificate management apparatus 10 as the response to the old key discard request. The result notice is first transmitted to the server apparatus 30, and then the server apparatus 30 transmits the result notice to the certificate management apparatus 10 in step S456.

In the aforementioned manner, the root key rewriting process in the client apparatus 40 is performed, and the server authentication root key updating process ends.

In the digital certificate management system, by performing the root key updating process in the aforementioned procedure, as in the case of the first embodiment, it is possible to update the root key by automatic control without significantly affecting the mutual authentication process between the server apparatus 30 and the client apparatus 40. Accordingly, by using such a digital certificate management system, it is possible to update the root key without preparing a special communication channel for updating the root key. Hence, it is possible to operate a client/server system that performs the authentication process according to the SSL at the time of communications at low cost.

In this embodiment, since the new client public key certificate is stored in the client apparatus 40 before storing the new client authentication root key in the server apparatus 30, overhead processing may occur in communications, which overhead processing is caused since it is impossible for the server apparatus 30 to decrypt the digital signature in the new client public key certificate, until the new client authentication root key is stored in the server apparatus 30. On the other hand, it is possible to perform the updating process of the root key only by transmitting three requests in total from the certificate management apparatus 10 to the server apparatus 30 (or to the client apparatus 40 via the server apparatus 30). Accordingly, in a case where the server authentication root key and the client authentication root key are updated at the same time, compared to the case of the first embodiment in which transmission of six requests is required, there is an advantage in that management of the processing procedure and designing of programs are easy. In a case where the number of server apparatuses and client apparatuses in which the root key certificate is to be updated is large, the advantage becomes greater. Thus, this embodiment is effective.

In addition, in the process 31 and the process 32, by storing necessary certificates at a time after verifying each of the certificates, it is possible to reduce the number of times of access to a nonvolatile memory that stores certificates. Thereby, it is possible to reduce the processing load and to increase the speed of processing.

Further, the update procedure of this embodiment may be applied also to a case where the client apparatus 40 can directly communicate with the certificate management apparatus 10 as in the case of the third embodiment. In this case, similar to the case of the third embodiment, the procedure of the processes shown in FIGS. 20 through 25 may be somewhat changed.

Fifth Embodiment

FIGS. 28 through 32

Next, a description is given below of the structure of the digital certificate management system according to a fifth embodiment of the present invention, which system is constructed by the certificate management apparatus 10, which is a digital certificate management apparatus according to the present invention, and the client apparatuses 40 and the server apparatus 30 constructing a client/server system.

Figures 28, 29:
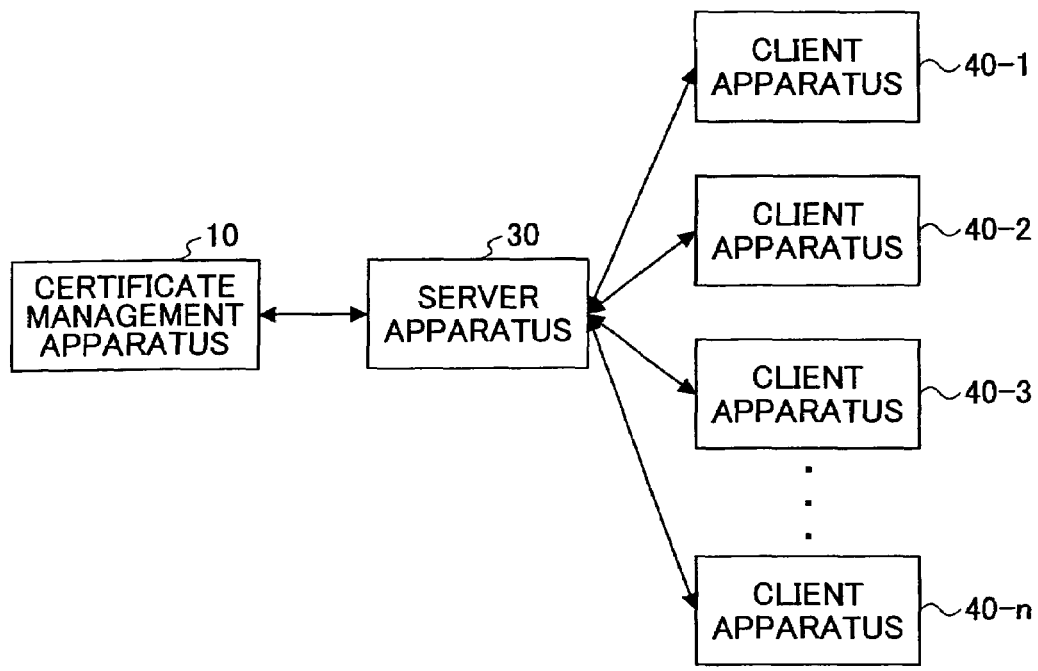
FIG. 28 is a block diagram showing relationships among apparatuses constructing the digital certificate management system according to a fifth embodiment of the present invention.
FIG. 29 is a table showing a storing format of the information of each node stored in the structure storing part 26 shown in FIG. 2.

FIG. 28 shows the relationships between each apparatus constructing the digital certificate management system.

As shown in FIG. 28, in the digital certificate management system, the client/server system is constructed by one server and a plurality of client apparatuses. The structures of the certificate management apparatus 10, the server apparatus 30, and the client apparatus 40 are the same as those in the first embodiment, and a detailed description and illustration thereof are omitted. However, client apparatuses 40-1 through 40-n are provided such that the client apparatuses 40-1 through 40-n can communicate with the server apparatus 30. Communications between the certificate management apparatus 10 and each of the client apparatuses 40-1 through 40-n are performed via the server apparatus 30.

FIG. 29 shows a storing format of the information of each of the nodes constructing the client/server system in the structure storing part 26 of the certificate management apparatus 10 in the digital certificate management system. As shown in FIG. 29, for each of the nodes, the structure storing part 26 stores a node ID, whether it is possible to directly communicate with the certificate management apparatus (CA) 10, the ID of each node that serves as a communication party of the node, and information indicating whether the node functions as a client or a server when communicating with the communication party. Also, for each of the nodes, information of a root key to be used for verifying a public key certificate transmitted from the communication party and a root key of the communication party used by the communication party for verifying a received public key certificate is stored as the information of root keys used when performing mutual authentication prior to communications with the communication party. In addition, information indicating the update states of the root keys are also stored. Here, it is assumed that the "communication party" represents a party that performs communication after performing authentication. Further, the IDs of a root key certificate and a public key certificate stored in each node may be stored together with the expiration dates thereof as information of the node.

The above-mentioned information is the constituent information.

FIGS. 30A, 30B and 30C show specific examples of information stored in the format shown in FIG. 29.

As for the information related to the server apparatus 30 shown in FIG. 28, the information as shown in FIG. 30A is stored. That is, "server apparatus 30" is stored as the node ID, and since it is possible for the server apparatus 30 to directly communicate with the certificate management apparatus 10, the information thereof is stored. The information of each of the client apparatuses 40-1 through 40-n is stored as the information of a node that becomes a communication party. Additionally, since the server apparatus 30 functions as a server when communicating with each of the client apparatuses 40-1 through 40-n, the information thereof is stored.

Further, "client authentication root key" is stored as the information of the used root key, and "server authentication root key" is stored as the information of the root key of the communication party. With the information, it is determined that a digital signature should be attached to the server public key certificate to be stored in the server apparatus 30 by using a server CA key so that the server public key certificate can be verified with the use of the server authentication root key, which is the root key of the communication party. In addition, it is determined that a digital signature should be attached to the client public key certificate to be stored in each of the client apparatuses 40-1 through 40-n by using a client CA key so that the client public key certificate can be verified with the use of the client authentication root key, which is the used root key.

In addition, the information indicating that it is unnecessary to update the client authentication root key but it is necessary to update the server authentication root key is also stored.

As for each of the client apparatuses 40-1 through 40-n, the storing format of either of FIG. 30B or FIG. 30C may be applied. FIGS. 30B and 30C show the recording examples for client apparatus 40-1. In both FIGS. 30B and 30C, "client apparatus 40-1" is stored as a node ID, and also stored is the information indicating that it is impossible to directly communication with the certificate management apparatus 10, since the client apparatus 40-1 communicates with the certificate management apparatus 10 via the server apparatus 30. However, the storing formats of FIGS. 28B and 28C are different in the storing format of the information of a node, which becomes a communication party.

That is, in the storing format of FIG. 30B, the information indicating that it is possible to communicate with the server apparatus 30, and information of the used root key are not stored as the information related to the client apparatus 40-1, since such information is already stored in the format of FIG. 30A as the information related to the server apparatus 30, and whether the node functions as a server or a client and the used root key can be derived from the information. On the other hand, in the format of FIG. 30C, information indicating that the server apparatus 30 and the client apparatus 40-1 can communicate with each other is stored as the information related to the client apparatus 40-1.

In the format of FIG. 30B, less storage capacity for information is required. In the format of FIG. 30C, only by referring to the information of a target node, it is possible to obtain information indicating, for example, the communication party of the node and the used root key. However, whichever format is used, the communication party of each node, information indicating whether the node functions as a client or a server with respect to the communication party, and information of the root key used in mutual authentication prior to communications are stored. Thus, by referring to the above-mentioned information, it is possible to determine an update procedure of a certification key as described later.

In order to collect the information as shown in FIGS. 30A, 30B and 30C in the certificate management apparatus 10, it is preferable that each of the nodes collects as the information of the node itself a lower node that becomes a communication party, information indicating whether the node functions as a client or a server when communicating with the communication party, and information of the root key used in mutual authentication prior to communications with the communication party, and when each of the nodes communicates with the certificate management apparatus 10 for the first time, the above-mentioned information is notified to the certificate management apparatus 10 of. In addition, when there is a change, it is preferable that the change is immediately notified to the certificate management apparatus 10. Further, it is preferable that the certificate management apparatus 10 determines whether it is possible to directly communicate with each of the node and whether it is necessary to update the root key based on the information notified by each of the nodes, and sets the information.

In each of the following embodiments, similarly, it is possible to collect in the certificate management apparatus 10 the information of each of the nodes constructing a client/server system.

Next, a description is given below of a root key updating process in the digital certificate management system according to the fifth embodiment shown in FIG. 28. This process is a process according to the fifth embodiment of the digital certificate management method of the present invention.

Basically, the root key updating process performs the process S and the processes 1 through 3 described in the first or second embodiment or the process T and the processes 11 through 13 in the order described later. These processes are performed by the CPUs of the certificate management apparatus 10, the server apparatus 30, and the client apparatuses 40-1 through 40-n by executing a predetermined control program.

However, in this embodiment, since a plurality of the client apparatuses 40 (40-1 through 40-n) are provided, the processes performed with respect to the client apparatus 40 are somewhat different. That is, it is necessary to separately transmit to and store in each of the client apparatuses 40 (40-1 through 40-n) the server authentication root key certificate for distribution, the new client public key certificate, and the new server authentication root key certificate.

Figure 31:
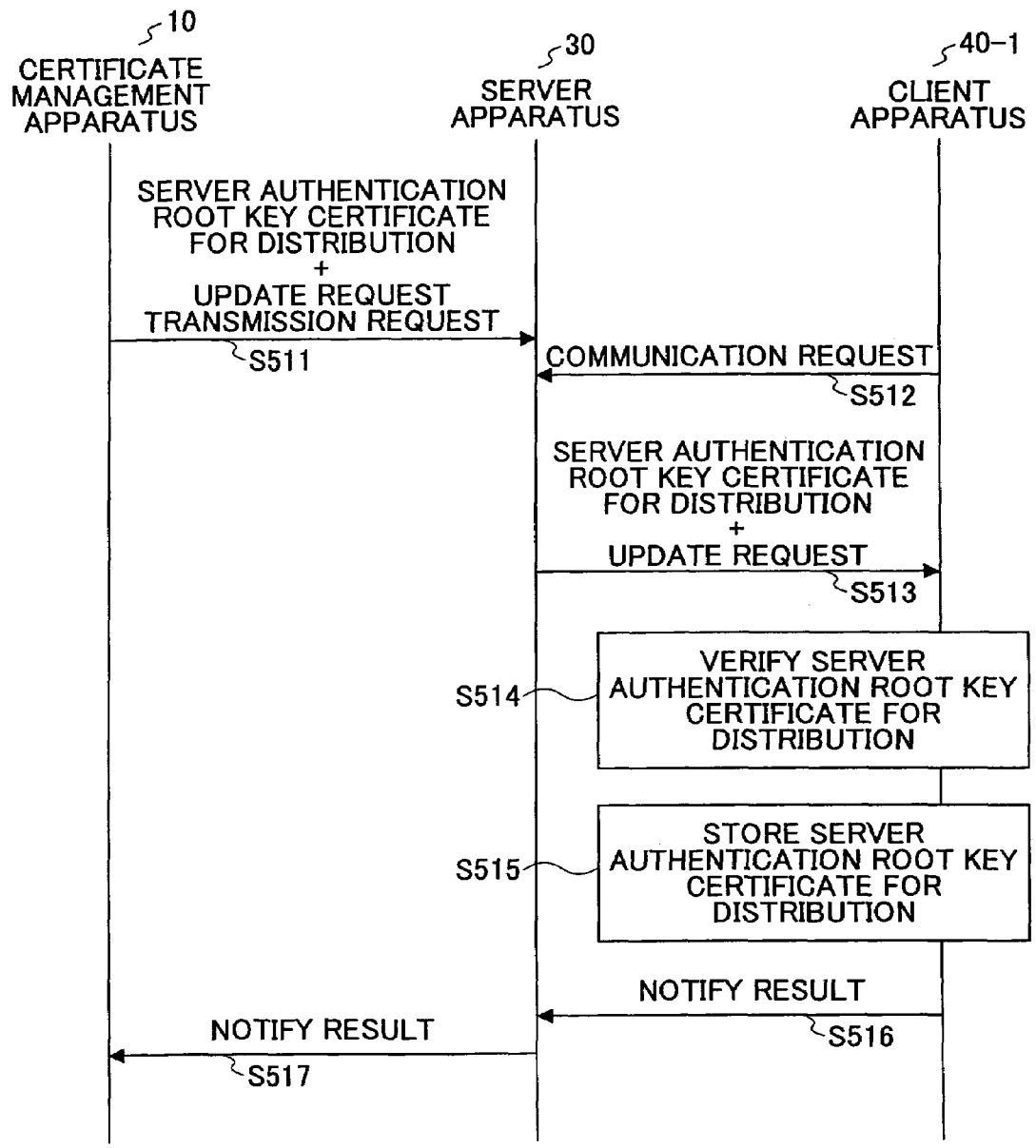
FIG. 31 is a sequence diagram for explaining changes that are made to a process explained in the first embodiment when the process is applied to the fifth embodiment.

FIG. 31 shows a process sequence as a process 1-1 in the case where the root key certificate storing process in the client apparatus 40 shown in FIG. 7 is performed with respect to the client apparatus 40-1. As can be appreciated from FIG. 31, the process flow is the same as that shown in FIG. 7. Each of the processes shown in FIG. 31 corresponds to one of the process shown in FIG. 7 and having the same step number in the last two digits. However, in an update request transmission request in step S511, the client apparatus 40-1 is specified as the transmission destination.

Additionally, though not shown in the figures, in a case where, for example, a similar change is made to the process 12 of FIG. 16, the new client public key certificate created in step S221 is used by the client apparatus 40-1.

Of course, such a process is also performed with respect to the other client apparatuses 40-2 through 40-n. However, when a condition of the time for performing the process is satisfied, the public key certificate storing process with respect to the subsequent client apparatus (e.g., the client apparatus 40-2) may be performed before receiving the response to the public key certificate storing process with respect to the first client apparatus (e.g., the client apparatus 40-1). In addition, the public key certificate storing process for a plurality of client apparatuses may be performed at a time, and the transmission destinations of update requests corresponding to the client apparatuses 40-1 through 40-n may be transmitted in step S511 to the server apparatus 30 by including the transmission destinations in one message. Also in this case, of course, the processes of steps S512 through S516 are performed for each of the client apparatuses. However, as for a result notice in step S517, the result notice may be transmitted from each of the client apparatuses, or the server apparatus 30 may transmit the result notices from the client apparatuses 40-1 through 40-n in one message.

The description is given above of the differences related to the process 1. However, the process 3 shown in FIG. 9 and the process 12 shown in FIG. 16 in this embodiment are also different from those in the first or second embodiment in similar aspects. In this embodiment, only one server apparatus 30 is provided. Thus, the processes 2, 11 and 13 performed with respect to the server apparatus 30 are similar to those in the case of the first or second embodiment.

In addition, the number 1-1 of the process 1-1 indicates a process corresponding to the process 1 for the client apparatus 40-1. Hereinafter, the numbers of processes are assigned in a similar manner by using the numbers of the client apparatuses 40-1 through 40-n. For example, a process corresponding to the process 3 for the client 40-n is indicated as a process 3-n, and a process corresponding to the process 12 for the client apparatus 40-1 is indicated as a process 12-1.

Figure 32:
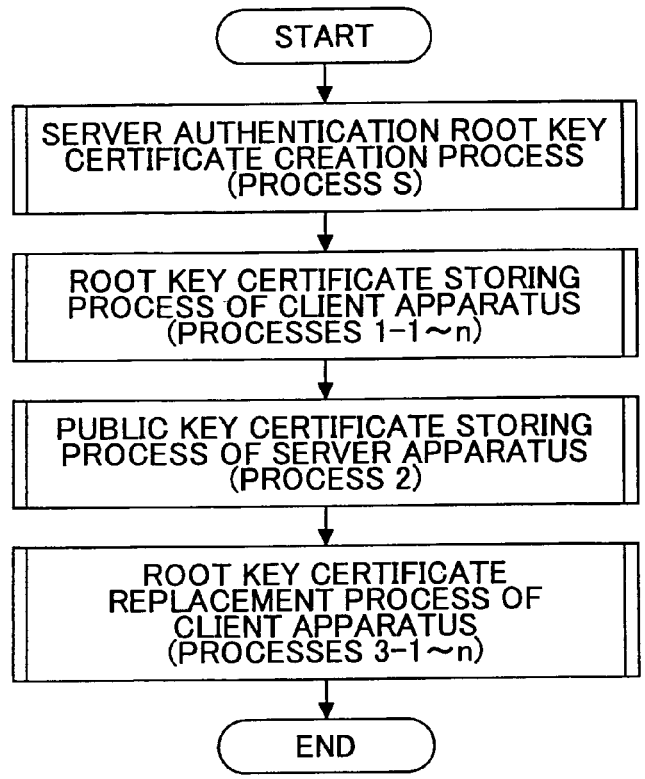
FIG. 32 is a flowchart showing an execution sequence of processes in the root key updating process in the fifth embodiment of the present invention.

FIG. 32 is a flowchart showing an exemplary timing for performing each process in a case where the server authentication root key is updated in the root key updating process in the digital certificate management system. That is, in this case, it is conceivable to first perform the process S shown in FIG. 6 and then perform the processes 1 through 3.

As is clear from FIG. 32, the root key updating process in the fifth embodiment is similar to that in the case of the first embodiment, and the process S and the processes 1 through 3 are sequentially performed. However, since it is necessary to perform the processes 1 and 3 on each of the client apparatuses 40-1 through 40-n, there are some differences.

Specifically, processes 1 through 1-n are started after completion of the process S. The process 2 is started after completion of all of the processes 1 through 1-n. Processes 3-1 through 3-n are started after completion of the process 2. Further, upon completion of all of the processes 3-1 through 3-n, updating of the server authentication root key ends.

Additionally, as for the processes 1 and 3, if the condition for starting each of the processes 1 and 3 is satisfied, the process for each of the client apparatuses 40-1 through 40-n may be performed in an arbitrary order.

In the processing procedure shown in FIG. 32, the process 2 (the public key certificate storing process in the server apparatus 30) is performed after the process 1 (the root key certificate storing process in the client apparatus 40) for all of the client apparatuses 40-1 through 40-n is completed, i.e., after there are responses, indicating that the server authentication root key certificate is stored, from all of the client apparatuses 40-1 through 40-n that become communication parties of the server apparatus 30.

As described in the first embodiment, it is necessary for the server apparatus 30 to dispose of the previous server public key certificate before storing the new server public key certificate. Thus, if the pervious server public key certificate is disposed of before the new server authentication root key is stored in all of the client apparatuses 40-1 through 40-n that become the communication parties, problems may occur in the authentication process. Conversely, if it is after the new server authentication root key is stored in all of the client apparatuses 40-1 through 40-n, even if the previous server public key certificate of the server apparatus 30 is disposed of, a problem does not occur in the authentication process.

Additionally, the processes 3-1 through 3-n (the root key certificate rewriting process in the client apparatus 40) are performed after the process 2, i.e., after there are responses, indicating that the new server public key certificate is stored, from all of the server apparatuses 30 (here, only one server apparatus 30 is provided) that become communication parties of each of the clients 40-1 through 40-n. When the processes 3-1 through 3-n are performed at the above-mentioned timing, even if the previous server authentication root key certificate is deleted, a problem does not occur in the authentication process.

Further, in a case where the client authentication root key is updated, the process T and the processes 11 through 13, which are described in the second embodiment with reference to FIGS. 12 and 13 through 15, respectively, are performed in this order. However, since it is necessary to perform the process 12 for each of the client apparatuses 40-1 through 40-n, there are some differences as in the case of the above-mentioned processes 1 and 3.

That is, processes 12-1 through 12-n are started after completion of the process 11. The process 13 is started after completion of all of the processes 12-1 through 12-n. Upon completion of the process 13, updating of the client authentication root key ends. As for the process 12, if the condition for starting is satisfied, the process for each of the client apparatuses 40-1 through 40-n may be performed in an arbitrary order.

In this process, the process 12 (the public key certificate storing process in the client apparatus 40) is performed after processes 11-1 through 11-n (the root key certificate storing process in the server apparatus 30), i.e., after there are responses, indicating that the client authentication root key certificate for distribution is received, from all of the server apparatuses 30 (here, only one server apparatus 30 is provided) that become communication parties of each of the client apparatuses 40-1 through 40-n. As described in the second embodiment, if the new root key is not stored in the server apparatuses 30, which become communication parties, at the time when the new client public key certificate is stored in the client apparatuses 40-1 through 40-n, overhead processing may occur in communications until the new root key is stored in the server apparatuses 30, which results in inefficiency.

In addition, the process 13 (the root key certificate rewriting process in the server apparatus 30) is performed after completion of all of the processes 12-1 through 12-n, i.e., after there are responses, indicating that the new client public key certificate is received, from each of the client apparatuses 40-1 through 40-n that become communication parties of the server apparatus 30. When the process 13 is performed at the above-mentioned timing, even if the previous client authentication root key certificate is deleted in the server apparatus 30, a problem does not occur in the authentication process.

Although there are some differences since the number of the client apparatus 40 is plural, the process is similar to that in the case of the first embodiment also in other aspects. By performing the root key updating process in such a procedure, as in the case of the second embodiment, it is possible to update the root key by automatic control without significantly affecting the mutual authentication process between the server apparatus 30 and each of the client apparatuses 40-1 through 40-n.

Accordingly, by using such a digital certificate management system, it is possible to update the root key without preparing a special communication channel for updating the root key. Hence, it is possible to operate a client/server system that performs the authentication process according to the SSL at the time of communications at low cost.

In addition, in a case where the server authentication root key and the client authentication root key are updated at the same time, an update procedure similar to that in the fourth embodiment may also be applied. In such a case, since the client apparatuses 40-1 through 40-n are provided, a process corresponding to the process 31 shown in FIGS. 23 and 24 and the process 33 shown in FIG. 27 is performed for each of the client apparatuses 40-1 through 40-n, which causes changes similar to those made between the process 1 and the process 1-1.

In the aforementioned manner, it is possible to obtain effects similar to those in the case of the fourth embodiment.

Additionally, the update procedure as shown in FIG. 32 can be created and managed by the update order control part 27 of the certificate management apparatus 10 based on the structure information stored in the structure storing part 26. The creation of the update procedure is a process according to an embodiment of the update procedure determination method of the present invention. In the case of this embodiment, first, referring to the information related to the server apparatus 30, which can directly communicate with the certificate management apparatus 10, it can be seen that the server apparatus 30 functions as a server and there are the client apparatuses 40-1 through 40-n as nodes that can communicate with the server apparatus 30. Additionally, it can be seen that the same client authentication root key and server authentication root key are used for communications with all of the nodes, and that it is necessary to update the client authentication root key, which is stored in the client apparatuses 40-1 through 40-n that are communication parties. Further, referring to the information related to each of the client apparatuses 40-1 through 40-n, it can be seen that there is no further node in the client/server system. Thus, it is possible to create the update procedure from the above-mentioned information.

That is, the order for performing each process required for updating the root key may be determined so as to satisfy the conditions shown in FIG. 32, for example: first, the server authentication root key certificate is stored in the client apparatuses 40-1 through 40-n, and when completed, the new server public key certificate is stored in the server apparatus 30, . . . . Alternately, the update procedure may be determined by defining the condition for performing each process such as a condition that completion of all of the processes 1-1 through 1-n is required, and starting the process when the condition is satisfied.

Further, when performing each of the above-mentioned processes in the update procedure of the root key, various kinds of certificates to be transmitted to the server apparatus 30 and the client apparatus 40 may be created at any time as long as they are prepared before when they are transmitted. Thus, the timing shown in the sequence diagram is not a limitation.

Sixth Embodiment

Figure 33:
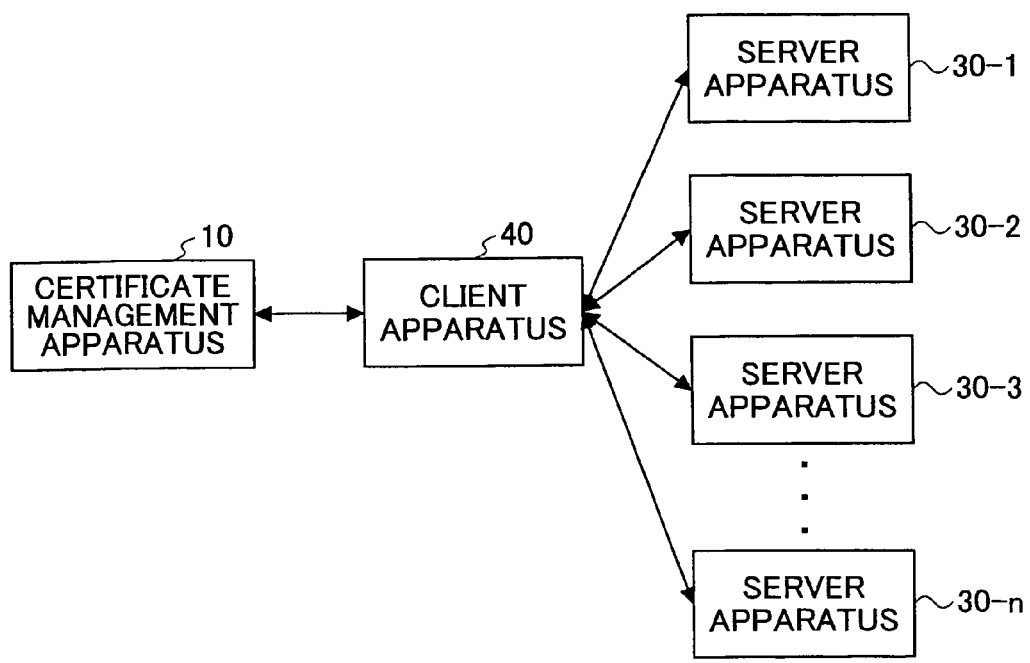
FIG. 33 is a block diagram showing relationships among apparatuses constructing the digital certificate management system according to a sixth embodiment of the present invention.

FIGS. 33 and 34

Next, a description is given below of the structure of the digital certificate management system according to a sixth embodiment of the present invention, which system is constructed by the certificate management apparatus 10, which is the digital certificate management apparatus according to the present invention, and the client apparatus 40 and the server apparatuses 30 constructing a client/server system.

FIG. 33 shows the relationships between each apparatus constructing the digital certificate management system.

As shown in FIG. 33, in the digital management system, the client/server system is constructed by one client apparatus and a plurality of server apparatuses. Since the structures of the certificate management apparatus 10, the server apparatus 30, and the client apparatus 40 are the same as those in the case of the third embodiment, a detailed illustration and description thereof are omitted. Server apparatuses 30-1 through 30-n are provided to serve as communication parties of the client apparatus 40. Communications between the certificate management apparatus 10 and each of the server apparatuses 30-1 through 30-n are performed via the client apparatus 40.

FIGS. 34A, 34B and 34C show the information of each of the nodes constructing the client/server system, which information is stored in the structure storing part 26 of the certificate management apparatus 10, in a case where the client/server system is constructed in the aforementioned manner.

That is, first, the information as shown in FIG. 34A is stored in the structure storing part 26 for the client apparatus 40. Here, "the client apparatus 40" is stored as a node ID, and the information that the client apparatus 40 can directly communicate with the certificate management apparatus 10 is stored. In addition, the information of the server apparatuses 30-1 through 30-n is stored as the information of nodes that become communication parties. Further, the information that the client apparatus 40 functions as a client when communicating with each of the apparatuses is stored.

Additionally, "the server authentication root key" is stored as the information of the used root key, and "the client authentication root key" is stored as the information of the root key of the communication party. With the information, it is determined that a digital signature should be attached to the client public key certificate, which is to be stored in the client apparatus 40, by using the server CA key so that the client public key certificate can be verified with the use of the client authentication root key, which is the root key of the communication party. Also, it is determined that a digital signature should be attached to the server public key certificate, which is stored in the server apparatuses 30-1 through 30-n that are communication parties, by using the server CA key so that the server public key certificate can be verified with the use of the server authentication root key, which is the used root key.

In addition, the information that it is unnecessary to update the client authentication root key and that it is necessary to update the server authentication root key is also stored.

As in the case of the fifth embodiment, both storing formats shown in FIGS. 32B and 32C may be adopted for each of the server apparatuses 30-1 through 30-n. In FIGS. 32B and 32C, the storing formats for the server apparatus 30-1 are shown, and "the server apparatus 30-1" is stored as a node ID, and the information that it is impossible for the server apparatus 30-1 to directly communicate with the certificate management apparatus 10, since communications between the server apparatus 30-1 and the certificate management apparatus 10 are performed via the client apparatus 40, is stored.

By referring to the above-mentioned information, it is possible for the update order control part 27 of the certificate management apparatus 10 to determine the update procedure of the certification key.

In the case of the client apparatus 40, the server authentication root key used for the authentication process may be different for each of the server apparatuses 30-1 through 30-n that become the communication parties. In this case, the updating process of the server authentication root key is performed for each group of the server apparatuses that use a common server authentication root key. That is, by applying the first through ninth embodiments (the seventh through ninth embodiments are described later) and variations thereof to each group, it is possible to independently perform the updating process for each group. The same applies to a case where a different client authentication root key is used depending on a communication party.

Next, a description is given below of the root key updating process in the digital certificate management system according to the sixth embodiment of the present invention, which system is shown in FIG. 33. The root key updating process is a process according to the sixth embodiment of the digital certificate management method of the present invention.

Basically, in the root key updating process, each of the processes described in the third embodiment is performed in an order similar to that in the case of the third embodiment. The processes are performed by the CPUs of the certificate management apparatus 10, the server apparatuses 30-1 through 30-n, and the client apparatus 40 by executing a predetermined control program.

However, in this embodiment, since the plurality of the servers 30-1 through 30-n are provided, those processes performed with respect to the server apparatus 30 become somewhat different. In other words, it is necessary to separately transmit to and store in each of the server apparatuses 30-1 through 30-n the client authentication root key certificate for distribution, the new server public key certificate, and the new client authentication root key certificate.

Since the corresponding relationship between each of the processes after changes and each of the processes described in the third embodiment is similar to the corresponding relationship between the process 1 described in the first embodiment and the process 1-1 described in the fifth embodiment, a detailed description thereof is omitted. In addition, since only one client apparatus 40 is provided, those processes performed with respect to the client apparatus 40 are similar to those in the case of the third embodiment.

In the aforementioned manner, it is possible to obtain effects similar to those in the case of the fifth embodiment.

That is, also in the digital certificate management system according to the sixth embodiment, by performing the root key updating process in the aforementioned procedure, even in a case where the certificate management apparatus 10 can directly communicate only with the client apparatus 40 among the apparatuses constructing the client/server system and a plurality of server apparatuses are provided, it is possible to update the root key by automatic control without significantly affecting the mutual authentication process between the server apparatus 30 and the client apparatus 40 as in the case of the fifth embodiment. Accordingly, by using such a digital certificate management system, it is possible to update the root key without preparing a special communication channel for updating the root key. Hence, it is possible to operate a client/server system that performs the authentication process according to the SSL at the time of communications at low cost.

In addition, since it is unnecessary to wait for a communication request in the root key updating process, it is possible to perform the process without delay and complete the process in a short time interval as in the third embodiment.

Further, variations similar to those in the first through third, and fifth embodiments may be applied to the sixth embodiment.

Seventh Embodiment

FIGS. 35 through 41

Next, a description is given below of the structure of the digital management certificate system according to a seventh embodiment of the present invention, which system is constructed by the certificate management apparatus 10, which is the digital certificate management apparatus according to the present invention, and one or more client apparatuses and one or more server apparatuses constructing a client/server system.

FIG. 35 shows the relationships between each apparatus constructing the digital certificate management system.

As shown in FIG. 35, in the digital certificate management system, the client/server system is constructed in a plurality of stages such that an upper node has a lower node. That is, a node A, which is a direct communication party of the certificate management apparatus 10, is the top level node, a node B, which is a communication party of the node A, is provided in a lower level, and a node C, which is a communication party of the node B, is provided in a further lower level. In the aforementioned manner, the client/server system is constructed by the three nodes, the node A, B and C, from top to bottom. Here, it is assumed that the authentication standard for mutual authentication is set such that the nodes other than the node A cannot perform direct communications except with the nodes indicated by arrows in FIG. 35. However, each of the nodes can perform communications with the node that does not become a direct communication party thereof and the certificate management apparatus 10 via one or more of the nodes that are provided therebetween. Also, each of the nodes can mediate such communications.

In this case, when the node B or C performs communications with the certificate management apparatus 10, the node A always mediates the communications and whether the communications can be made depends on the node A. It is assumed that, in a case where such relationships exist, the node A is referred to as an upper node for the other nodes. Similarly, the node B is an upper-node for the node C. A "lower node" indicates a relationship opposite to an "upper node". That is, the nodes B and C are lower nodes for the node A. Hereinafter, an upper node that becomes a direct communication party is simply referred to as an "upper node", and a lower node that becomes a direct communication party is simply referred to as a "lower node".

In such a client/server system, when each of the nodes performs communications with a communication party, the node functions as either a client or a server. As described in the first embodiment, a client issues a connection request upon communication, and a server returns the response thereto.

As shown in FIG. 35, in this embodiment, when communications are made between the node A and the node B, the node A serves as a client (C) and the node B serves a server (S). In addition, the node B functions as a server (S) when communicating with the node C (C) as well. On this occasion, the node C serves as a client.

As for the functions and structure of each of the nodes, the certificate management apparatus 10 is similar to that described in the first embodiment with reference to FIG. 2, the node that functions only as a server is similar to the server apparatus 30, and the nodes that function only as clients are similar to the client apparatus 40.

However, in a case where the top level node such as the node A functions a client with respect to the lower node, similar to the client apparatus 40 described in the third embodiment with reference to FIG. 18, the top level node functions as a server when communicating with the certificate management apparatus 10.

Also in the digital certificate management apparatus according to this embodiment, the structure storing part 26 of the certificate management apparatus 10 stores the information of each of the nodes constructing the client/server system in a format similar to that shown in FIG. 29. However, since the client/server system is constructed by the nodes having hierarchical relationships, instead of the information indicating whether direct communication with the certificate management apparatus 10 is possible, a "generation number" is stored as a numerical value relatively representing the level of a node. The generation number of the top-level node, which becomes a direct communication party of the certificate management apparatus 10, is 1, and the generation number is increased by for each node intervening between the certificate management apparatus 10 and a node concerned. However, such information is not mandatory, and the information indicating whether direct communications with the certificate management apparatus 10 is possible may be stored as in the case of the fifth embodiment.

FIGS. 36A, 36B and 36C show examples of specific information to be stored in the above-mentioned format. For example, the nodes A, B and C shown in FIG. 35 store the information as shown in FIGS. 36A, 36B and 36C, respectively. That is, as shown in FIG. 36A, as for the node A, "node A" is stored as the node ID, and "1" is stored as the generation number, since the node A becomes a direct communication party of the certificate management apparatus 10. In addition, the information of the node B is stored as a communication party. Further, since the node A functions as a client when communicating with the node B, this information is stored. Additionally, "server authentication root key" is stored as the information of the used root key, and "client authentication root key" is stored as the information of the root key of the communication party. The server authentication root key requires updating, and this information is also stored.

Similarly, as for the other nodes B and C, the information as shown in FIGS. 36B and 38C is stored, respectively. In these nodes, the information of both upper node and lower node is stored as the information of communication parties as in the case shown in FIG. 30C.

Further, as for the information of the generation number, since the generation number is changed in accordance with changes in the connection relationships of each node and changes in the communication party, the generation number is set again at least every time the root key updating process is performed. However, when the node having the generation number "1" is changed to another node, the change is immediately reflected manually or automatically.

Next, a description is given of a communication procedure at the time when a request is transmitted from the certificate management apparatus 10 to each of the nodes in the digital certificate management system according to the sixth embodiment shown in FIG. 35.

FIG. 35 is a sequence diagram showing a communication procedure at the time when a request is transmitted to the node C, which is the lowest level node. This process is performed by the CPUs of the certificate management apparatus 10 and the nodes by executing a predetermined control program.

As shown in FIG. 35, in a case where the certificate management apparatus 10 issues an operation request to the node C, the communication path (here, A→B→C) to the node C is determined by referring to the information stored in the structure storing part 26, and the certificate management apparatus 10 transmits a transmission request of a request to the node C in step S601. This request requests for an operation that transmits an operation request and required information to the node C, which is a transmission destination.

The node C is not a node that becomes a communication party of the node A. Hence, the information indicating the path to the node C may be included in the transmission request by the certificate management apparatus 10. However, if each node stores at least the information of a communication party of the lower node, it is possible to search for a subsequent communication path based only on destination information.

In a case where the node A, which receives the transmission request of the request to node C, determines that it is impossible to return the response in a short time interval based on the contents of the process and the communication path, the node A returns a response delay notice to the certificate management apparatus 10 and cuts off the communication in step S602. In a case where the node A determines that it is possible to return the response, the process proceeds. In step S603, the transmission request of the request to the node C is transmitted to the node B by following the communication path to the node C. Since the node A serves as a client when communicating with the node B, it is possible for the node A to perform this transmission by requesting for the communication.

Similar to the case of the node A, in step S604, the node B that receives the transmission request also returns a response delay notice in a case where the node B determines that it is impossible to return the response in a short time interval. In a case where the node B determines that it is possible to return the response in a short time interval, the process proceeds.

Since the node B has the node C as the lower node, the node B takes information and a request to be transmitted to the node C from the transmission request of the request to the node C, and transmits the request to the node C. However, since the node B functions as a server when communicating with the node C, as in the case of steps S112 and S113 of FIG. 7, the node B waits for a communication request from the node C in step S605, and transmits the request in step S606 as the response thereto.

Upon reception of the request, the node C performs in step S607 a process (for example, updating of the digital certificate) corresponding to the request, and returns the response in step S608. The request includes the information of the transmitting source, and it is possible for the node C to recognize that the response should be returned to the certificate management apparatus 10. Thus, the node C specifies the certificate management apparatus 10 as the transmission destination of the response, and first, transmits the response to the node B, which is the upper node.

The node B also transmits the response to the node A, which is the upper node. However, in a case where the response delay notice has been issued in step S604, the communication is temporarily cut off and it is impossible for the node B to request for communications. Thus, the node B waits for a communication request from the node A in step S609, and transmits in step S610 the response from the node C as the response to the communication request. In a case where the response delay notice has not been issued, it is possible to transmit the response from the node C as the response to the transmission request of the request to the node C. The same applies to transmission from the node A to the certificate management apparatus the certificate management apparatus 10 (steps S611 and S612).

With the above-mentioned process, it is possible for the certificate management apparatus 10 to transmit the request to the node C, cause the node C to perform the operation, and receive the response so as to know whether the operation succeeds.

Here, the description is given of the case where a request is issued to the node C. However, it is possible to transmit a request to and obtain the response from a node between the certificate management apparatus 10 and the node C in a similar manner. A request transmission request may be transmitted to the upper node of a target node, and an operation request may be transmitted to the upper node to the target node. In addition, even when the number of the nodes and/or the client/server relationship between each of the nodes is changed, it is possible to perform a similar operation by changing the procedure in accordance with the change.

Next, a description is given of the root key updating process in the digital certificate management system according to this embodiment. First, a description is given of a process in a case where the server authentication root key stored in the nodes A and C, which function as clients, is updated. This process is a process according to the seventh embodiment of the digital certificate management method of the present invention.

Figure 37:
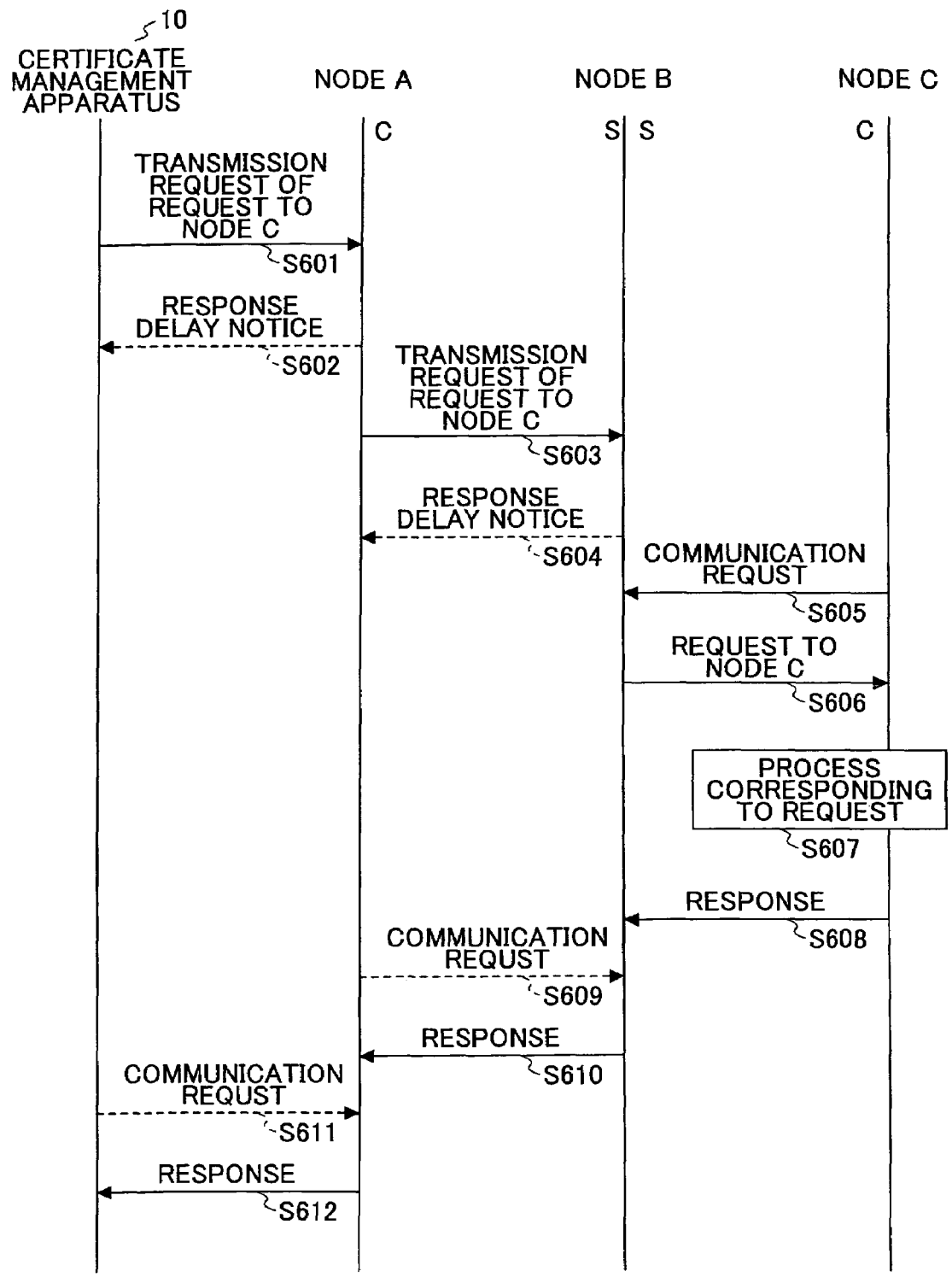
FIG. 37 is a sequence diagram showing a communication procedure at the time of transmission of a request from the certificate management apparatus to a node C in the digital certificate management system shown in FIG. 33.
Figure 38:
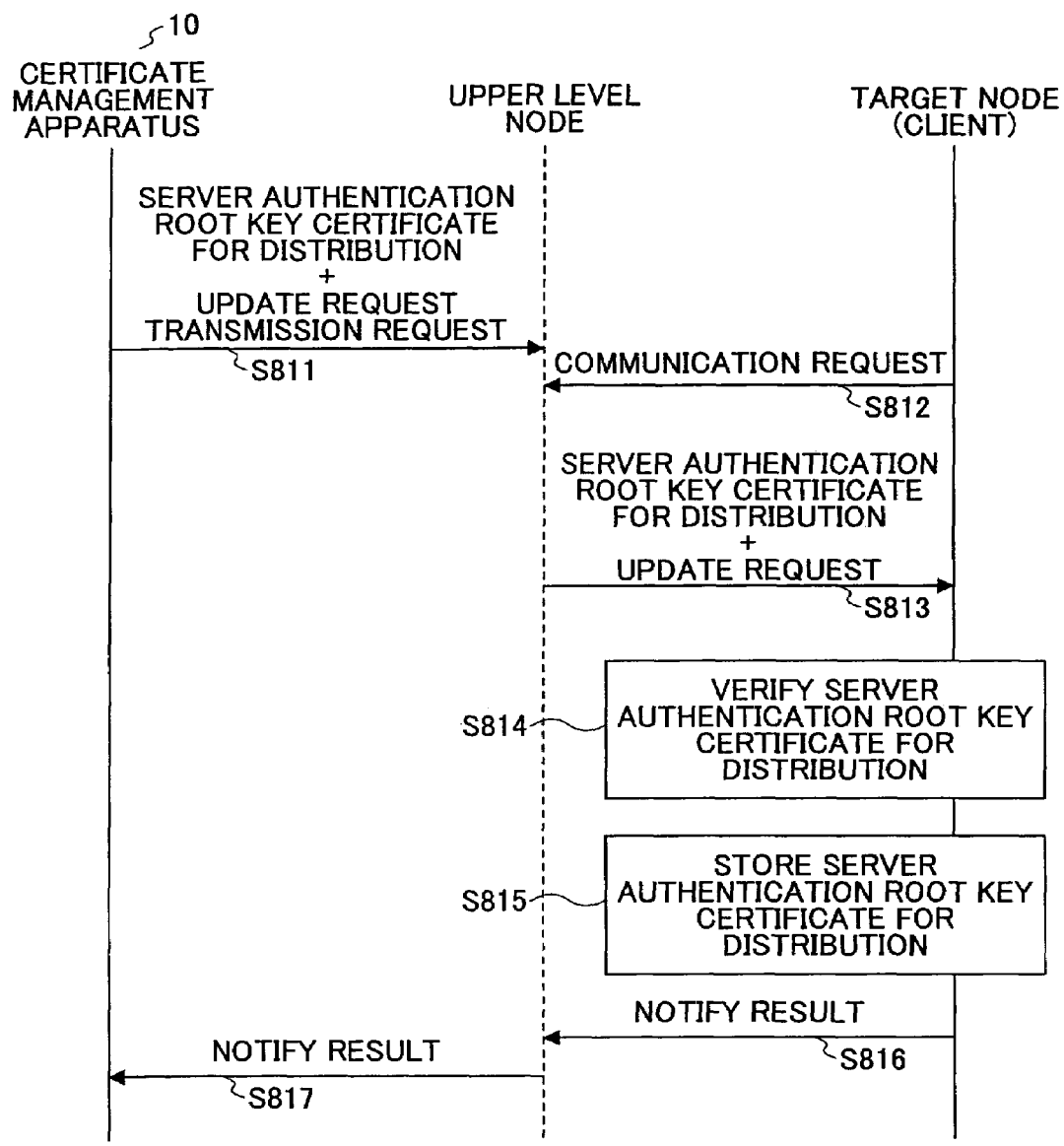
FIG. 38 is a sequence diagram showing a root key certificate storing process of each of the nodes of a server authentication root key updating process in the digital certificate management system shown in FIG. 33.

In this process, after performing the process S, which is described in the first embodiment with reference to FIG. 6, processes 41 through 43 shown in FIGS. 36 through 38 are performed in an order described below. First, the contents of processes shown in the sequence diagrams of FIGS. 36 through 38 will be described, and then the order of performing the processes will be described with reference to FIG. 39. These processes are performed by the CPUs of the certificate management apparatus 10 and the nodes by executing a predetermined control program.

FIG. 38 is a sequence diagram showing the root key certificate storing process of each node as a process 41. In this process, a process corresponding to the process 1, which is described in the first embodiment with reference to FIG. 7, is performed to each node (target node) functioning as a client. Depending on the target node, the processes of transmission of a request from the certificate management apparatus 10 to the target node and notification of a result are different. However, it is assumed that these processes are appropriately performed in the procedure as described with reference to FIG. 37, and only a general description thereof is given here.

In the process, first, in step S811, the certificate management apparatus 10 transmits to the top level node an updating request transmission request that requests for transmitting to the target node the server authentication root key certificate for distribution created in step S102 of FIG. 6 and an updating request thereof.

Each node that is provided in the communication path to the target node sequentially transmits the transmission request in the procedure as described with reference to FIG. 37. When the transmission request reaches the upper node of the target node, the upper node transmits to the target node each certificate related to the transmission request and the update request. However, since the upper node functions as a server with respect to the target node, the upper node transmits in step S813 each certificate related to the transmission request and the update request as the response to a communication request from the target node in step S812.

In a case where the target node is the top-level node, the certificate management apparatus 10 directly transmits each certificate and the update request thereof to the top-level node.

With the above-mentioned process, the server authentication root key certificate for distribution and the update request thereof are transmitted from the certificate management apparatus 10 to the target node via the upper node, if there is the upper node. In the process of step S811, the CPU 11 of the certificate management apparatus 10 functions as the first transmission means.

Upon reception of the update request, in steps S814 and S815, as in the case of steps S114 and S115 of FIG. 7, the target node verifies the server authentication root key certificate for distribution by using the previous server authentication root key certificate. When verified, the target node stores the server authentication root key certificate for distribution in the certificate storing part. On this occasion, the previous server authentication root key certificate is not yet deleted.

Then, in step S816, the target node returns a result notice to the certificate management apparatus 10 as the response to the update request. The result notice is transmitted to the certificate management apparatus 10 via each of the upper nodes (step S817). However, in a case where the target node is the top-level node, the result notice is directly transmitted to the certificate management apparatus 10.

In the aforementioned manner, the root key certificate storing process of each node is performed.

Figure 39:
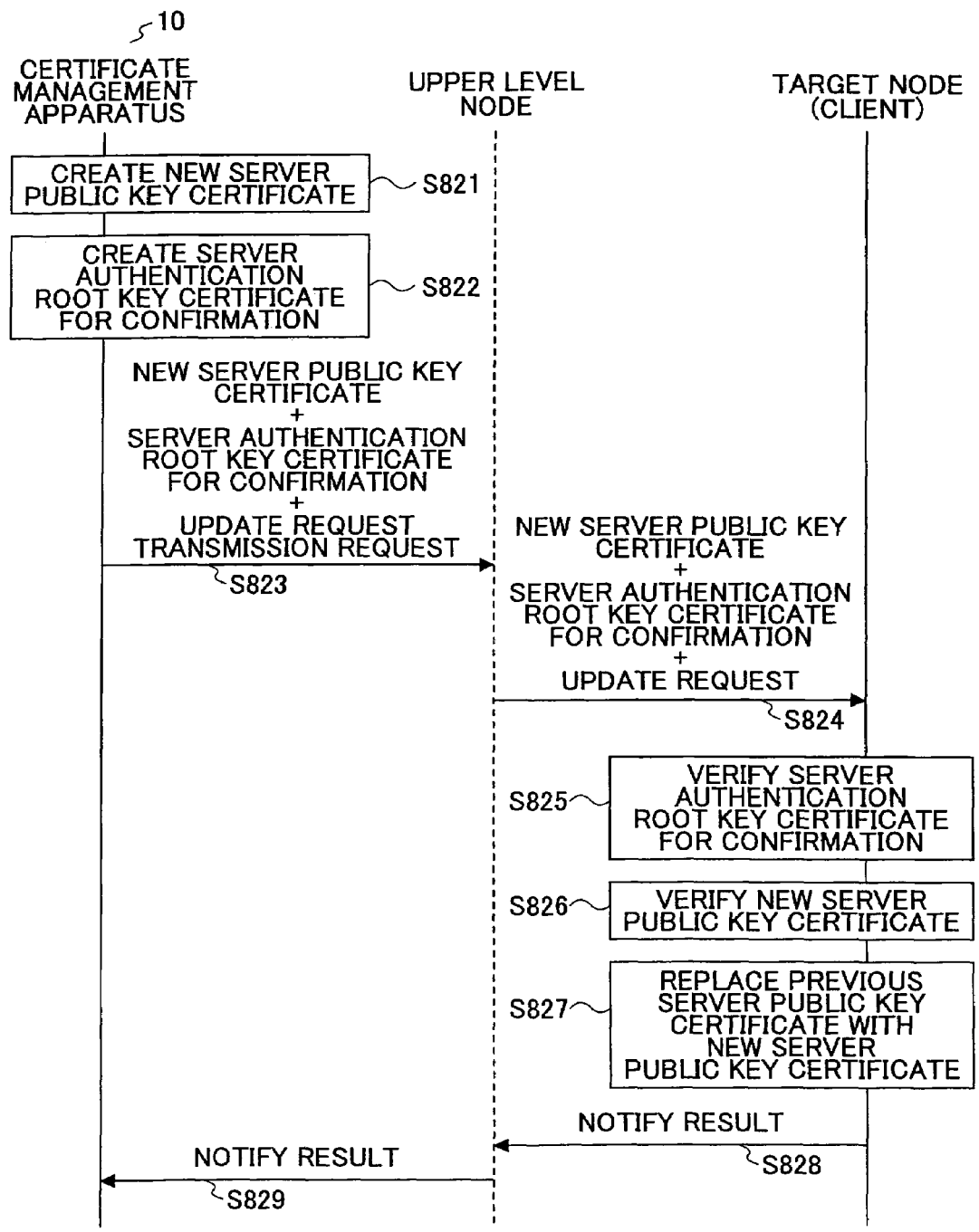
FIG. 39 is a sequence diagram showing a public key certificate storing process of each of the nodes.

FIG. 39 is a sequence diagram showing the public key certificate storing process of each node as a process 42. In this process, a process corresponding to the process 2, which is described in the first embodiment with reference to FIG. 8, is performed on each node (target node) functioning as a server. Here, similarly to the case of the process 41, only a general description is given of the process 42.

In the process, first, in step S821, the certificate management apparatus 10 creates a new server public key certificate by attaching the digital signature using the new server CA key to the server public key that has been already issued to a target node. It is assumed that the new server CA key created in step S101 of FIG. 6 is used. In addition, since the private key of the target node is not updated, it is unnecessary to update the server public key.

In step S822, the server authentication root key certificate for confirmation is created by attaching to the new server authentication root key a digital signature using the client CA key corresponding to the client authentication root key stored in the target node.

Then, in step S823, the certificate management apparatus 10 transmits to the top level node the new server public key certificate created in step S821, the server authentication root key certificate for confirmation created in step S822, and an update request transmission request that requests for transmission to the target node an update request of the new server public key certificate.

Each node that is provided in the communication path to the target node sequentially transmits the transmission request in the procedure as described with reference to FIG. 37. When the transmission request reaches the upper node of the target node, the upper node transmits in step S824 each of the certificates related to the transmission request and the update request to the target node.

In a case where the target node is the top-level node, the certificate management apparatus 10 directly transmits each of the certificates and the update request to the top-level node.

With the above-mentioned process, each of the certificates and the update request are transmitted from the certificate management apparatus 10 to the target node via the upper node, if there is an upper node. In the process of step S823, the CPU 11 of the certificate management apparatus 10 functions as the second transmission means.

Upon reception of the update request, in steps S825 through S827, as in the case of steps S124 through S126 of FIG. 8, the target node verifies the server authentication root key certificate for confirmation by using the client authentication root key stored in the target node. When verified, the target node verifies the new server public key certificate by using the verified server authentication root key certificate for confirmation. When verified, the new server public key certificate is stored. On this occasion, the previous server public key certificate is deleted and replaced with the new server public key certificate.

As in the case described in the first embodiment with reference to FIG. 8, the reason for deleting the previous server public key certificate is that it is necessary for a node functioning as a server in a client/server system to store only one server public key certificate, and transmit the server public key certificate every time a connection request is received from a client apparatus. In addition, since there is such a condition, all clients that can communicate with a server inevitably use a common root key in when communicating with the server.

In the processes of steps S825 through S827, the CPU of the target node functions as the first update means.

Then, in step S828, the target node returns a result notice to the certificate management apparatus 10 as the response to the update request. The result notice is transmitted to the certificate management apparatus 10 via each of the upper nodes (step S829). However, in a case where the target node is the top-level node, the result notice is directly transmitted to the certificate management apparatus 10.

In the aforementioned manner, the public key certificate storing process of each node is performed.

Figure 40:
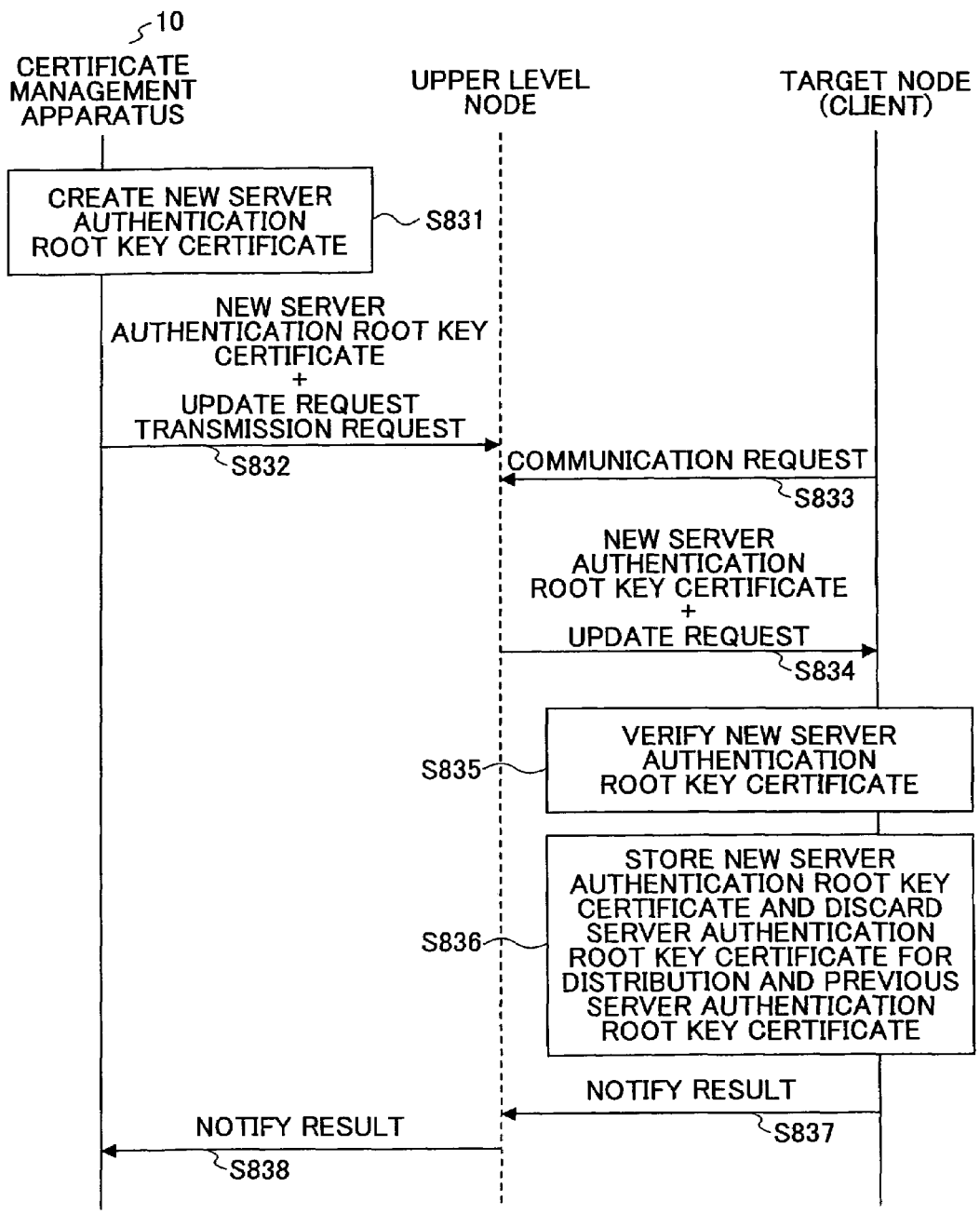
FIG. 40 is a sequence diagram showing a root key certificate rewriting process of each of the nodes.

FIG. 40 is a sequence diagram showing the root key certificate rewriting process of each node as a process 43. In this process, a process corresponding to the process 3, which is described in the first embodiment with reference to FIG. 9, is performed on each node functioning as a client. As in the case of the process 41, only a general description is given of the process 43.

Here, first, in step S831, the certificate management apparatus 10 creates a new server authentication root key certificate by attaching a digital signature using a new server CA key to the new server authentication root key created in step S101 of FIG. 6.

Then, in steps S832 through S834, as in the case of steps S811 through S813 of FIG. 38, the certificate management apparatus 10 transmits to the target node the new server authentication root key certificate and an update request thereof via an intervening node, if such a node exists. Also in this process, the CPU 11 of the certificate management apparatus 10 functions as the first transmission means.

Upon reception of the update request, in steps S835 and S836, as in the case of steps S135 and S136 of FIG. 9, the target node verifies the new server authentication root key certificate by using the server authentication root key certificate for distribution stored in step S815 of FIG. 38. When verified, the new server authentication root key certificate is stored, and the server authentication root key certificate for distribution and the previous server authentication root key certificate are disposed of.

In step S837, the target node returns a result notice to the certificate management apparatus 10 as the response to the update request. The result notice is transmitted to the certificate management apparatus 10 via each of the upper nodes (step S838). However, in a case where the target node is the top-level node, the result notice is directly transmitted to the certificate management apparatus 10.

In the aforementioned manner, the root key certificate rewriting process of each node is performed.

Figure 41:
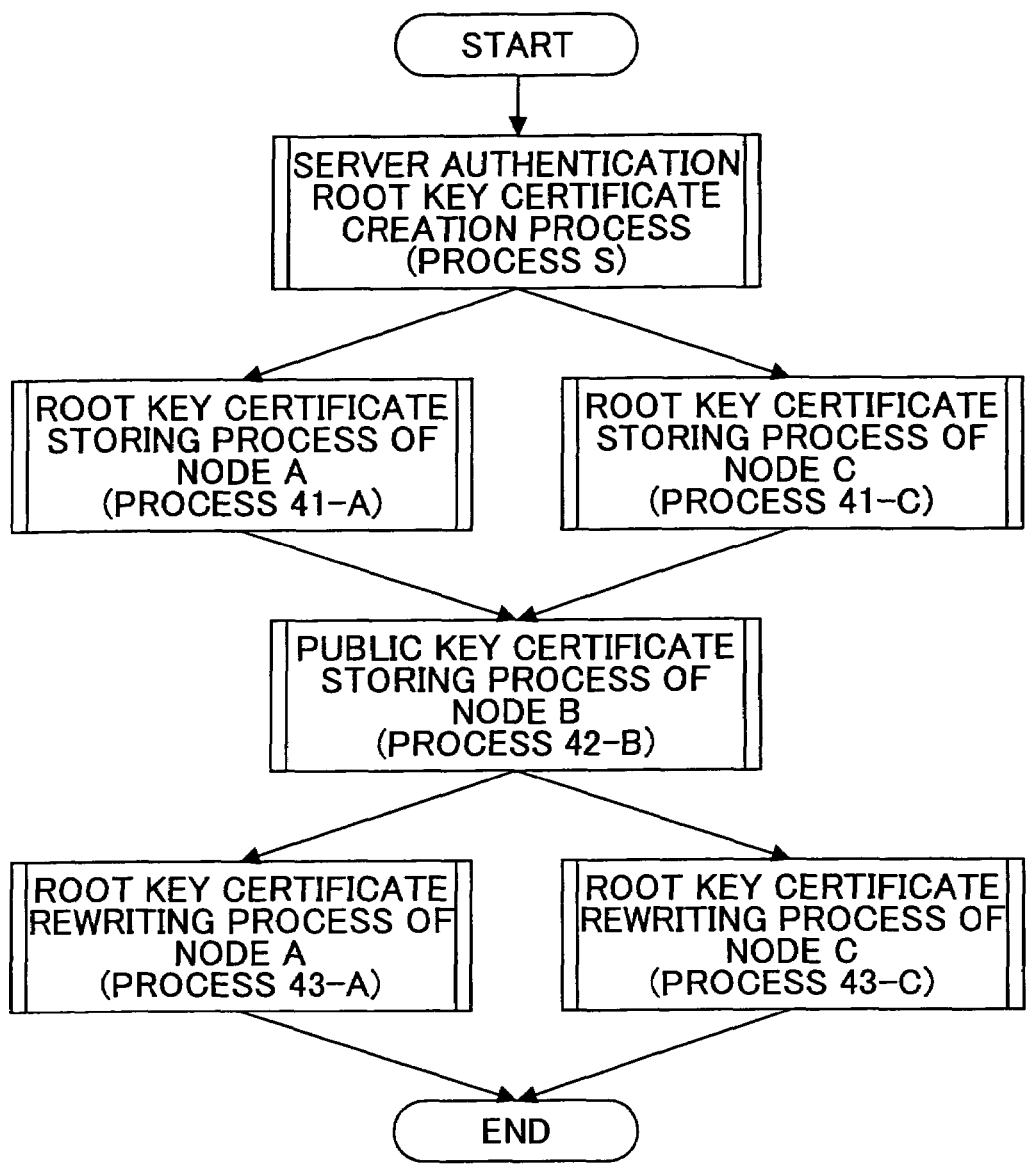
FIG. 41 is a flowchart showing an execution procedure of processes in a server authentication root key updating process according to the seventh embodiment of the present invention.

FIG. 41 shows the timings of performing the above mentioned certificate creation process (process S), root key certificate storage process (process 41), public key certificate storage process (process 42), and root key certificate rewriting process (process 43). That is, when updating the server recognition root key, first, the process S shown in FIG. 6 is performed. After completion of the process S, the process 41 is performed on each of the nodes A and C, which function as clients. After these processes are all completed, the process 42 is performed on the node B, which functions as a server. After the process 42 is completed, the process 43 is further performed on each of the nodes A and C, which function as clients.

As in the case of each of the above-mentioned embodiments, the operation to transmit the new server public key certificate to a node that functions as a server and request the node to store the certificate is performed after there are responses indicating that the new server authentication root key is stored (as the server authentication root key certificate for distribution) from all nodes that become communication parties of the node functioning as the server and function as clients.

This is because, as mentioned above, in the node that functions as a server, the previous public key certificate is deleted when storing the new server public key certificate, and if this process is performed before the new server authentication root key is stored in a client that becomes a communication party, it becomes impossible to perform mutual authentication, which should be avoided.

Such an update procedure is created and managed by the update order control part 27 based on the structure information stored in the structure storing part 27, as in the case of each of the above-mentioned embodiments.

The description is given above of the updating process of the server authentication root key. However, when updating the client authentication root key, after performing the process T shown in FIG. 14, processes obtained by modifying the processes 11 through 13 shown in FIGS. 13 through 15 as in the case of processes 41 through 43 may be performed. On this occasion, the processes (referred to as a process 11-*n*, for example) corresponding to the processes 11 and 13 may be performed on the node B, which functions as a server, and the process (referred to as a process 12-*n*, for example) corresponding to the process 12 may be performed on the nodes A and C, which function as clients. Also in this case, processes 12-A and 12-C may be performed after completion of a process 11-B, and a process 13-B may be performed after completion of all of the processes 12-A and 12-C.

In the aforementioned manner, by performing the operation to transmit the new client public key certificate to a node that functions as a client and request the node to store the certificate after there are responses indicating that the new client authentication root key is stored (as the client authentication root key certificate for distribution) from all nodes that become communication parties of the node that functions as a client and function as servers, it is possible to avoid overhead processing in communications and automatically update the client authentication root key while maintaining efficient communications.

By performing the process as mentioned above, even when a client/server system is constructed in a plurality of stages such that an upper node has a lower node, as in the case of each of the above-mentioned embodiments, it is possible to update the root key by automatic control without significantly affecting the mutual authentication process between each of the nodes.

Accordingly, by using such a digital certificate management system, it is possible to update the root key without preparing a special communication channel for updating the root key. Hence, it is possible to operate a client/server system that performs the authentication process according to the SSL at the time of communications at low cost.

The structure of the digital certificate management system according to this embodiment is the same as the structure according to the fifth embodiment shown in FIG. 28, where the number of client apparatuses is two and one of the client apparatuses can directly communicate with the certificate management apparatus 10. The nodes A and C in this embodiment correspond to the client apparatuses 40-1 and 40-2 in the fifth embodiment, and the node B in this embodiment corresponds to the server apparatus 30.

Comparing the update procedure of the root key in this embodiment with that in the fifth embodiment, it is understood that basically the same procedure is taken except for the transmission procedure of a request from the certificate management apparatus 10 to each node. For example, the new server public key certificate is stored in the server apparatus after the new server authentication root key is stored in the client apparatus.

Accordingly, even when a node that can directly communicate with the certificate management apparatus 10 is changed, if it is possible to transmit an update request from the certificate management apparatus 10 to each node and cause the node to perform updating, it can be said that a root key updating process similar to that described in each of the embodiments can be performed.

Eighth Embodiment

Figure 44:
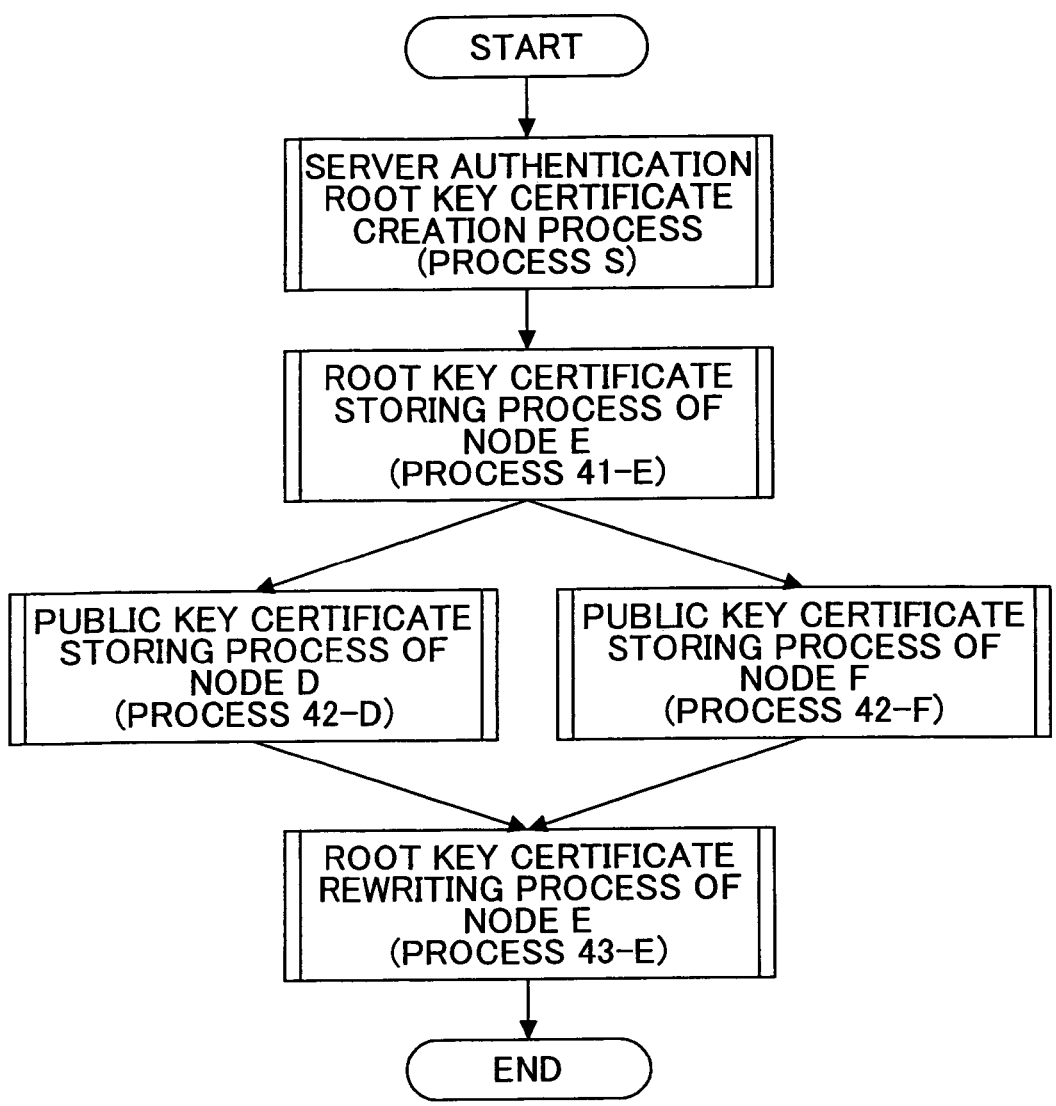
FIG. 44 is a flowchart showing an execution procedure of processes in a server authentication root key updating process according to the eighth embodiment.

FIGS. 42 through 44

Next, a description is given below of the structure of the digital management certificate system according to an eighth embodiment of the present invention, which system is constructed by the certificate management apparatus 10, which is the digital certificate management apparatus according to the present invention, and one or more client apparatuses and one or more server apparatuses constructing a client/server system.

FIG. 42 shows the relationship between each apparatus constructing the digital certificate management system.

As shown in FIG. 42, in the digital certificate management system according to this embodiment, as in the case of the seventh embodiment shown in FIG. 35, the client/server system is constructed in a plurality of stages such that an upper node has a lower node.

However, differing from the case of the seventh embodiment, a top-level node D functions as a server (S) when communicating with a lower node E. On this occasion, the node E functions as a client (C). The node E functions as a client when communicating with a further lower node F.

FIGS. 43A, 43B and 43C show information of each of the nodes constructing the client/server system, which information is stored in the structure storing part 26 of the certificate management apparatus the certificate management apparatus 10, in a case where the client/server system is constructed in the aforementioned manner.

That is, as shown in FIG. 43A, as for the node D, "node D" is stored in the structure storing part 26 as the node ID, and the generation number "1" is stored since the node D becomes a direct communication party of the certificate management apparatus 10. The information of the node E is stored as the information of a node that becomes a communication party of the node D. In addition, since the node D functions as a server when communicating with the node E, this information is stored. Further, "client authentication root key D" is stored as the information of the used root key, and "server authentication root key" is stored as the information of the root key of the communication party. Additionally, the server authentication root key requires updating, and this information is also stored.

Similarly, as for the other nodes E and F, the information as shown in FIGS. 43B and 43C is stored, respectively.

Also in the case of this embodiment, it is possible to update the server authentication root key with a process similar to that in the case of the seventh embodiment. That is, the process S shown in FIG. 6 and the processes 41 through 43 shown in FIGS. 36 through 38 may be performed in a procedure in which the operation to transmit the new server public key certificate to a node that functions as a server and request the node to store the certificate is performed after there are responses indicating that the new server authentication root key is stored (as the server authentication root key certificate for distribution) from all nodes that become communication parties of the node that functions as the server and function as clients. Since the functions of each node are different from those in the case of the seventh embodiment, the process flow is as shown in FIG. 42. However, the basic concepts are similar to those in the case of the seventh embodiment.

As shown in FIGS. 41A through 41C, in this embodiment, the root key used by the node D is different from that used by the node F. However, since the node E functions only as a client, it is possible to separately store the public key certificate for transmission to the node D and the public key certificate for transmission to the node F, and select and transmit a suitable public key certificate depending on a communication party, such a structure may be used. That is, the public key certificate transmitted to the node D may be a client public key certificate D to which a digital signature is attached by using a client CA key D corresponding to the client authentication root key D to the public key that has been issued to the node E, and the public key certificate transmitted to the node F may be a client public key certificate F to which a digital signature is attached by using a client CA key F corresponding to the client authentication root key F to the public key that has been issued to the node E.

In such a case, updating of the client authentication root key D does not affect communications between the node E and the node F, and updating of the client authentication root key F does not affect communications between the node D and the node E. Thus, it is possible to separately update these keys. Updating of each of the client authentication root keys may be performed by a process similar to that in the case of the first, second or third embodiment except for the transmission process of a request from the certificate management apparatus 10 to a target node.

By performing the process as mentioned above, as in the case of each of the above-mentioned embodiments, it is possible to update the root key by automatic control without significantly affecting the mutual authentication process between each of the nodes.

Accordingly, even in a case where such a digital certificate management system is used, it is possible to update the root key without preparing a special communication channel for updating the root key. Hence, it is possible to operate a client/server system that performs the authentication process according to the SSL at the time of communications at low cost.

Ninth Embodiment

FIGS. 43 and 44

Next, a description is given below of the structure of the digital management certificate system according to a ninth embodiment of the present invention, which system is constructed by the certificate management apparatus 10, which is the digital certificate management apparatus according to the present invention, and one or more client apparatuses and one or more server apparatuses constructing a client/server system.

FIG. 45 shows the relationships between each apparatus constructing the digital certificate management system.

As shown in FIG. 45, in the digital certificate management system according to this embodiment, as in the case of the seventh embodiment shown in FIG. 35, the client/server system is constructed in a plurality of stages such that an upper node has a lower node.

However, differing from the case of the seventh embodiment, a top-level node G functions as a client (C) when communicating with a lower node H. On this occasion, the node H functions as a server (S). The node H functions as a client when communicating with a further lower node I. That is, the node H functions as both a server and a client depending on a communication party.

FIGS. 46A, 46B and 46C show information of each of the nodes constructing the client/server system, which information is stored in the structure storing part 26 of the certificate management apparatus 10, in a case where the client/server system is constructed in the aforementioned manner.

That is, as shown in FIG. 46A, as for the node G, "node G" is stored in the structure storing part 26 as the node ID, and the generation number "1" is stored since the node G becomes a direct communication party of the certificate management apparatus 10. The information of the node H is stored as the information of a node that becomes a communication party of the node H. In addition, since the node G functions as a client when communicating with the node H, this information is stored. Further, "server authentication root key" is stored as the information of the used root key, and "client authentication root key" is stored as the information of the root key of the communication party. Additionally, the server authentication root key requires updating, and this information is also stored.

Similarly, as for the other nodes H and I, the information as shown in FIGS. 44B and 44C is stored, respectively.

In the case of this embodiment, the node H performs mutual authentication by using a different public key certificate, depending on whether the node H functions as a server or a client. That is, the node H transmits to the node G a public key certificate G to which a digital signature is attached by using the server CA key corresponding to the server authentication root key, and the node H transmits to the node I a public key certificate I to which a digital signature is attached by using the client CA key corresponding to the client authentication root key.

As mentioned above, it is necessary for the node H to use only one public key certificate in mutual authentication when functioning as a server. Hence, in the node H, the public key certificate G for functioning as a server (a server function) and the public key certificate I for functioning as a client (a client function) are stored in a distinguishable manner, and a specific public key certificate is used depending on each of the functions. In addition, a public key certificate received from the node G is verified with the client authentication root key, and a public key certificate received from the node I is verified with the server authentication root key. Hence, the root keys for the server function and the client function are also separately stored in the node H.

In such a case, even when only the root key used between the node G and the node H is updated and the root key used between the node H and the node I is not updated, mutual authentication between the node H and the node I is not affected except for an issue of security. This is because the above-mentioned case is practically similar to a case where a node H that functions as a server and another node H that functions as a client separately exist, and these nodes H are connected via a safe dedicated communication channel.

Accordingly, it is possible to separately update the root key used between the node G and the node H and the root key used between the node H and the node I. It is possible to update each of the root keys by a process similar to that in the case of the first, second or third embodiment, except for the transmission process of a request from the certificate management apparatus 10 to a target node.

By performing the above-mentioned process, as in the case of each of the above-mentioned embodiments, it is possible to update the root key by automatic control without significantly affecting the mutual authentication process between each of the nodes.

Accordingly, by using such a digital certificate management system, it is possible to update the root key without preparing a special communication channel for updating the root key. Hence, it is possible to operate a client/server system that performs the authentication process according to the SSL at the time of communications at low cost.

It should be noted that, in the above-mentioned case, the server authentication root key used between the node G and the node H and the server authentication root key used between the node H and the node I are the same, and the same applies to the client authentication root keys. However, the above description applies even when the server authentication root keys (and/or the client authentication root keys) are different.

Variations of Each of the Embodiments

FIGS. 47 through 52

In each of the above-mentioned embodiments, the description is given of the case where the client/server system is constructed in which direct communications are made with only one node. However, as shown in FIG. 47 or 48, the present invention may also be applied to a case where a plurality of nodes among those nodes constructing a client/server system can directly communicate with the certificate management apparatus 10.

A description is given below of an update procedure of the root key in such a case. It is assumed that, in the client/server system shown in FIG. 47 or 48, one kind of server authentication root key and client authentication root key are used for mutual authentication between each of the nodes.

Figure 47:
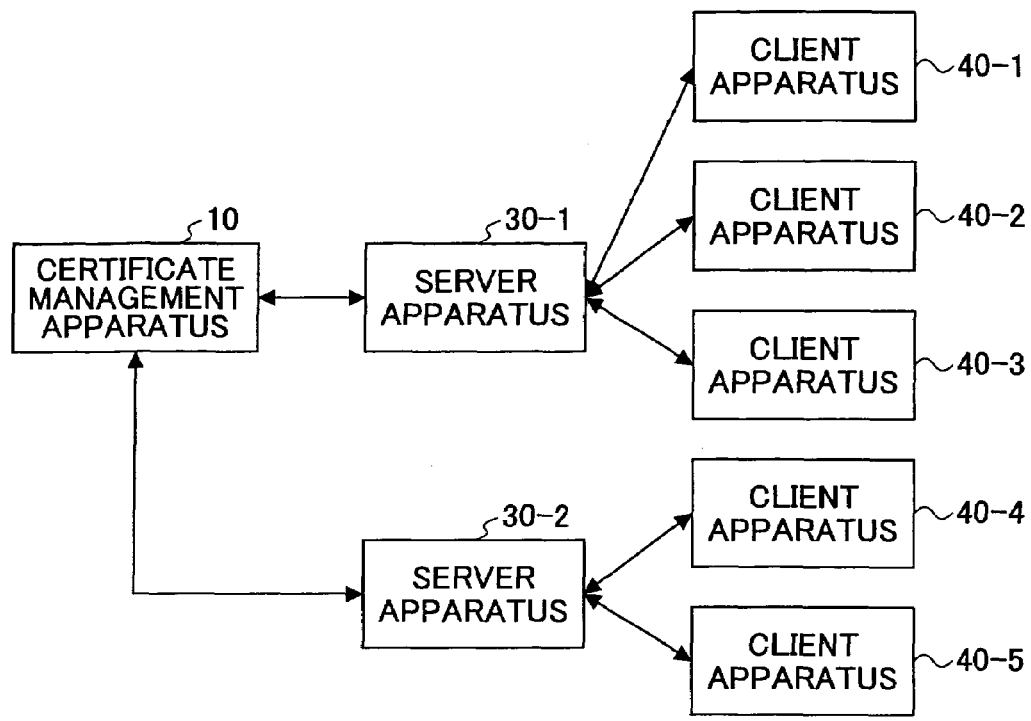
FIG. 47 is a block diagram showing relationships among apparatuses constructing a variation of the digital certificate management system of the present invention.
Figure 48:
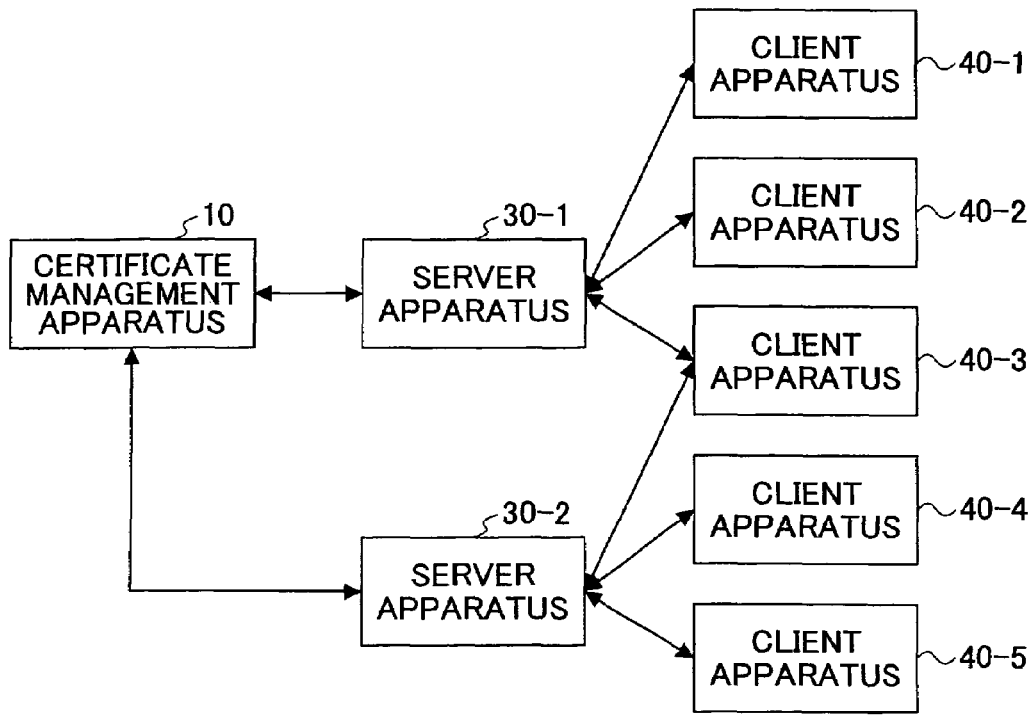
FIG. 48 is a block diagram showing relationships among apparatuses constructing another variation of the digital certificate management system of the present invention.

FIG. 47 shows a case where a plurality of server apparatuses 30 (30-1 and 30-2) that can directly communicate with the certificate management apparatus 10 are provided, and each of the client apparatuses (40-1 through 40-5) communicates only with one of the server apparatuses 30. In such a case, it is possible to perform the updating process assuming that a different client/server system is provided for each of the server apparatuses 30.

That is, in the example shown in FIG. 47, the root key updating process may be separately performed for a client/server system constructed by the server apparatus 30-1 and the client apparatuses 40-1 through 40-3 and a client/server system constructed by the server apparatus 30-2 and the client apparatuses 40-4 and 40-5. Even when the root key updating process is performed in the aforementioned manner, since the authentication process is not performed beyond a system, by performing the updating process in the update procedure described in the fifth embodiment, it is possible to update the root key without significantly affecting the authentication process between each of the nodes.

FIG. 48 shows a case where a client apparatus 40 (client apparatus 40-3) exists that communicates with a plurality of server apparatuses 30 (server apparatuses 30-1 and 30-2). In such a case, it is necessary to perform the updating process assuming that one client/server system is constructed by all nodes. However, even in such a case, the process for causing each of the server apparatuses 30 to store the new server public key certificate may be performed after the new server authentication root key is stored in all of the client apparatuses (40-1 through 40-5) as in the case of each of the above-mentioned embodiments.

Figure 49:
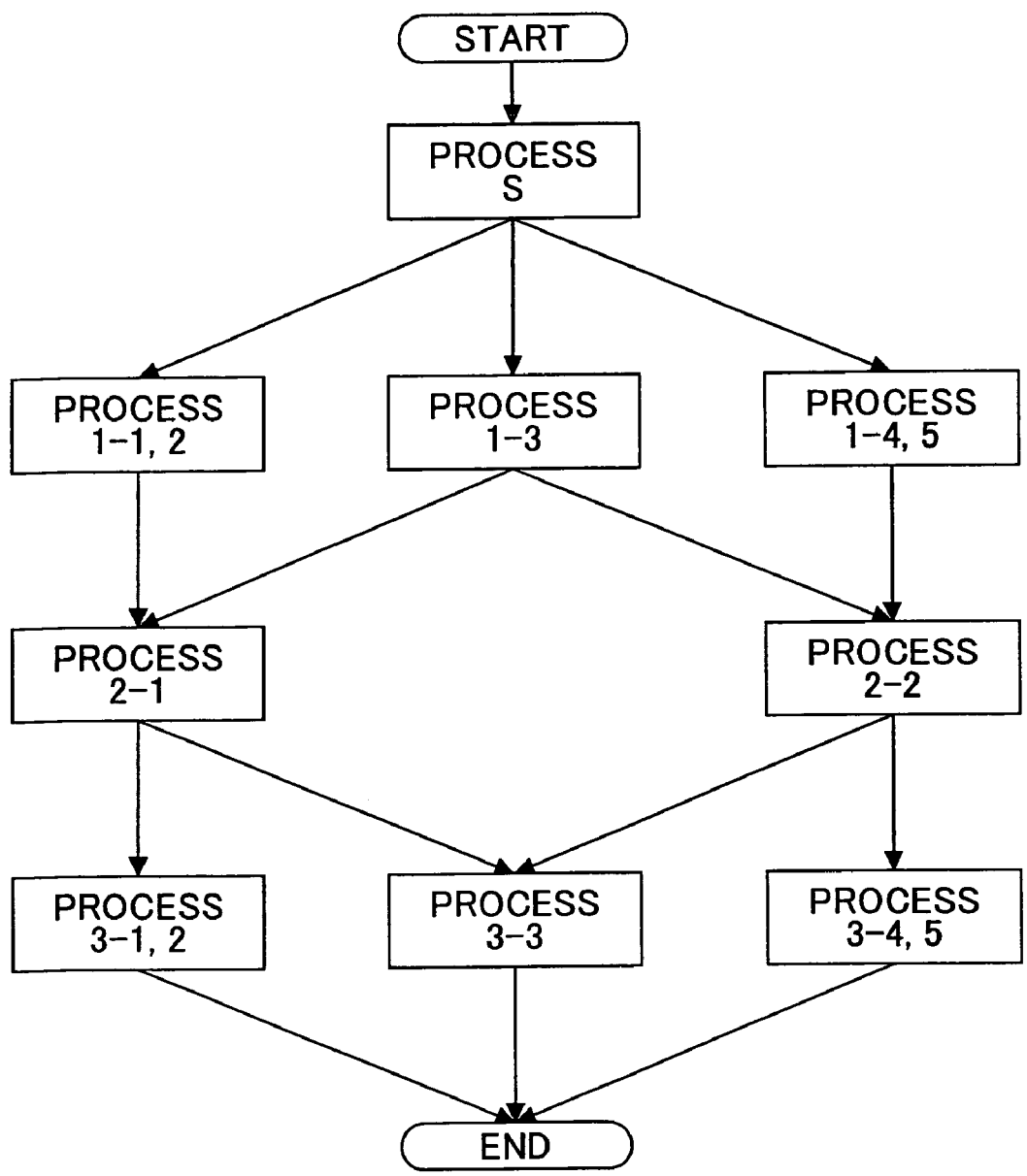
FIG. 49 is a schematic diagram showing the condition for starting each of the processes required in a case where a server authentication root key is updated in the digital certificate management system having the structure of FIG. 48.

FIG. 49 shows the conditions for starting each process required for the server authentication root key updating process. In FIG. 49, the meaning of the number of each process is similar to that in the case of FIG. 32 described in the fifth embodiment. Additionally, each arrow represents that a process pointed by the arrowhead is performed after completion of a process indicated by the bottom of the arrow.

As shown in FIG. 49, since the structure of the client/server system is complex, the conditions for starting each process in this embodiment is more complex compared to the starting conditions in FIG. 32. However, the starting conditions of each process are based on rules that are similar to those in the case of FIG. 32. For example, a process 2-1, which is the public key certificate storing process of the server apparatus 30-1, is performed after completion of all of the processes 1-1 through 1-3, which are the root key certificate storing processes of the client apparatuses 40-1 through 40-3.

However, the authentication process is not performed between nodes (e.g., the server apparatus 30-1 and the client apparatus 40-4) that do not communicate with each other. Thus, it is unnecessary for such nodes to maintain the storing states of mutual certificates in an appropriate relationship and it is not always necessary to manage the processing order.

As in the case of each of the above-mentioned embodiments, the update procedure as shown in FIG. 49 is also created and managed by the update order control part 27 of the certificate management apparatus 10 based on the information stored in the structure storing part 26. Even if the structure of a client/server system is as shown in FIG. 48, by referring to the information related to each node stored in the structure storing part 26, it is possible to determine communication parties of each node and the functions thereof, and based on this information, it is possible to create an update procedure.

When creating an update procedure, a request to a node (e.g., the client apparatus 40-3) that can communicate with the server apparatuses 30 may be transmitted via any of the server apparatuses 30.

In the variation described above, the description is given of the case where the nodes that can directly communicate with the certificate management apparatus 10 are the server apparatuses 30. However, of course, a similar variation may also be applied to the case where the nodes than can directly communicate with the certificate management apparatus 10 are the client apparatuses 40.

Figure 50:
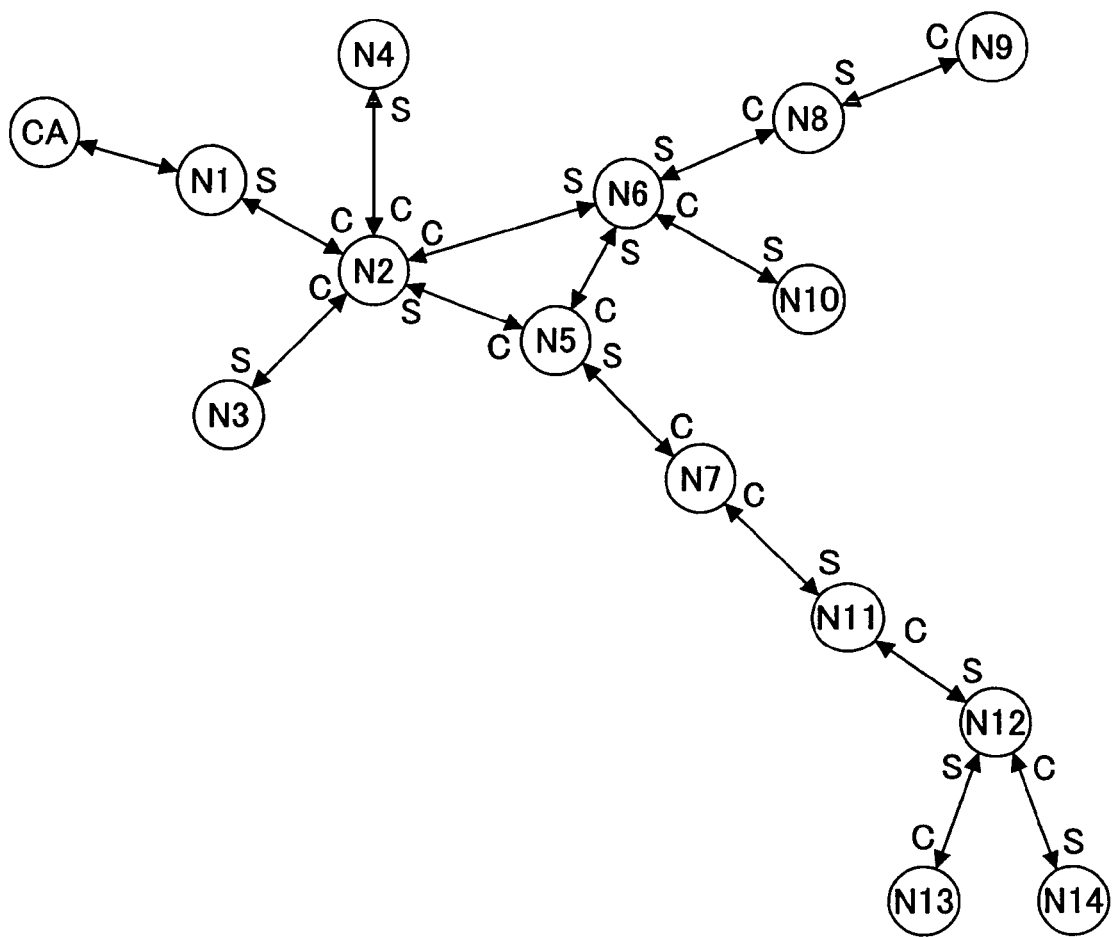
FIG. 50 is a schematic diagram for explaining another variation of the digital certificate management system according to the present invention.

Further, the present invention may be applied to a client/server system including a large number of nodes having complex client/server system relationships in stages as shown in FIG. 50.

In an example shown in FIG. 50, a client/server system is constructed by nodes N1 through N14. Those nodes connected by arrows can communicate with each other after performing authentication to each other. "C" and "S" in the vicinity of an arrow represent whether nodes connected by the arrow function as a client or a server. "CA" represents the certificate management apparatus 10.

Even in such a complex structure, by storing in the structure storing part 26 of the certificate management apparatus 10 the information of each of the nodes in the format as shown in FIG. 29, it is possible for the update order control part 27 to create and manage an appropriate update procedure based on the information. As in the case of each of the above-mentioned embodiments, the update procedure may be determined such that an operation of transmitting a public key certificate for updating to a node that functions as a server is performed after there are responses, indicating that a root key certificate for updating is received, from all of the nodes that function as clients when communicating with the node that functions as the server.

As for the processing procedure of determining the update procedure in this case, for example, the following processing procedure may be taken.

Figure 51:
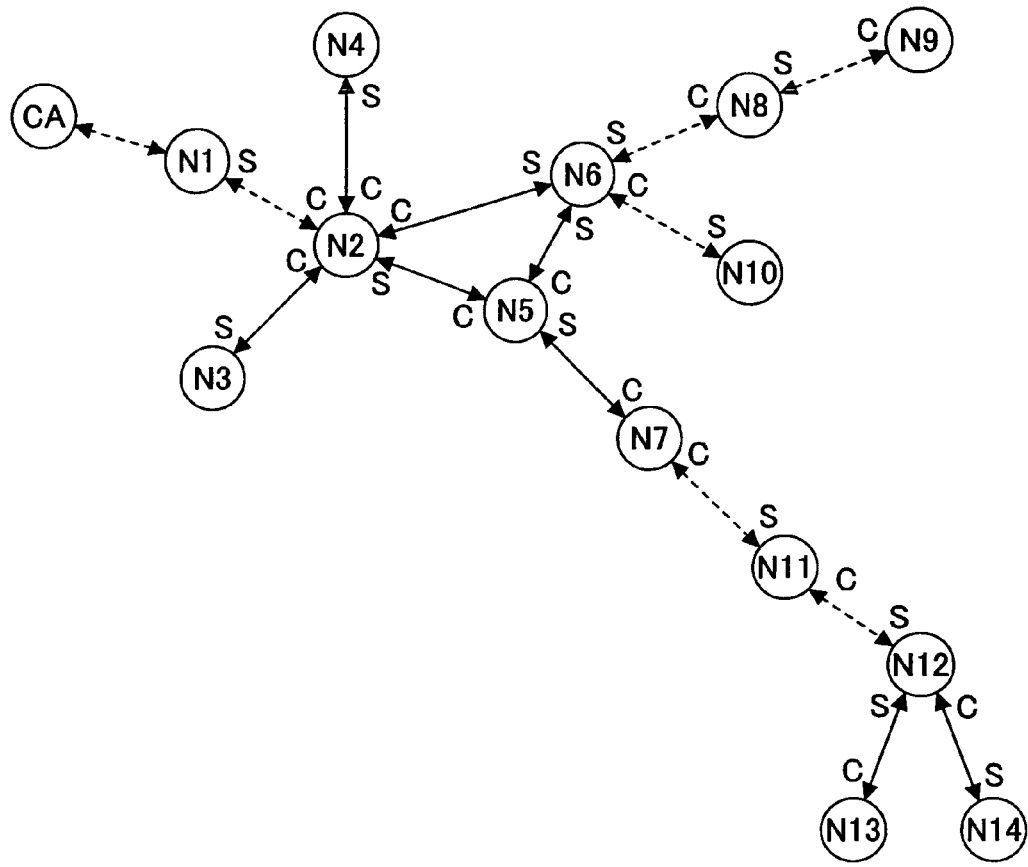
FIG. 51 is another schematic diagram for explaining the variation explained with reference to FIG. 50.

First, the information of each of the nodes is referred to for each root key to be updated, and the nodes that use the root key in the authentication process at the time of communications are extracted. The extracted nodes are target nodes that require the updating process. With such a process, the nodes that are connected by the solid arrows as shown in FIG. 51 may be extracted from the nodes shown in FIG. 50.

Then, a task list that determines an order to perform the updating process on the extracted target nodes is created. In order to create the task list, first, one of the target nodes, for example, the top level node among the target nodes, is selected, and the node is registered in the task list as a reference having a position number "0".

The task list is for registering the target nodes with their position numbers and determining the order to perform the updating process such that the process is performed from a node having a small position number. The same position number may be given to a plurality of nodes. In this case, basically, the process may be performed from any of the nodes having the same position number.

Then, taking the reference node as a node of notice, when there is a node that is a communication party of the node of notice and the target node (when the node performs mutual authentication with the node of notice by using a certification key to be updated) and the node is not added to the task list, the node is added to the task list. On this occasion, in a case where the node of notice functions as a client when communicating with the communication party, the communication party is registered with the position number having a value greater than that of the node of notice by one (the order of performing the updating process is later than the node of notice). In a case where the node of notice functions as a server when communicating with the communication party, the communication party is registered with the position number having a value smaller than that of the node of notice by one (the order of performing the updating process is earlier than the node of notice).

After all communication parties are registered in the task list, the process is repeated by taking a node that has not become a node of notice among the registered node as the next node of notice. At the time when all of the nodes registered in the task list have become the nodes of notice, the nodes that need managing of the order to perform the updating process starting from the first reference node are all registered in the task list. Thus, the process of creating the task list is temporarily ended. If there are nodes that are the target nodes and not yet registered in the task list, these nodes do not perform the authentication process with the nodes registered in the task list. Thus, as for such nodes, since it is unnecessary to consider the order to perform the updating process in relation to the nodes registered in the task list, another task list is created for such nodes.

For example, in a case where the node N2 is taken as the reference node in the example shown in FIG. 51, the nodes N12 through N14 that are the target nodes are not added to the task list since the node N11, which is provided between the node N2 and the node N12, is not the target node. In this case, as for the nodes N12 through N14, it can be seen that it is unnecessary to manage the order to perform the updating process in relation to the nodes N2 through N7. Hence, another task list is created for the node N12 through N14 and the order to perform the updating process is managed based on this task list.

By creating and managing the order to perform the root key updating process based on the task lists created in the aforementioned manner, it is possible to update the root key by automatic control while maintaining a state in which communications between each of the nodes are possible. As for the authentication process, it is possible to update the toot key while maintaining in many of the communication channels.

Figure 52:
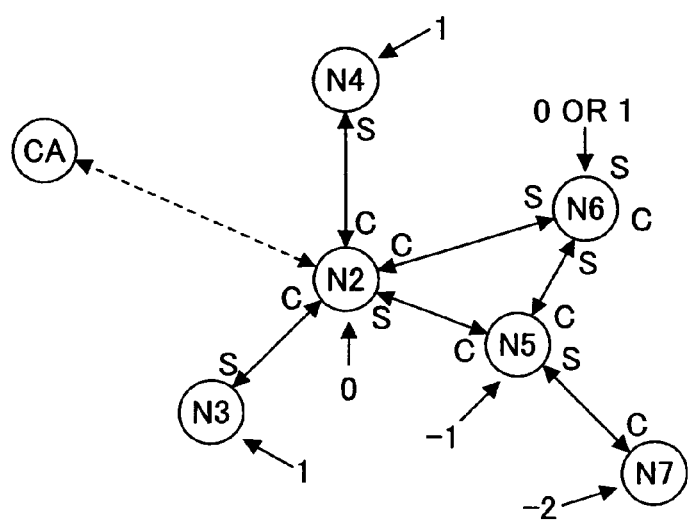
FIG. 52 is still another schematic diagram for explaining the variation explained with reference to FIG. 50.

The position number of each of the nodes registered in the task list created by taking the node N2 as the reference node in the example shown in FIG. 51 is as shown in FIG. 52. On this occasion, the node N2 and the node N6, for example, may directly communicate with each other or communicate with each other via the node N5. Thus, the position number of the node N6 is varied depending on which communication channel is taken.

In such a case, as for a part of communication channels, the position number of a node that functions as a client may be the same as or larger than the position number of a node that functions as a server. In this case, authentication in the communication channel may become impossible in a part of period of time during the root key updating process. However, even in such a case, the authentication process can be always performed over at least one communication channel and it is guaranteed that communications are possible. Thus, by performing communications over the communication channel, it is possible to perform communications between nodes. Additionally, in a case where nodes with which communications are directly made have the same position number, by first performing the updating process on a node that functions as a client is performed, it is possible to reduce communication channels in which the authentication process becomes impossible.

Further, as for the contents of the updating process of each node, the contents are different depending on the certificates related to the root key certificate to be updated among the certificates that are used in the authentication process in the node.

Another Variation

FIG. 53

In the above-mentioned embodiments, the descriptions are given of the cases where the client apparatus 40 and the server apparatus 30, or each of the nodes performs mutual authentication according to the SSL as described with reference to FIG. 5. However, the present invention produces its effects even when mutual authentication is not performed in such a manner.

The TLS (Transport Layer Security), which is obtained by improving the SSL, is also known. Of course, the present invention may also be applied to a case where an authentication process based on this protocol is performed.

Additionally, in the above-mentioned embodiments, the descriptions are given of the cases where the certificate management apparatus 10 is provided separately from the nodes constructing the client/server system. However, the certificate management apparatus 10 may be integrated with such nodes. In this case, components such as a CPU, a ROM and a RAM for realizing the functions of the certificate management apparatus 10 may be provided independently. However, the top level node may be caused to function as the certificate management apparatus 10 by using, for example, the CPU, ROM and RAM of the top level node and causing the CPU to execute appropriate software.

In such a case, it is assumed that communications between the certificate management apparatus 10 and the node that is integrated with the certificate management apparatus 10 include inter-process communications between a process for causing the hardware to function as the certificate management apparatus 10 and a process for causing the hardware to function as the node.

Further, in each of the above-mentioned embodiments, the description is given of the case where the certificate management apparatus 10 creates and obtains the certification key and the digital certificate. However, the functions of the certification key creation part 21 and the certificate issuing part 22 shown in FIGS. 2 and 18 may be separately provided in an apparatus that is different from the certificate management apparatus 10, and the certification key and the digital certificate may be supplied to the certificate management apparatus 10 from the apparatus.

Additionally, the certificate management apparatus 10 may be a direct communication party of a plurality of nodes. However, in such a case, it is assumed that one of the nodes that become direct communication parties of the certificate management apparatus 10 is selected as a top level node, and the update procedure of the root key is determined based on the top level node. The communication sequences shown in the sequence diagrams may be different since the certificate management apparatus 10 can directly communicate with the nodes. However, the order of the processes is similar to that in the case of each of the above-mentioned embodiments. In the aforementioned manner, it is possible to obtain the effects in each of the above-mentioned embodiments.

In the seventh through ninth embodiments, when simultaneously updating the server authentication root key and the client authentication root key, the collective updating as described in the fourth embodiment may be applied. In this case, a process corresponding to the process U shown in FIG. 22 may be first performed, a process corresponding to the process 31 shown in FIGS. 21 and 22 or the process 32 shown in FIGS. 23 and 24 may be sequentially performed on each of the nodes so as to update the root key certificate and the public key certificate, and thereafter a process corresponding to the process 33 shown in FIG. 27 may be sequentially performed on each of the nodes so as to dispose of the previous certificate.

On this occasion, the process corresponding to the process 31 or the process 32 may be first performed on nodes that function as clients, and the process with respect to a node that functions as a server may be performed after completion of the process with respect to all nodes that become communication parties of the server and function as clients. In addition, it is assumed that the transmission procedure of a request from the certificate management apparatus 10 to each node is appropriately performed in the procedure as described in the seventh embodiment with reference to FIG. 37.

In the aforementioned manner, though there are some problems of overhead processing in communications, as in the case of the fourth embodiment, it is possible to obtain the effect that management of the processing procedure and designing of programs are easy.

Furthermore, as mentioned above, in the third and sixth embodiments, it is possible to perform mutual authentication according to the SSL even when performing communications between the certificate management apparatus 10 and the client apparatus 40. The same applies to a case where a top-level node functions as a client when communicating with a lower node as in the seventh and ninth embodiment.

Figure 53:
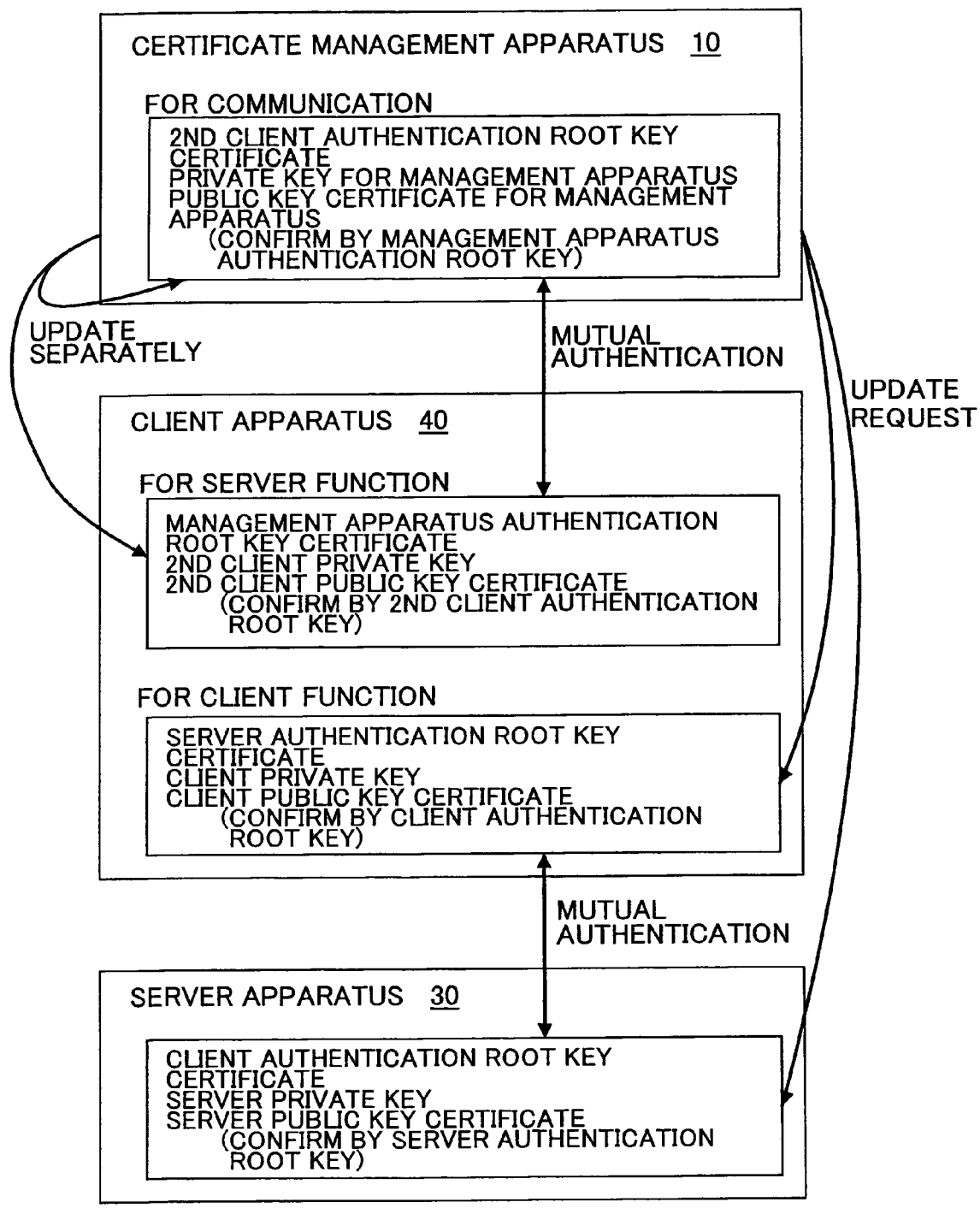
FIG. 53 is a schematic diagram for explaining the storing states of keys and certificates and a root key updating process in still another variation of the digital certificate management system of the present invention.

In order to do so, as shown in FIG. 53, in addition to the client private key, the client public key certificate, and the server authentication root key certificate (described in the embodiments) that are used in mutual authentication between the client apparatus 40 and the server apparatus 30 (the lower node), another set of a private key, a public key certificate, and a root key certificate (hereinafter referred to as "the second client private key", "the second client public key certificate", and "the management apparatus authentication root key certificate") may be stored and used for mutual authentication between the client apparatus 40 and the certificate management apparatus 10.

In this case, a management apparatus private key, a management apparatus public key certificate, and the second client authentication root key certificate are stored in the certificate management apparatus 10 and used for mutual communication. It is assumed that the second client public key certificate can be verified with the second client authentication root key included in the second client authentication root key certificate, and the management apparatus public key certificate can be verified with the management apparatus authentication root key included in the management apparatus authentication root key certificate. That is, a digital signature is attached by using a CA key (a second client CA key or a management apparatus CA key) corresponding to the second client authentication root key or the management apparatus authentication root key.

In the aforementioned manner, it is possible to separately perform mutual authentication between the certificate management apparatus 10 and the client apparatus 40 and mutual authentication between the client apparatus 40 and the server apparatus 30.

As described above with reference to FIG. 16, in the client apparatus 40 in the third and sixth embodiments, communications with the certificate management apparatus 10 are performed by the server function part 44 via the communication function part 42, and communications with the server apparatus 30 are performed by the client function part 43 via the communication function part 42. Accordingly, it is possible to positively distinguish between communications requested by the certificate management apparatus 10 and communications requested to the server apparatus 30. It is possible to perform mutual authentication using different keys and certificates between these.

In such a case, even if the root key certificate and the public key certificate used for mutual authentication between the client apparatus 40 and the server apparatus 30 are updated in response to a request from the certificate management apparatus 10, mutual authentication between the certificate management apparatus 10 and the client apparatus 40 is not affected.

By performing the updating process in the procedure described in each of the embodiments, it is possible to perform the updating process without significantly affecting mutual authentication between the client apparatus 40 and the server apparatus 30 as mentioned above. Thus, by using the structure shown in FIG. 53, it can be said that it is possible to update the root key while maintaining mutual authentication between each of the nodes.

When updating the second client authentication root key or the management apparatus root key, the updating process may be performed in accordance with the procedure of any of the above-mentioned embodiments while using the certificate management apparatus 10 as a client and the client apparatus 40 as a server. Even if such an updating process is performed, mutual authentication between the client apparatus 40 and the server apparatus 30 is not affected.

In addition, a program according to the present invention is for causing a computer that can directly or indirectly communicate with a plurality of apparatuses constructing a client/server system via a network to realize each of the functions according to the present invention (the functions as the structure storing means, the update order control means, the certification key updating means, the transmission means, and other means). By causing the computer to execute such a program, it is possible to obtain the effects as mentioned above.

Such a program may be stored in a computer readable storage medium such as a ROM or a HDD provided in a computer from the beginning. However, the program may be provided by being recorded on a CD-ROM or a flexible disk, which are computer readable storage media, and a nonvolatile computer readable storage medium such as a SRAM, an EEPROM, and a memory card. By installing the program recorded on such a computer readable storage medium in a computer and causing the CPU to execute the program, or by causing the CPU to read the program from the computer readable storage medium and execute the program, it is possible to perform each of the procedures described above.

Further, the program may be executed by downloading the program from an external apparatus having a recording medium recording the program thereon and connected to a network, or an external apparatus storing the program in storing means and connected to a network.

As mentioned above, with a digital certificate management system, a digital certificate management apparatus, a digital certificate management method, an update procedure determination method and a program according to the present invention, it is possible to safely update a public key for authentication used for verifying a digital certificate in an authentication process in a client/server system without providing a special communication channel for updating.

Accordingly, by applying the present invention to management of certificates used in an authentication process in a client/server system, it is possible to provide a system that can safely update a public key for authentication at low costs.

With an update procedure determination method according to the present invention, it is possible to determine an appropriate procedure of an updating process for updating a certification key as mentioned above. Thus, by causing a suitable apparatus to perform the updating process in accordance with the procedure, it is possible to obtain effects similar to those mentioned above.

Further, with a program according to the present invention, it is possible to cause a computer to control a digital certificate management apparatus so as to realize a digital certificate management apparatus according to the present invention, and obtain effects similar to those mentioned above.

The present invention is not limited to the specifically disclosed embodiments, and variations and modifications may be made without departing from the scope of the present invention.

The present application is based on Japanese priority applications No. 2003-181163 filed on Jun. 25, 2003 and No. 2004-157633 filed on May 27, 2004, the entire contents of which are hereby incorporated by reference.

What is claimed is:

1. A digital certificate management apparatus configured to communicate with nodes in a network, comprising:
   a selection unit configured to select a client node using a key to be updated, said key used for authentication;
   a determination unit configured to determine that there is a server node in communication with the selected client node that uses the key to be updated;
   an assigning unit configured to assign an order to the determined server node and the selected client node such that a key of the server node is updated before a key of the client node; and
   a key updating unit configured to update the keys of the client node and the server node by transmitting a new key to the client node and the server node in accordance with said order.

2. A client and server system, comprising:
   a plurality of nodes authenticating communication with each other using a key, each node functioning as either a client or a server in the communication; and
   a digital certificate management apparatus configured to communicate with the plurality nodes, including:
      a selection unit configured to select a client node for a key update;
      a determination unit configured to determine that there is a server node in communication with the client node that uses the key to be updated;
      an assigning unit configured to assign an order to the server node and the client node such that a key of the server node is to be updated before a key of the client node; and
      a key updating unit configured to update the keys of the client node and the server node by transmitting a new key to the client node and the server node in accordance with said order.

3. A computer readable storage medium containing a computer program for a digital certificate management apparatus that is configured to communicate with nodes in a network, wherein the computer program, when executed by the apparatus, causes the digital certificate management apparatus to perform a method comprising the steps of:
   selecting a client node using a key to be updated for the authenticating;

determining that there is a server node in communication with the client node that uses the key to be updated;

assigning an order to the server node such that a key of the server node is updated before the client node; and updating the keys of the client node and the server node by transmitting a new key to the client node and the server node in accordance with said order.

* * * * *